(12) United States Patent
Pourdarvish et al.

(10) Patent No.: US 10,291,051 B2
(45) Date of Patent: May 14, 2019

(54) METHODS AND SYSTEMS FOR RECHARGING A BATTERY

(71) Applicant: ZPower, LLC, Camarillo, CA (US)

(72) Inventors: Reza Pourdarvish, Camarillo, CA (US); Troy W. Renken, Camarillo, CA (US); Timothy W. Powers, Thousand Oaks, CA (US)

(73) Assignee: ZPower, LLC, Camarillo, CA (US)

( * ) Notice: Subject to any disclaimer, the term of this patent is extended or adjusted under 35 U.S.C. 154(b) by 682 days.

(21) Appl. No.: 14/759,666

(22) PCT Filed: Jan. 13, 2014

(86) PCT No.: PCT/US2014/011214
§ 371 (c)(1),
(2) Date: Jul. 8, 2015

(87) PCT Pub. No.: WO2014/110477
PCT Pub. Date: Jul. 17, 2014

(65) Prior Publication Data
US 2015/0357859 A1 Dec. 10, 2015

Related U.S. Application Data

(60) Provisional application No. 61/751,566, filed on Jan. 11, 2013.

(51) Int. Cl.
*H02J 7/00* (2006.01)
*H01M 10/44* (2006.01)
*H01M 10/32* (2006.01)

(52) U.S. Cl.
CPC ........... *H02J 7/0081* (2013.01); *H01M 10/44* (2013.01); *H02J 7/0047* (2013.01); *H02J 7/0073* (2013.01);
(Continued)

(58) Field of Classification Search
CPC ...... H02J 7/0073; H02J 7/0077; H02J 7/0081; H02J 7/0086; H01M 10/32; H01M 10/44
(Continued)

(56) References Cited

U.S. PATENT DOCUMENTS 3,708,738 A 1/1973 Crawford et al.
3,733,534 A 5/1973 Saslow
(Continued)

FOREIGN PATENT DOCUMENTS

EP 0323539 7/1989
EP 0394074 7/1997
(Continued)

OTHER PUBLICATIONS

International Search Report for PCT/US2002/038934 dated May 14, 2003.
(Continued)

*Primary Examiner* — Richard Isla
*Assistant Examiner* — Johali A Torres Ruiz
(74) *Attorney, Agent, or Firm* — Honigman LLP; Andrew N. Weber; Jonathan P. O'Brien

(57) ABSTRACT

The present invention provides a novel method for charging silver-zinc rechargeable batteries and an apparatus for practicing the charging method. The recharging apparatus includes recharging management circuitry; and one or more of a silver-zinc cell, a host device or a charging base that includes the recharging management circuitry. The recharging management circuitry provides means for regulating recharging of the silver-zinc cell, diagnostics for evaluating battery function, and safety measures that prevent damage to the apparatus caused by charging batteries composed of materials that are not suited for the charging method (e.g., non-silver-zinc batteries).

30 Claims, 30 Drawing Sheets

(52) U.S. Cl.
CPC .......... *H02J 7/0077* (2013.01); *H02J 7/0086* (2013.01); *H01M 10/32* (2013.01)

(58) Field of Classification Search
USPC ....................................................... 320/159
See application file for complete search history.

(56) References Cited

U.S. PATENT DOCUMENTS

| | | | |
|---|---|---|---|
| 4,113,921 A | 9/1978 | Goldstein et al. | |
| 4,288,733 A | 9/1981 | Bilanceri et al. | |
| 4,313,078 A | 1/1982 | Bilsky et al. | |
| 4,388,582 A | 6/1983 | Saar et al. | |
| 4,392,101 A | 7/1983 | Saar et al. | |
| 4,609,816 A | 9/1986 | Severin | |
| 4,609,861 A | 9/1986 | Inaniwa et al. | |
| 4,719,401 A | 1/1988 | Altmejd | |
| 4,745,349 A | 5/1988 | Palanisamy et al. | |
| 5,049,803 A | 9/1991 | Palanisamy | |
| 5,089,765 A | 2/1992 | Yamaguchi | |
| 5,160,880 A | 11/1992 | Palanisamy | |
| 5,166,596 A | 11/1992 | Goedken | |
| 5,204,611 A | 4/1993 | Nor et al. | |
| 5,229,706 A * | 7/1993 | Fujiwara ............... | H02J 7/0031 307/66 |
| 5,235,232 A | 8/1993 | Conley et al. | |
| 5,237,257 A | 8/1993 | Johnson et al. | |
| 5,248,928 A | 9/1993 | Gilmore | |
| 5,254,931 A | 10/1993 | Martensson | |
| 5,270,635 A | 12/1993 | Hoffman et al. | |
| 5,307,000 A | 4/1994 | Podrazhansky et al. | |
| 5,356,732 A | 10/1994 | Terasaka et al. | |
| 5,387,857 A | 2/1995 | Honda et al. | |
| 5,396,163 A | 3/1995 | Nor et al. | |
| 5,408,173 A | 4/1995 | Knapp | |
| 5,438,250 A | 8/1995 | Retzlaff | |
| 5,508,598 A | 4/1996 | Al-Abassy | |
| 5,514,947 A | 5/1996 | Berg | |
| 5,621,306 A | 4/1997 | Ise | |
| 5,642,031 A | 6/1997 | Brotto | |
| 5,661,814 A | 8/1997 | Kalin et al. | |
| 5,721,688 A | 2/1998 | Bramwell | |
| 5,747,964 A | 5/1998 | Turnbull | |
| 5,795,679 A | 8/1998 | Kawakami et al. | |
| 5,796,238 A * | 8/1998 | Hiratsuka .......... | G01R 31/3624 320/112 |
| 5,821,733 A | 10/1998 | Turnbull | |
| 5,889,385 A | 3/1999 | Podrazhansky et al. | |
| 5,896,024 A | 4/1999 | Bradus et al. | |
| D411,166 S | 6/1999 | Uemura et al. | |
| 5,982,144 A | 11/1999 | Johnson et al. | |
| 5,982,151 A | 11/1999 | Nagai et al. | |
| 5,994,878 A | 11/1999 | Ostergaard et al. | |
| D417,430 S | 12/1999 | Ko | |
| 6,025,696 A | 2/2000 | Lenhart et al. | |
| 6,037,750 A | 3/2000 | Von Novak | |
| 6,037,751 A | 3/2000 | Klang | |
| 6,078,251 A | 6/2000 | Landt | |
| 6,091,229 A | 7/2000 | Oglesbee et al. | |
| 6,094,034 A | 7/2000 | Matsuura | |
| 6,097,172 A | 8/2000 | Podrazhansky et al. | |
| 6,104,167 A | 8/2000 | Bertness et al. | |
| 6,124,700 A | 9/2000 | Nagai et al. | |
| 6,137,268 A | 10/2000 | Mitchell et al. | |
| 6,157,552 A | 12/2000 | Kern et al. | |
| 6,215,291 B1 | 4/2001 | Mercer | |
| 6,215,312 B1 | 4/2001 | Hoenig | |
| 6,218,806 B1 | 4/2001 | Brotto et al. | |
| 6,218,819 B1 | 4/2001 | Tiwari | |
| 6,222,343 B1 | 4/2001 | Crisp et al. | |
| 6,232,750 B1 | 5/2001 | Podrazhansky et al. | |
| 6,252,373 B1 | 6/2001 | Stefansson et al. | |
| 6,304,467 B1 | 10/2001 | Nebrigic | |
| 6,342,774 B1 | 1/2002 | Kreisinger | |
| 6,427,072 B1 | 7/2002 | Reichelt | |
| 6,459,243 B1 | 10/2002 | Cheiky et al. | |
| 6,476,585 B1 | 11/2002 | Simmonds | |
| 6,522,102 B1 | 2/2003 | Cheiky et al. | |
| 6,691,049 B1 | 2/2004 | Jeansonne et al. | |
| 6,743,548 B2 | 6/2004 | Cheiky et al. | |
| 6,865,690 B2 | 3/2005 | Kocin | |
| 6,943,529 B2 | 9/2005 | Cheiky et al. | |
| 6,943,530 B2 | 9/2005 | Cheiky | |
| 7,005,213 B2 | 2/2006 | Ndzebet et al. | |
| 7,218,076 B2 | 5/2007 | Cheiky et al. | |
| 7,274,168 B2 | 9/2007 | Tsukamoto et al. | |
| 7,315,626 B2 | 1/2008 | Pedersen | |
| 7,349,549 B2 | 3/2008 | Bachler et al. | |
| 7,382,270 B2 | 6/2008 | Wendelrup et al. | |
| 7,557,540 B2 | 7/2009 | Kao et al. | |
| D608,277 S | 1/2010 | Cano et al. | |
| D615,491 S | 5/2010 | Emminger | |
| D623,641 S | 9/2010 | Harden et al. | |
| 7,925,909 B1 | 4/2011 | Craine | |
| 8,030,899 B2 | 10/2011 | Cromer et al. | |
| 8,244,312 B2 | 8/2012 | Jakes et al. | |
| D668,218 S | 10/2012 | Dai et al. | |
| D677,219 S | 3/2013 | Nokuo | |
| 8,481,186 B2 | 7/2013 | Jakes et al. | |
| D696,193 S | 12/2013 | Hatanaka | |
| D722,958 S | 2/2015 | Kotaniemi et al. | |
| 9,113,276 B2 | 8/2015 | Kill et al. | |
| 9,240,696 B2 | 1/2016 | Renken et al. | |
| D760,648 S | 7/2016 | Lee et al. | |
| D762,571 S | 8/2016 | Lee et al. | |
| D789,884 S | 6/2017 | Bourgeois et al. | |
| 9,712,925 B2 | 7/2017 | Martius et al. | |
| 2001/0011883 A1 | 8/2001 | Sonobe | |
| 2002/0060554 A1 | 5/2002 | Odaohhara et al. | |
| 2002/0196957 A1 | 12/2002 | Andresen | |
| 2002/0199131 A1 | 12/2002 | Kocin | |
| 2003/0111979 A1 | 6/2003 | Cheiky et al. | |
| 2004/0178772 A1 | 9/2004 | Cheiky et al. | |
| 2004/0217738 A1 | 11/2004 | Cheiky et al. | |
| 2005/0111679 A1 | 5/2005 | Husung | |
| 2005/0134218 A1 | 6/2005 | Corbins | |
| 2005/0259838 A1 | 11/2005 | Barthel et al. | |
| 2005/0266301 A1 | 12/2005 | Smith et al. | |
| 2005/0280398 A1 | 12/2005 | Lee et al. | |
| 2006/0216596 A1 | 9/2006 | Cheiky | |
| 2007/0126402 A1 | 6/2007 | Tsai et al. | |
| 2007/0170893 A1 | 7/2007 | Kao et al. | |
| 2007/0202370 A1 | 8/2007 | Kuranuki et al. | |
| 2007/0264535 A1 | 11/2007 | Lee et al. | |
| 2008/0042618 A1 | 2/2008 | Cromer et al. | |
| 2009/0010462 A1 | 1/2009 | Ekchian et al. | |
| 2009/0189572 A1 | 6/2009 | Kamatani | |
| 2009/0218990 A1 | 9/2009 | Johnson et al. | |
| 2009/0257610 A1 | 10/2009 | Wu et al. | |
| 2010/0079113 A1 | 4/2010 | Cromer et al. | |
| 2010/0081037 A1 | 4/2010 | Jakes et al. | |
| 2010/0083008 A1 | 4/2010 | Jakes et al. | |
| 2011/0175571 A1 | 7/2011 | Renken et al. | |
| 2012/0268059 A1 * | 10/2012 | Nishikawa ............ | H01M 10/44 320/106 |
| 2012/0306455 A1 * | 12/2012 | Fischbach ............. | H02J 7/0052 320/162 |
| 2013/0207618 A1 | 8/2013 | Renken et al. | |
| 2013/0234644 A1 | 9/2013 | Weeks et al. | |
| 2013/0259278 A1 | 10/2013 | Kill et al. | |
| 2013/0272556 A1 | 10/2013 | Hamacher | |
| 2013/0329925 A1 | 12/2013 | Boguslavskij et al. | |
| 2014/0225622 A1 | 8/2014 | Kudo et al. | |
| 2016/0073205 A1 | 3/2016 | Kill et al. | |
| 2017/0118558 A1 | 4/2017 | Renken et al. | |
| 2018/0123369 A1 | 5/2018 | Pourdarvish et al. | |

FOREIGN PATENT DOCUMENTS

| | | |
|---|---|---|
| EP | 1076397 | 2/2001 |
| EP | 3113316 | 1/2017 |
| FR | 2683093 | 4/1993 |
| GB | 892954 | 4/1962 |
| GB | 2178608 | 2/1987 |
| JP | 2000-14035 | 1/2000 |

(56) References Cited

FOREIGN PATENT DOCUMENTS

| | | | |
|---|---|---|---|
| JP | 2002-305038 | 10/2002 | |
| TW | 542915 | 7/2003 | |
| TW | 200822484 | 5/2008 | |
| TW | 201018046 | 5/2010 | |
| WO | 1995/012916 | 5/1995 | |
| WO | 1999/017418 | 4/1999 | |
| WO | 2000/014848 | 3/2000 | |
| WO | 2001/047086 | 6/2001 | |
| WO | 2003/052859 | 6/2003 | |
| WO | 2003/052899 | 6/2003 | |
| WO | 2003/061052 | 7/2003 | |
| WO | 2006/075740 | 7/2006 | |
| WO | 2008/117218 | 10/2008 | |
| WO | 2009/051843 | 4/2009 | |
| WO | 2012/009652 | 1/2012 | |
| WO | WO 2012009652 A2 * | 1/2012 | .......... H01M 10/425 |
| WO | 2014/008317 | 1/2014 | |
| WO | 2015/195731 | 12/2015 | |
| WO | 2016/176236 | 11/2016 | |

OTHER PUBLICATIONS

International Search Report for PCT/US2002/039153 dated Apr. 10, 2003.
International Search Report for PCT/US2002/039154 dated Apr. 10, 2003.
International Search Report for PCT/US2008/011950 dated Nov. 2, 2009.
International Search Report for PCT/US2011/044212 dated Aug. 7, 2012.
International Search Report for PCT/US2014/011214 dated Feb. 6, 2015.
Singh, Harmohan et al., "Advanced State of Charge Measurement Technique for Silver-Zinc Batteries", The Fifteenth Annual Battery Conference on Applications and Advances, Long Beach, CA, USA, Jan. 11-14, 2000, pp. 157-163.
European Application Patent No. 13161446.3 Extended Search Report dated Feb. 18, 2015.
International Preliminary Report on Patentability for PCT/US2015/036119 dated Dec. 29, 2016.
International Preliminary Report on Patentability for PCT/US2016/029414 dated Nov. 9, 2017.
International Search Report for PCT/US2015/036119 dated Sep. 10, 2015.
International Search Report for PCT/US2016/029414 dated Jul. 12, 2016.
International Search Report for PCT/US2017/034392 dated Sep. 7, 2017.
Written Opinion of the ISA for PCT/US2015/036119 dated Sep. 10, 2015.
Written Opinion of the ISA for PCT/US2016/029414 dated Jul. 12, 2016.
Written Opinion of the ISA for PCT/US2017/034392 dated Sep. 7, 2017.

* cited by examiner

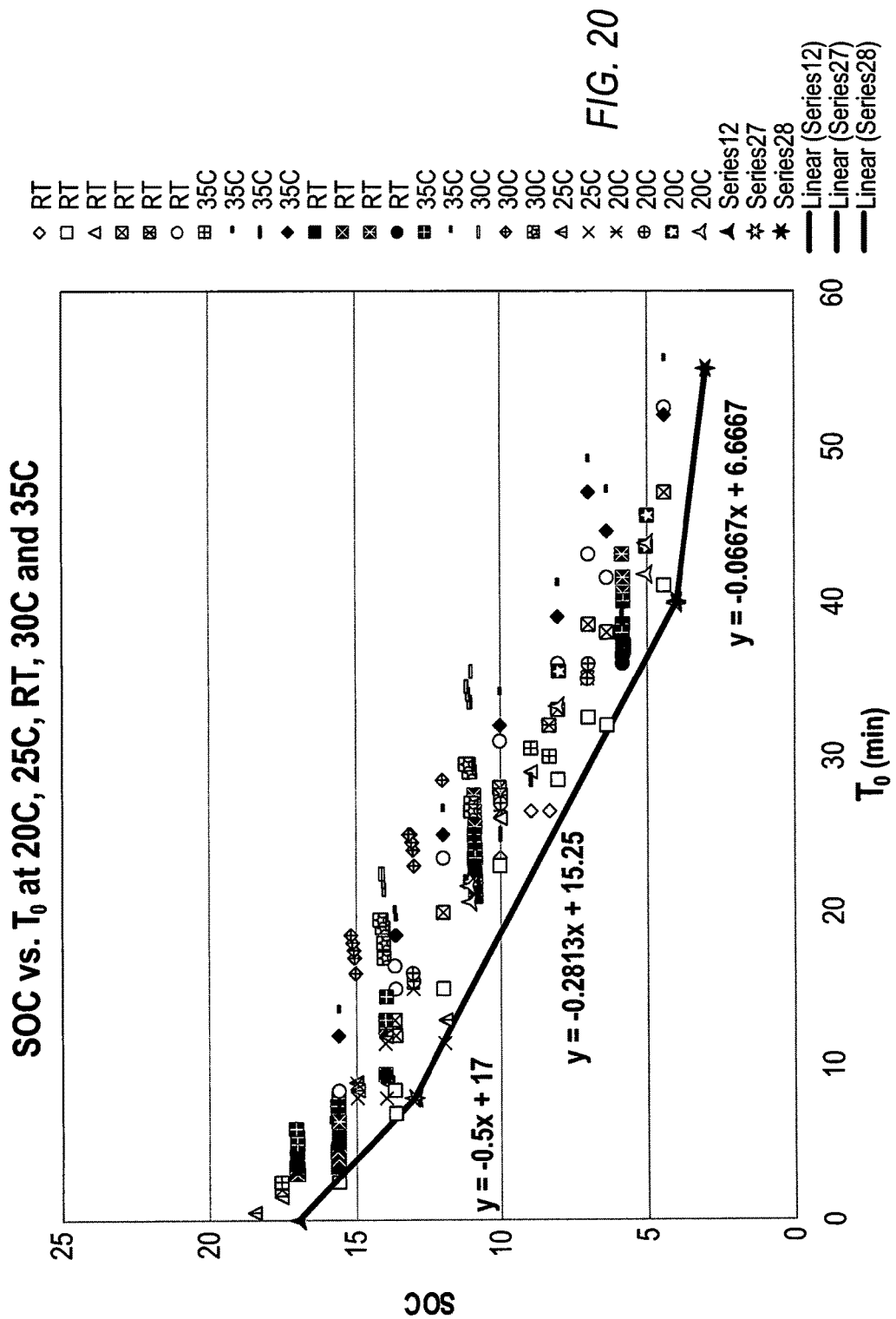

METHODS AND SYSTEMS FOR RECHARGING A BATTERY

CROSS REFERENCE TO RELATED APPLICATION

This U.S. nonprovisional application is the 35 USC § 371 national phase of PCT application no. PCT/US2014/011214, filed on Jan. 13, 2014, which claims the benefit of U.S. provisional application Ser. No. 61/751,566, filed on Jan. 11, 2013. Each of these documents is hereby incorporated by reference in its entirety.

FIELD OF THE INVENTION

The disclosure relates to systems, apparatuses, and methods for recharging a battery. Specifically, the methods and apparatus of the present invention are useful for recharging silver-zinc batteries.

BACKGROUND

Rechargeable batteries are known in the art and commonly used, for example, in portable electronic devices. Although conventional rechargeable batteries are useful, the systems and methods used to recharge the batteries are nevertheless susceptible to improvements that may enhance or improve their service life, shelf life, and/or performance.

Therefore, a need exists in the art for the development of an improved apparatus for recharging batteries and a method for charging the same.

SUMMARY OF THE INVENTION

The present invention provides a novel method for charging rechargeable batteries. Methods of the present invention reduce capacity fade that is typically observed when rechargeable silver-zinc batteries are subject to asymmetric cycling during usage. The method of the present invention may be used for charging a battery (e.g., a silver-zinc battery) wherein the charge profile of the battery comprises one or more voltage plateaus that are separated by one or more polarization peaks, such as those profiles observed for silver-zinc rechargeable batteries.

One aspect of the present invention provides a method of charging a rechargeable battery having multiple voltage plateaus wherein the battery has a voltage, $V_{Batt}$, that is less than its highest voltage plateau comprising charging the battery with a charging current, $I_1$, wherein the charging current, $I_1$, is applied until the battery is charged to a voltage, $V_1$; and controlling the charging current, $I_1$, when the voltage of the battery is $V_1$, so that the voltage of the battery is maintained at $V_1$ with a deviation of no more than about ±20% of $V_1$ until the battery is charged with charging current, $I_1$, for a maximum period of time (e.g., from about 6 to about 12 hrs), or the battery is charged to a SOC of greater than about 50% (e.g., more than about 75%, more than about 80%, more than about 90%, more than about 95% or more than about 99%), as indicated by reduced battery impedance or other model for determining charge capacity of a secondary silver-zinc battery. In one exemplary model, the shortest period of time needed to charge the battery from $V_{Batt}$ to $V_1$ is used in a model that predicts SOC in the battery; however, other models may also be used.

In another aspect, the invention provides a method of charging a rechargeable battery or cell having multiple voltage plateaus wherein the battery has a voltage, $V_{Batt}$, that is less than its highest voltage plateau comprising: a1) charging the battery with a charging current, $I_1$, wherein the charging current, $I_1$, is applied until the battery is charged to a first voltage, $V_1$; b1) controlling the charging current, $I_1$, when the voltage of the battery is $V_1$, so that the voltage of the battery is maintained at $V_1$ with a deviation of no more than about ±20% (e.g., no more than about ±10%) of $V_1$; and c1) arresting the charging current, $I_1$, at the first of the following occurrences 1) the battery has been charged with charging current, $I_1$, for a period of 9 hrs±3 hrs; 2) the battery has been charged with a target capacity $C_T$ by the charging current, $I_1$; or 3) the charging current, $I_1$, has an amperage of about 15% or less of its highest amperage, $I_{max}$, after the battery is charged with $I_1$ for a period, $T_1$, of from about 60 min to about 240 min, wherein $V_1$ is less than the voltage of a natural polarization peak, $V_{PP}$; wherein $V_{PP}$ is associated with a voltage plateau, $V_P$, wherein $V_P$ is greater than $V_{Batt}$, and $V_1$ is greater than $V_P$; wherein $C_T$ is calculated according to equation (7) and inequality (8)

$$C_T = m \times t_0 + C_{min} \text{ and} \tag{7}$$

$$C_T \leq C_R \tag{8}$$

wherein $t_0$ is the time required to charge the battery from a voltage of $V_{Batt}$ to $V_1$, m is from about 0.01 to about 10, $C_{min}$ is from about 5 to about 200, and $C_R$ is the rated capacity of the battery.

In some implementations, m is from about 0.1 to about 1. For example, m is from about 0.15 to about 0.45.

In some implementations, $C_{min}$ is from about 10 to about 200. For example, $C_{min}$ is from about 5 to about 20. In other examples, $C_{min}$ is from about 13 to about 17.

In some implementations, $C_R$ is at least about 20 mAh. For example, $C_R$ is from about 25 mAh to about 150 mAh.

In some implementations, $I_1$ is substantially constant until the battery is charged to voltage $V_1$.

In some implementations, charging current, $I_1$, is sufficient to charge the battery to voltage $V_1$ in a period of from about 1 min to about 300 min when the battery's initial SOC is less than about 40% of its rated capacity. For example, charging current, $I_1$, is sufficient to charge the battery to voltage $V_1$ in a period of from about 5 min to about 240 min when the battery's initial SOC is less than about 40% of its rated capacity.

In some implementations, charging current, $I_1$, has a maximum amperage, $I_{max}$, of at least about 3 mA (e.g., at least about 4 mA, at least about 4.5 mA, at least about 5 mA, or at least about 5.5 mA). For example, charging current, $I_1$, has a maximum amperage, $I_{max}$, of from about 3 mA to about 10 mA (e.g., from about 4 mA to about 8 mA). In other examples, charging current, $I_1$, has a maximum amperage, $I_{max}$, of from about 4 mA to about 7 mA.

In some implementations, charging current, $I_1$, has a minimum amperage, $I_{min}$, of from about 0.25 mA to about 0.60 mA. For example, charging current, $I_1$, has a minimum amperage, $I_{min}$, of 0.5 mA±10%.

Some implementations further comprise calculating a remaining charge capacity, $C_{rem}$, according to equation (10a):

$$C_{rem} = C_T - (I_1 \times t_0)/60 \tag{10a}$$

In some implementations, $V_1$ is greater than about 1.80 V. For example, $V_1$ is from about 1.85 V to about 2.05 V.

In some implementations, charging current, $I_1$, is maintained at $V_1$ with a deviation of no more than about ±10% of $V_1$.

Some implementations further comprise step d5): arresting the charging current $I_1$, if the battery has not been charged to a voltage of at least about 75% of $V_1$ after a period of from about 20 min to about 60 min.

Some implementations further comprise step e5): activating an alert if the battery has not been charged to a voltage of at least about 75% of $V_1$ after a period of from about 20 min to about 60 min.

Some implementations further comprise step d6): arresting the charging current $I_1$, if the charging current, $I_1$, is not at least $I_{max}\pm10\%$ after a period, $T_1$, of from about 60 min to about 240 min, and the OCV of the battery is less than about 93% of $V_1$ after a resting period of at least about 2.0 min.

Some implementations further comprise step e6): activating an alert if the charging current, $I_1$, is not at least $I_{max}\pm10\%$ after a period, $T_1$, of from about 60 min to about 240 min, and the OCV of the battery is less than about 93% of $V_1$ after a resting period of at least about 2.0 min.

Some implementations further comprise step g) activating an alert when the charging current, $I_1$, has an amperage that is about 20% or less of its highest amperage, $I_{max}$, after the battery is charged with $I_1$ for a period, $T_1$, of from about 60 min to about 240 min.

Some implementations further comprise step g) activating an alert when the charging current, $I_1$, has an amperage that is about 15% or less of its highest amperage, $I_{max}$, after the battery is charged with $I_1$ for a period, $T_1$, of from about 60 min to about 240 min (e.g., from about 60 min to about 80 min).

Some implementations further comprise step g) activating an alert when the charging current, $I_1$, has an amperage that is about 11% or less of its highest amperage, $I_{max}$, after the battery is charged with $I_1$ for a period, $T_1$, of from about 65 min to about 75 min.

Some implementations further comprise step g) activating an alert when the charging current, $I_1$, is 0.5 mA±0.1 mA after the battery is charged with $I_1$ for a period of at least about 70 min.

Some implementations further comprise step h) activating an alert when the voltage of the battery, $V_{Batt}$, is less than about 98% of $V_1$ for a continuous period of more than about 1.5 min and the charging current, $I_1$, has an amperage that is at least about 70% of its highest amperage, $I_{max}$, during this continuous period.

Some implementations further comprise step h) activating an alert when the voltage of the battery, $V_{Batt}$, is less than about 96% of $V_1$ for a continuous period of more than about 1.5 min, and the charging current, $I_1$, has an amperage that is at least about 80% of its highest amperage, $I_{max}$, during this continuous period.

Some implementations further comprise step h) activating an alert when the voltage of the battery, $V_{Batt}$, is less than about 1.95 V for a continuous period of from about 1.5 min to about 5 min and the charging current, $I_1$, is greater than about 80% of its highest value during this continuous period.

Some implementations further comprise step i) activating an alert when the voltage of the battery, $V_{Batt}$, is less than about 1.0 V for a continuous period of about 5 seconds or more when the battery is charged with charging current $I_1$.

Some implementations further comprise d4) charging the battery with a diagnostic charge current, $I_{Diag}$, for a period of about 10 seconds or less; and e4) discontinuing the recharging of the battery if $\Delta V \leq -m_d \times V_{d0} + b_d$, wherein $$\Delta V = V_{d1} - V_{d0} \tag{11}$$

$$0.1 \leq m_d \leq 0.99 \tag{12a}$$

$$0.75 \leq b_d \leq 0.95 \tag{13}$$

$I_{Diag}$ is from about 2 mA to about 20 mA, $V_{d0}$ is the voltage of the battery prior to being charged with $I_{Diag}$; and $V_{d1}$ is the voltage of the battery after it is charged with $I_{Diag}$.

Another aspect of the present invention provides a method of charging a rechargeable battery having multiple voltage plateaus wherein the battery has a voltage, $V_{Batt}$, that is less than its highest voltage plateau comprising: a2) charging the battery with a charging current, $I_1$, wherein the charging current, $I_1$, is applied until the battery is charged to a first voltage, $V_1$; b2) controlling the charging current, $I_1$, when the voltage of the battery is $V_1$, so that the voltage of the battery is maintained at $V_1$ with a deviation of no more than about ±20% of $V_1$; and c2) arresting the charging current, $I_1$, at the first of the following occurrences: 1) the battery has been charged with at least 98% of its $C_R$; or 2) the charging current, $I_1$, is 0.5 mA±0.1 mA after the battery is charged with $I_1$ for a period, $T_1$, of from about 60 min to about 240 min (e.g., from about 60 min to about 80 min), wherein $C_R$ is the rated capacity of the battery.

Some implementations further comprise d4) charging the battery with a diagnostic charge current, $I_{Diag}$, for a period of about 10 seconds or less; and e4) discontinuing the recharging of the battery if $\Delta V \leq -m_d \times V_{d0} + b_d$, wherein $$\Delta V = V_{d1} - V_{d0} \tag{11}$$

$$0.1 \leq m_d \leq 0.99 \tag{12a}$$

$$0.75 \leq b_d \leq 0.95 \tag{13}$$

$I_{Diag}$ is from about 2 mA to about 20 mA, $V_{d0}$ is the voltage of the battery prior to being charged with $I_{Diag}$; and $V_{d1}$ is the voltage of the battery after it is charged with $I_{Diag}$.

Another aspect of the present invention provides a method of charging a rechargeable battery having multiple voltage plateaus wherein the battery has a voltage, $V_{Batt}$, that is greater than its lowest voltage plateau comprising: a3) charging the battery with a charging current, $I_1$, having a maximum amperage of $I_{max}$, wherein the charging current, $I_1$, is applied for at least a period, $t_3$, of from about 5 min to about 15 min; b3) controlling the charging current, $I_1$, so that the voltage of the battery is maintained at $V_1$ with a deviation of no more than about ±20% of $V_1$; c3) measuring the ambient temperature; and d3) arresting the charging current, $I_1$, at the first of the following occurrences 1) the battery has been charged with charging current, $I_1$, for a period of 5 hrs±3 hrs; 2) the battery has been charged with a target capacity $C_T$ by the charging current, $I_1$; or 3) the charging current, $I_1$, reduces to $I_{end}$ for a continuous period of from about 50 seconds to about 70 seconds after the battery has been charged with $I_1$ during period $t_3$, wherein $V_1$ is less than the voltage of a natural polarization peak, $V_{PP}$; wherein $V_{PP}$ is associated with a voltage plateau, $V_P$, wherein $V_P$ is greater than $V_{Batt}$, and $V_1$ is greater than $V_P$; wherein $C_T$ is from about 10 mAh to about 25 mAh; and $I_{end}$ is calculated according to equation (12b):

$$I_{end} = m_2 \times T + b_x \tag{12b}$$

wherein $m_2$ is from about 0.10 to about 0.14; T is the ambient temperature in degrees Celsius; and $b_x$ is from about 0.75 to about 1.25 if charge current $I_1$ was 5 mA±1.5 mA for at least 80% of period $t_3$; or $b_x$ is from about 0.25 to about 0.75 if charge current $I_1$ was 5 mA±1.5 mA for less than 80% of period $t_3$.

Some implementations further comprise d4) charging the battery with a diagnostic charge current, $I_{Diag}$, for a period of about 10 seconds or less; and e4) discontinuing the recharging of the battery if $\Delta V \leq -m_d \times V_{d0} + b_d$, wherein $$\Delta V = V_{d1} - V_{d0} \quad (11);$$

$$0.1 \leq m_d \leq 0.99 \quad (12a);$$

$$0.75 \leq b_d \leq 0.95 \quad (13);$$

$I_{Diag}$ is from about 2 mA to about 20 mA, $V_{d0}$ is the voltage of the battery prior to being charged with $I_{Diag}$; and $V_{d1}$ is the voltage of the battery after it is charged with $I_{Diag}$.

BRIEF DESCRIPTION OF THE DRAWINGS

Certain aspects of the present invention are described, by way of example, with reference to the accompanying drawings, wherein:

FIG. 20 is a plot of SOC as a function of $t_0$ for several XR41 secondary test cells that were charged with a given charge current, $I_1$, of 5 mA at temperatures of 20° C., 25° C., 30° C., and 35° C.

DETAILED DESCRIPTION OF THE INVENTION

The Figures illustrate exemplary embodiments of battery rechargers and methods of recharging batteries according to the present invention. Based on the foregoing, it is to be generally understood that the nomenclature used herein is simply for convenience and the terms used to describe the invention should be given the broadest meaning understood by one of ordinary skill in the art.

I. Definitions

Figure 2:
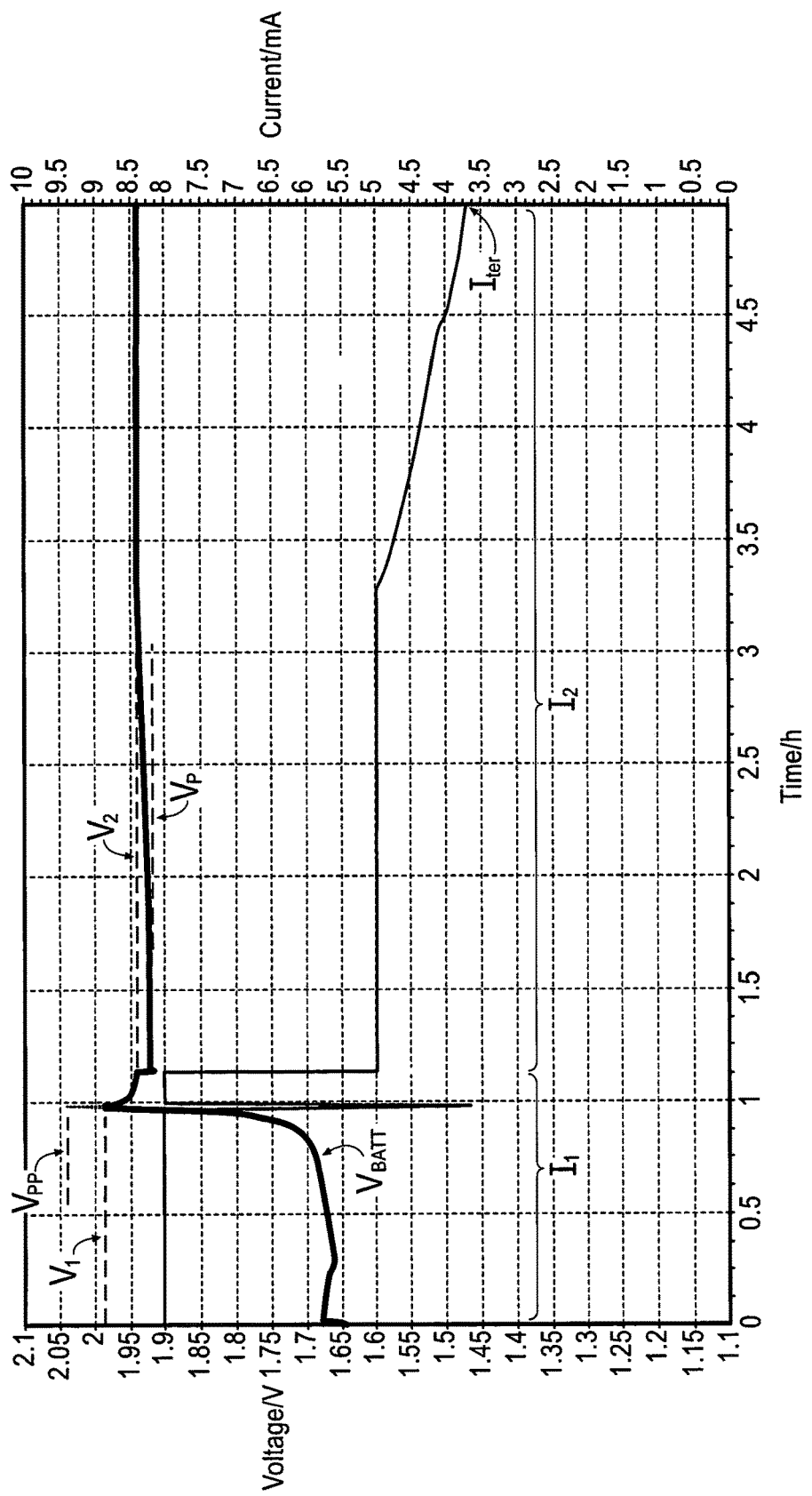
FIG. 2 is a plot of a charge curve of a rechargeable battery having at least one voltage plateau, wherein the battery voltage, $V_{Batt}$, and charging current are plotted as the battery is charged with a first charge current, $I_1$, and a second charge current, $I_2$, according to one method of the present invention.
Figure 3A:
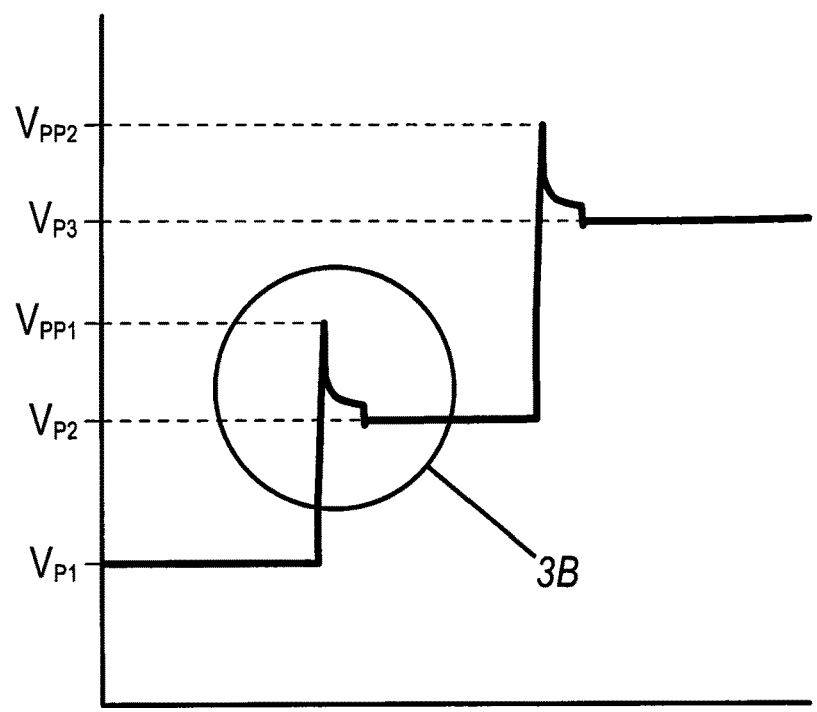
FIG. 3A is an exemplary plot of a charge curve of a rechargeable battery having multiple voltage plateaus, wherein the battery voltage is plotted as the battery is charged with an unclamped charging current to illustrate the natural polarization peaks of the battery, $V_{PP1}$ and $V_{PP2}$, and the voltage plateaus, $V_{P1}$, $V_{P2}$, and $V_{P3}$, observed during charging.
Figure 3B:
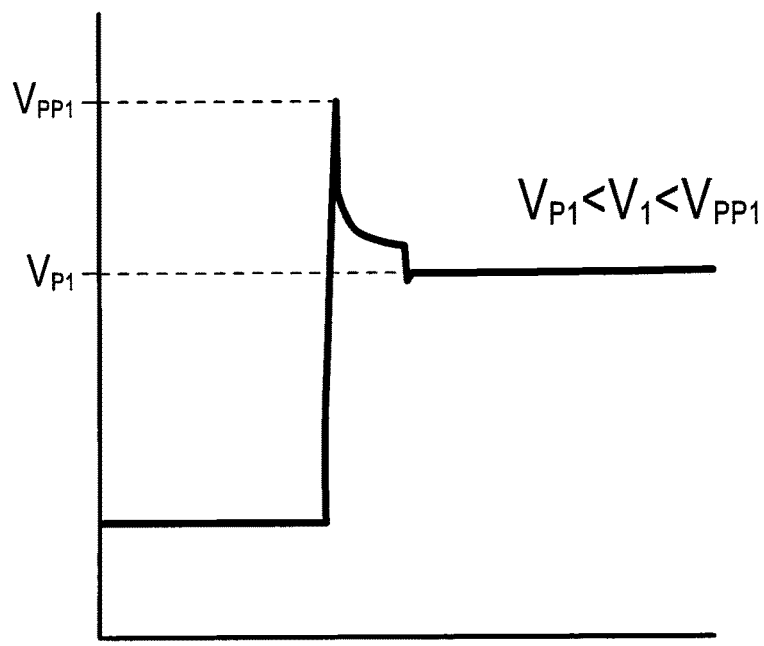
FIG. 3B is a magnified view of one voltage plateau shown in FIG. 3A showing a representation of the relationships between the voltage plateau voltage, $V_{P1}$, the voltage, $V_1$, and the voltage of the natural polarization peak, $V_{PP1}$.
Figure 18:
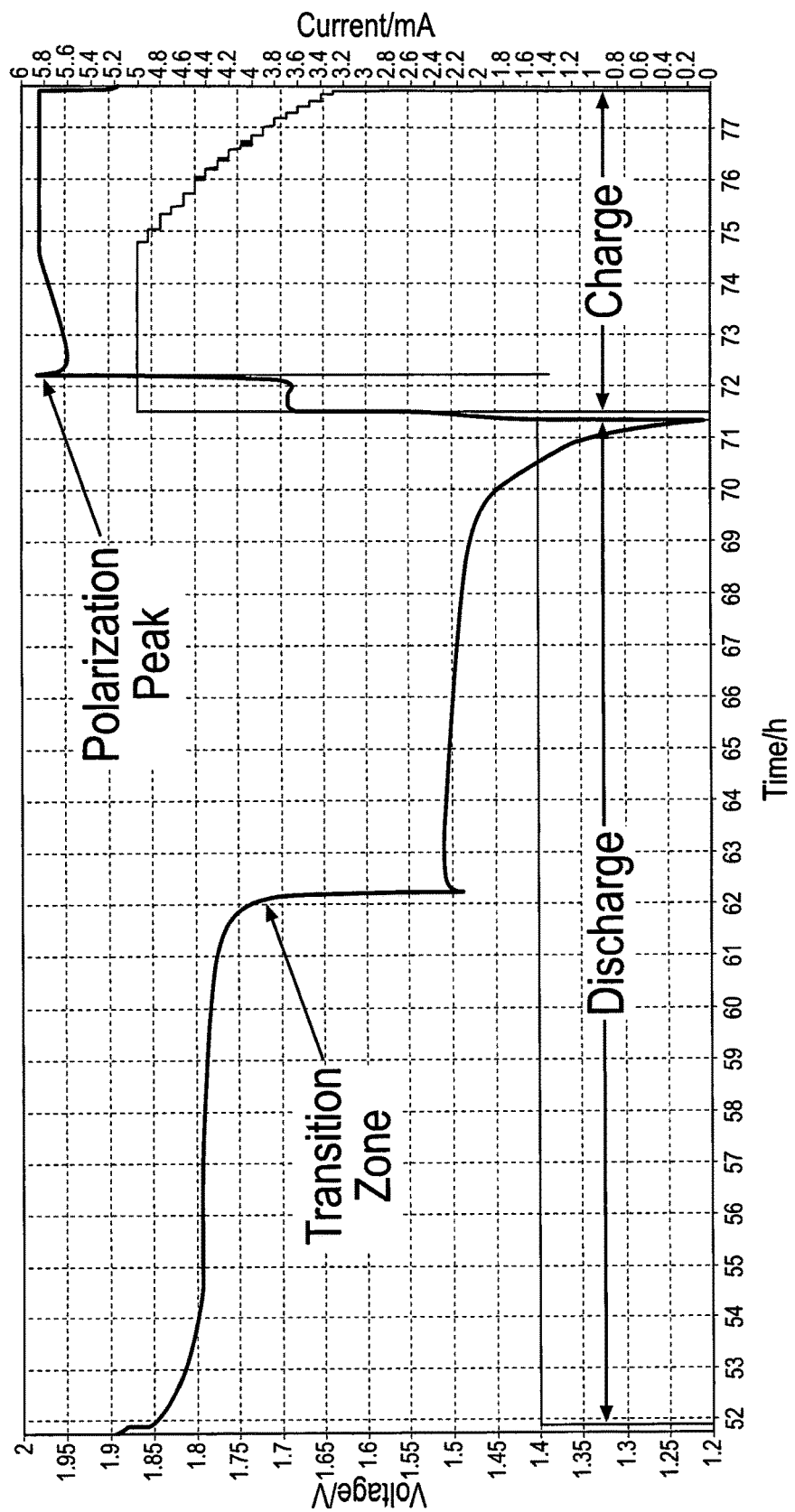
FIG. 18 is a plot of a charge-discharge curve for a battery being discharged to an SOC of less than about 40% and then being charged with a substantially constant charge current that does not clamp the battery's voltage until the battery voltage reaches the polarization peak, and then being charged according to a method of the present invention.

As used herein "polarization peak" or "natural polarization peak" refers to a peak voltage value or a sharp spike in battery voltage that precedes a voltage plateau, which is observed when a rechargeable battery having a plurality of voltage plateaus, e.g., at least 2 voltage plateaus, is charged from a voltage of a first plateau to a voltage of a higher plateau with a charge current that is not controlled to clamp the battery's voltage. Exemplary voltage plateaus are illustrated in FIG. 2, as $V_P$, and FIGS. 3A and 3B, as $V_{P1}$, $V_{P2}$, and $V_{P3}$. Exemplary polarization peaks are illustrated in FIG. 2, as $V_{PP}$, in FIGS. 3A and 3B, as $V_{PP1}$ and $V_{PP2}$, and in FIG. 18. Note that in FIGS. 3A and 3B, the exemplary polarization peaks are observed when the charging current is substantially constant and unclamped. Without limiting the scope of the present invention, it is believed that the polarization peak occurs when the state of flux in the internal chemistry (e.g., the oxidation state of the cathode material, the anode material, or both) of a rechargeable battery is maximized while the battery is being charged with an uncontrolled current. This phenomenon is observed for silver-zinc batteries and others when a voltage plot is generated for a recharging battery when the charge current is substantially constant but not controlled to clamp the battery voltage. An example of this voltage plot is provided in FIG. 18, wherein the polarization peak is identified in the charge section of the plot. Note that when a rechargeable battery is charged according some methods of the present invention, one or more polarization peaks will not be observed because the one or more charging currents (e.g., the first charge current, the second charge current, or both) is controlled to clamp the battery's voltage.

The term "voltage plateau", refers to a range of battery capacities wherein the battery's voltage remains substantially unchanged, e.g., having a variance of ±10% or less or having a variance of ±5% or less, when the battery is being charged with a substantially constant charge current. Although the voltage range for a voltage plateau is generally narrow, e.g., having a variance of ±10% or less or having a variance of ±5% or less, voltage plateaus are characterized or identified by the lowest voltage on the plateau, e.g., $V_P$. This is exemplified in FIG. 2, as $V_P$, and in FIGS. 3A and 3B, as $V_{P1}$ and $V_{P2}$. Without limiting the scope of the invention, it is believed that voltage plateaus occur when the internal chemistry (e.g., oxidation state of the cathode or anode or both) of a battery's electrochemical cell or cells stabilizes during charging and the modest variance in the battery's voltage along the plateau is governed by kinetic effects rather than nucleation, which is believed to be prominent at voltages between plateaus. The voltage plateau phenomenon may be observed when a voltage plot is generated for a recharging battery.

The terms "control", "controlling", "modulate", or "modulating", are used interchangeably herein and refer to raising, lowering, or maintaining a charge current so that the voltage of the rechargeable battery being charged is restricted or "clamped".

The terms "rechargeable battery", "battery", "electrochemical cell" and "cell" are used interchangeably herein and refer to a device capable of either deriving electrical energy from chemical reactions, or facilitating chemical reactions through the introduction of electrical energy. A battery may have one or more electrochemical cells depending on its design. For example a button cell or a coin cell is a battery having one electrochemical cell.

As used herein, "depth of discharge" and "DOD" are used interchangeably to refer to the measure of how much energy has been withdrawn from a battery or cell, often expressed as a percentage of capacity, e.g., rated capacity. For example, a 100 Ah battery from which 30 Ah has been withdrawn has undergone a 30% depth of discharge (DOD).

As used herein, "state of charge" and "SOC" and used interchangeably to refer to the available capacity remaining in a battery, expressed as a percentage of the cell or battery's rated capacity. A battery's "initial SOC" refers to the state of charge of the battery before the battery undergoes charging or recharging.

As used herein, the terms "silver" or "silver material" refer to any silver compound such as Ag, AgO, $Ag_2O$, $Ag_2O_3$, AgOH, AgOOH, AgONa, $AgCuO_2$, $AgFeO_2$, $AgMnO_2$, $Ag(OH)_2$, hydrates thereof, or any combination thereof. Note that 'hydrates' of silver include hydroxides of silver. Because it is believed that the coordination sphere surrounding a silver atom is dynamic during charging and discharging of the cell wherein the silver serves as a cathode, or when the oxidation state of the silver atom is in a state of flux, it is intended that the term 'silver' or 'silver material' encompass any of these silver oxides and hydrates (e.g., hydroxides). Terms 'silver' or 'silver material' also includes any of the abovementioned species that are doped and/or coated with dopants and/or coatings that enhance one or more properties of the silver. Exemplary dopants and coatings are provided below. In some examples, silver or silver material includes a silver oxide further comprising a first row transition metal dopant or coating. For example, silver includes silver-copper-oxide, silver-iron-oxide, silver-manganese-oxide (e.g., $AgMnO_2$), silver-chromium-oxide, silver-scandium-oxide, silver-cobalt-oxide, silver-titanium-oxide, silver-vanadium-oxide, hydrates thereof, or any combination thereof. Note that the term "oxide" used herein does not, in each instance, describe the number of oxygen atoms present in the silver or silver material. For example, a silver oxide may have a chemical formula of AgO, $Ag_2O_3$, or a combination thereof. Furthermore, silver can comprise a bulk material or silver can comprise a powder having any suitable mean particle diameter.

As used herein, an "electrolyte" refers to a substance that behaves as an electrically conductive medium. For example, the electrolyte facilitates the mobilization of electrons and cations in the cell. Electrolytes include mixtures of materials such as aqueous solutions of alkaline agents. Some electrolytes also comprise additives such as buffers. For example, an electrolyte comprises a buffer comprising a borate or a phosphate. Exemplary electrolytes include, without limitation, aqueous KOH, aqueous NaOH, or the liquid mixture of KOH in a polymer.

As used herein, "alkaline agent" refers to a base or ionic salt of an alkali metal (e.g., an aqueous hydroxide of an alkali metal). Furthermore, an alkaline agent forms hydroxide ions when dissolved in water or other polar solvents. Exemplary alkaline electrolytes include without limitation LiOH, NaOH, KOH, CsOH, RbOH, or combinations thereof. Electrolytes can optionally include other salts to modify the total ionic strength of the electrolyte, for example KF or $Ca(OH)_2$.

As used herein, "Ah" refers to Ampere (Amp) Hour and is a scientific unit for the capacity of a battery or electrochemical cell. A derivative unit, "mAh" represents a milliamp hour and is 1/1000 of an Ah.

As used herein, "maximum voltage" or "rated voltage" refers to the maximum voltage an electrochemical cell can be charged without interfering with the cell's intended utility. For example, in several zinc-silver electrochemical cells that are useful in portable electronic devices, the maximum voltage is less than about 2.3 V or less, or about 2.0 V. In other batteries, such as lithium ion batteries that are useful in portable electronic devices, the maximum voltage is less than about 15.0 V (e.g., less than about 13.0 V, or about 12.6 V or less). The maximum voltage for a battery can vary depending on the number of charge cycles constituting the battery's useful life, the shelf-life of the battery, the power demands of the battery, the configuration of the electrodes in the battery, and the amount of active materials used in the battery.

As used herein, an "anode" is an electrode through which (positive) electric current flows into a polarized electrical device. In a battery or galvanic cell, the anode is the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. Anodes are formed from electrically conductive or semiconductive materials, e.g., metals, metal oxides, metal alloys, metal composites, semiconductors, or the like. Common anode materials include Si, Sn, Al, Ti, Mg, Fe, Bi, Zn, Sb, Ni, Pb, Li, Zr, Hg, Cd, Cu, $LiC_6$, mischmetals, alloys thereof, oxides thereof, or composites thereof. Anode materials such as zinc may even be sintered.

Anodes may have many configurations. For example, an anode may be configured from a conductive mesh or grid that is coated with one or more anode materials. In another example, an anode may be a solid sheet or bar of anode material.

As used herein, a "cathode" is an electrode from which (positive) electric current flows out of a polarized electrical device. In a battery or galvanic cell, the cathode is the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like. Common cathode materials include Ag, AgO, $Ag_2O_3$, $Ag_2O$, HgO, $Hg_2O$, CuO, CdO, NiOOH, $Pb_2O_4$, $PbO_2$, $LiFePO_4$, $Li_3V_2(PO_4)_3$, $V_6O_{13}$, $V_2O_5$, $Fe_3O_4$, $Fe_2O_3$, $MnO_2$, $LiCoO_2$, $LiNiO_2$, $LiMn_2O_4$, or composites thereof. Cathode materials such as Ag, AgO, $Ag_2O_3$ may even be sintered.

Cathodes may also have many configurations. For example, a cathode may be configured from a conductive mesh that is coated with one or more cathode materials. In another example, a cathode may be a solid sheet or bar of cathode material.

Batteries and battery electrodes are denoted with respect to the active materials in the fully-charged state. For example, a zinc-silver battery comprises an anode comprising zinc and a cathode comprising a silver powder (e.g., $Ag_2O_3$). Nonetheless, more than one species is present at a battery electrode under most conditions. For example, a zinc electrode generally comprises zinc metal and zinc oxide (except when fully charged), and a silver powder electrode usually comprises AgO, $Ag_2O_3$ and/or $Ag_2O$ and silver metal (except when fully discharged).

As used herein, the term "oxide" applied to alkaline batteries and alkaline battery electrodes encompasses corresponding "hydroxide" species, which are typically present, at least under some conditions.

As used herein, "resistivity" or "impedance" refers to the internal resistance of a cathode in an electrochemical cell. This property is typically expressed in units of Ohms or micro-Ohms.

As used herein, the terms "first" and/or "second" do not refer to order or denote relative positions in space or time, but these terms are used to distinguish between two different elements or components. For example, a first separator does not necessarily proceed a second separator in time or space; however, the first separator is not the second separator and vice versa. Although it is possible for a first separator to precede a second separator in space or time, it is equally possible that a second separator precedes a first separator in space or time.

As used herein, the term "capacity" refers to the mathematical product of a cell's discharge current and the time (in hours) during which the current is discharged until the cell reaches a terminal voltage.

Similarly, the terms "actual capacity" or "theoretical capacity" refer to the capacity that a battery or electrochemical cell should theoretically discharge at 100% SOC based on the amounts of electrode materials present in the cell, the amount of electrolyte present in the cell, and the surface area of the electrodes. In general terms, the capacity of a cell/battery is the amount of charge available expressed in ampere-hours (Ah) or milliampere-hours (mAh). An ampere is the unit of measurement used for electrical current and is defined as a Coulomb of charge passing through an electrical conductor in one second. The capacity of a cell or battery is related to the quantity of active materials present, the amount of electrolyte present, and the surface area of the electrodes. The capacity of a battery/cell can be measured by discharging at a constant current until it reaches its terminal voltage, which depends on the cell's intended usage.

A cell's "rated capacity" is the average capacity delivered by a cell or battery on a specified load and temperature to a voltage cutoff point, as designated by the manufacturer for the cell's intended usage. For many types of cells, industry standards establish a cell's rated capacity, which is based on the cell's intended usage. It is noted that silver-zinc cells typically have a rated capacity that is about 70% or less (e.g., about 50% or less) of the cell's actual capacity.

As used herein, "A" and "Amps" are used interchangeably and refer to a unit of electrical current, e.g., charge current.

As used herein, "s", "sec" and "seconds" are used interchangeably and refer to a unit of time.

As used herein, "min" and "minutes" are used interchangeably and refer to a unit of time, i.e., 60 seconds.

As used herein, "hr" and "hour" are used interchangeably and refer to a unit of time, i.e., 60 min.

II. Methods of Charging a Rechargeable Cell

A. Charging Method 1:

Referring to FIGS. 2, 3A, 3B, 5, 7A, and 7B, one aspect of the present invention provides a method of charging a rechargeable battery having multiple voltage plateaus wherein the battery has a voltage, $V_{Batt}$, that is less than its highest voltage plateau comprising:

a. Charging the battery with a first charging current, $I_1$, wherein the first charging current, $I_1$, is applied until the battery is charged to a voltage, $V_1$; and b. Controlling/Modulating the first charging current, $I_1$, when the voltage of the battery is $V_1$, so that the voltage of the battery is maintained at $V_1$ with a deviation of no more than about ±20% (e.g., ±10%, ±5%) of $V_1$, wherein voltage, $V_1$, is less than the voltage of a natural polarization peak, $V_{PP}$, associated with a voltage plateau, $V_P$, that is higher than $V_{Batt}$, and $V_1$ is greater than the voltage plateau, $V_P$.

Several methods comprise additional steps such as c. Charging the battery with a second charging current, $I_2$, wherein the second charging current, $I_2$, is applied until the battery voltage reaches a voltage, $V_2$, wherein the voltage, $V_2$, is greater than $V_P$, and less than $V_{PP}$; and d. Controlling/Modulating the second charging current, $I_2$, when the voltage of the battery reaches the voltage, $V_2$, so that the voltage of the battery is maintained at $V_2$ with a deviation of no more than about ±20% of $V_2$.

Several methods optionally comprise terminating the charging current, $I_2$, when $I_2$ is controlled to be about 95% or less of the charge current during the period when the battery was being charged to $V_2$.

In some methods, charge current $I_1$ is substantially constant during the period wherein $V_{Batt}$ is less than or equal to $V_1$. And, in some methods, charge current $I_2$ is substantially constant during the period wherein $V_{Batt}$ is less than or equal to $V_2$. In these methods, charge current $I_1$ is greater than or equal to charge current $I_2$ before the battery is charged to $V_1$. For instance, $I_1$ is greater than charge current $I_2$ before the battery is charged to $V_1$. In other instances, $I_1$ is equal to charge current $I_2$ before the battery is charged to $V_1$.

In some methods, the second charging current, $I_2$, is applied at least until the battery is charged to a SOC of from about 80% to about 150% (e.g., from about 80% to about 110%) of the battery's rated capacity.

In other methods, the first charging current, $I_1$, is sufficient to charge the battery to voltage, $V_1$, in a period of from about 1 min to about 300 min (e.g., from about 5 min to about 300 min, from about 5 min to about 240 min, or from about 10 min to about 90 min) when the battery's initial SOC is less than 40% (e.g., less than 30%) of its rated capacity. In some methods, the first charging current, $I_1$, is sufficient to charge the battery to a voltage of $V_1$ in a period of from about 10 min to about 260 min (e.g., about 10 min to about 180 min), when the battery's initial SOC is less than 40% (e.g., less than 30%) of its rated capacity. In other methods, the first charging current, $I_1$, is sufficient to charge the battery to voltage, $V_1$, in a period of about 75 min or less (e.g., from about 5 min to about 75 min or from about 15 min to about 75 min) when the battery's initial SOC is less than 40% (e.g., less than 30%) of its rated capacity.

In other methods, the first charging current, $I_1$, is sufficient to charge the battery from a SOC of less than 30% (e.g., less than 20%) of its rated capacity to a SOC of from about 30% to about 40% of its rated capacity in about 240 min or less (e.g., about 180 min or less). For example, the first charging current, $I_1$, is sufficient to charge the battery from a SOC of less than 30% (e.g., less than 20%) of its rated capacity to a SOC of about 40% its rated capacity in less than about 240 min (e.g., less than about 180 min).

In other methods, the first charging current, $I_1$, is controlled when the voltage of the battery is $V_1$, so that the voltage of the battery is maintained at $V_1$ with a deviation of no more than about ±20% of $V_1$, for a period of from about 1 s to about 1500 s (e.g., from about 6 s to about 1500 s, from about 6 s to about 1200 s, or from about 6 s to about 900 s). For example, some methods include controlling the first charging current, $I_1$, when the voltage of the battery reaches a voltage, $V_1$, so that the voltage of the battery is maintained at $V_1$ with a deviation of no more than about ±10% of $V_1$ for a period of from about 6 s to about 1200 s (e.g., from about 6 s to about 900 s). Other examples include controlling the first charging current, $I_1$, when the voltage of the battery reaches $V_1$, so that the voltage of the battery is maintained at $V_1$ with a deviation of no more than about ±10% of $V_1$ for a period of from about 6 s to about 600 s.

Some methods further comprise:

e. terminating the first charging current, $I_1$, after the voltage of the battery is maintained at $V_1$ with a deviation of no more than about ±20% of $V_1$, for a period of from about 6 s to about 1500 s (e.g., from about 6 s to about 1200 s or from about 6 s to about 900 s); and f. applying the second charging current, $I_2$, when the first charging current, $I_1$, terminates.

In other methods, $V_1$ is greater than or equal to $V_2$. For instance, in some methods, $V_1$ is greater than $V_2$. In another instance, $V_1$ is equal to $V_2$.

In some methods, $V_{Batt}$ is from about 50% to about 87% of the voltage, $V_1$.

In some methods, $I_1$ is about 500 Amps or less. For example, $I_1$ is from about 100 mA to about 500 Amps. In some of these examples, $I_2$ is about 500 Amps or less. For instance, $I_2$ is from about 100 mA to about 500 Amps. In some of these examples, the battery has a rated capacity of from about 1 Ah to about 1000 Ah.

In some methods, $I_1$ is about 500 mA or less. For example, $I_1$ is from about 20 mA to about 500 mA. In some of these examples, $I_2$ is about 500 mA or less. For instance, $I_2$ is from about 20 mA to about 500 mA. In some of these examples, the battery has a rated capacity of from about 200 mAh to about 1 Ah.

In some methods, $I_1$ is about 50 mA or less. For example, $I_1$ is from about 5 mA to about 50 mA. In some of these examples, $I_2$ is about 50 mA or less. For instance, $I_2$ is from about 5 mA to about 50 mA. In some of these examples, the battery has a rated capacity of from about 50 mAh to about 200 mAh.

In some methods, $I_1$ is about 25 mA or less. For example, $I_1$ is from about 400 µA to about 25 mA. In some of these examples, $I_2$ is about 25 mA or less. For instance, $I_2$ is from about 400 µA to about 25 mA. In some of these examples, the battery has a rated capacity of from about 4 mAh to about 50 mAh.

In some methods, $I_1$ is about 2 mA or less. For example, $I_1$ is from about 10 µA to about 2 mA. In some of these examples, $I_2$ is about 2 mA or less. For instance, $I_2$ is from about 10 µA to about 2 mA. In some of these examples, the battery has a rated capacity of from about 1 mAh to about 4 mAh.

In some methods, $I_1$ is about 50 mA or less. For example, $I_1$ is from about 500 mA to greater than 8 mA. In other examples, $I_1$ is from about 5 mA to about 500 mA. In some of these examples, $I_2$ is less than 500 mA. For instance, $I_2$ is from less than about 500 mA to about 1 mA. In some of these examples, the battery has a rated capacity of from about 1 Ah to about 4 Ah.

In some methods, $I_1$ is about 1 Amp or less. For example, $I_1$ is from about 1 Amps to greater than 10 mA. In other examples, $I_1$ is from about 10 mA to about 1 A (e.g., from about 10 mA to about 0.99 A). In some of these methods, $I_2$ is less than 1 Amp. For example, $I_2$ is less than 1 Amp to about 10 mA. In other examples, $I_2$ is from about 10 mA to about 0.99 A. In other examples, the battery has a rated capacity of from about 100 mAh to about 1000 mAh.

In some methods, $I_1$ is about 100 mA or less. For example, $I_1$ is from about 100 mA to about greater than 1.0 mA. In other examples, $I_1$ is from about 1.0 mA to about 99.99 mA. In some of these methods, $I_2$ is less than 100 mA (e.g., less than 75 mA). For example, $I_2$ is from less than 75 mA to about 5 mA. In other examples, $I_2$ is from about 5 mA to about 99.99 mA. In some of these methods, the battery has a rated capacity of from about 15 mAh to about 150 mAh (e.g., from about 50 mAh to about 100 mAh).

In some methods, $I_1$ is about 150 mA or less. For example, $I_1$ is from about 0.3 mA to about 60 mA. In some of these methods, $I_2$ is less than about 150 mA. For example, $I_2$ is from about 0.2 mA to about 149.99 mA. In some of these methods, the battery has a rated capacity of from about 4 mAh to about 150 mAh.

In some methods, $I_1$ is about 25 mA or less. For example, $I_1$ is from about 25 mA to greater than 0.4 mA. In some of these methods, $I_2$ is less than 25 mA. For example, $I_2$ is from less than 25 mA to about 0.2 mA. In some of these methods, the battery has a rated capacity of from about 4 mAh to about 50 mAh.

In some methods, $I_1$ is about 15 mA or less. For example, $I_1$ is from about 15 mA to greater than 0.1 mA. In some of these methods, $I_2$ is less than 15 mA. For example, $I_2$ is from less than 15 mA to about 0.1 mA. In some of these methods, the battery has a rated capacity of from about 1.0 mAh to about 15 mAh.

In some methods, $I_1$ is from about 3.0 mA to about 3.5 mA. In some of these methods, the battery has a theoretical capacity of from about 40 mAh to about 50 mAh (e.g., about 44 mAh). In others, the battery has a rated capacity of from about 15 mAh to about 20 mAh (e.g., about 18 mAh). And, in some embodiments, the battery stores from about 25 mWh to about 30 mWh (e.g., about 29 mWh).

In some methods, $I_1$ is from about 4.7 mA to about 5.6 mA. In some of these methods, the battery has a theoretical capacity of from about 50 mAh to about 60 mAh (e.g., about 57 mAh). In others, the battery has a rated capacity of from about 20 mAh to about 30 mAh (e.g., about 28 mAh). And, in some embodiments, the battery stores from about 40 mWh to about 50 mWh (e.g., about 45 mWh).

In some methods, $I_1$ is from about 5.4 mA to about 6.4 mA. In some of these methods, the battery has a theoretical capacity of from about 60 mAh to about 80 mAh (e.g., about 70 mA to about 80 mA or about 78 mAh). In others, the battery has a rated capacity of from about 30 mAh to about 40 mAh (e.g., about 32 mAh). And, in some embodiments, the battery stores from about 50 mWh to about 60 mWh (e.g., about 51 mWh).

In some methods, $I_1$ is from about 15 mA to about 24 mA. In some of these methods, the battery has a theoretical capacity of from about 250 mAh to about 275 mAh (e.g., about 269 mAh). In others, the battery has a rated capacity of from about 100 mAh to about 140 mAh (e.g., about 120 mAh). And, in some embodiments, the battery stores from about 175 mWh to about 225 mWh (e.g., about 192 mWh).

In some methods, the voltage, $V_2$, is from about 85% to about 100% (e.g., from about 90% to about 100% or from about 90% to about 99%) of $V_1$. For example, the voltage, $V_2$, is from about 96% to about 99.5% of $V_1$.

In some methods, $V_1$ is about 2.04 V or less. For example, $V_1$ is from about 1.96 V to about 2.04 V. In other examples, $V_1$ is from about 1.96 V to about 1.99 V.

In some methods, $V_2$ is about 2.03 V or less. For example, $V_2$ is from about 1.93 V to about 2.03 V. In other examples, $V_2$ is from about 1.93 V to about 1.98 V.

Several methods of recharging a rechargeable battery according to the present invention exclude Coulomb counting as a method of determining the capacity that has been charged to the battery.

Another aspect of the present invention provides a method of charging a rechargeable battery having multiple voltage plateaus, wherein the battery has a voltage, $V_{Batt}$, that is less than its highest voltage plateau comprising: charging the battery with a first charging current, $I_1$, wherein the first charging current, $I_1$, is substantially constant until the battery is charged to a voltage, $V_1$; and controlling the first charging current, $I_1$, when the voltage of the battery is $V_1$, so that the voltage of the battery is maintained at $V_1$ with a deviation of no more than about ±20% of $V_1$ for a period of from about 6 s to about 1200 s (e.g., from about 6 s to about 900 s), wherein voltage, $V_1$, is less than the voltage of the natural polarization peak, $V_{PP}$, for a voltage plateau, $V_P$, that is higher than $V_{Batt}$, and $V_1$ is greater than the voltage plateau, $V_P$.

Some methods further comprise charging the battery with a second charging current, $I_2$, that is less than or equal to the first charging current, $I_1$, when the battery has a voltage of less than $V_1$, wherein the second charging current, $I_2$, is substantially constant until the battery voltage reaches a voltage, $V_2$, wherein the voltage, $V_2$, is less than or equal to the voltage, $V_1$, and greater than $V_{Batt}$, and controlling the second charging current, $I_2$, when the voltage of the battery reaches the voltage, $V_2$, so that the voltage of the battery is maintained at $V_2$ with a deviation of no more than about ±20% of $V_2$. Also, some methods also comprise terminating the second charging current, $I_2$, after a period of about 10 min or less (e.g., about 5 min or less) from the point when the battery is charged to a SOC of from about 80% to about 150% (e.g., from about 80% to about 110%) of the battery's rated capacity.

In some methods, the first charging current, $I_1$, is sufficient to charge the battery to voltage, $V_1$, in a period of from about 5 min to about 240 min when the battery's initial SOC is less than 40% (e.g., less than 30%) of its rated capacity. In other methods, the first charging current, $I_1$, is sufficient to charge the battery to a voltage of $V_1$ in a period of from about 10 min to about 180 min, when the battery's initial SOC is less than 40% (e.g., less than 30%) of its rated capacity. In other methods, the first charging current, $I_1$, is sufficient to charge the battery to a voltage of $V_1$ in a period of from about 15 min to about 75 min, when the battery's initial SOC is less than 40% (e.g., less than 30%) of its rated capacity. Or, the first charging current, $I_1$, is sufficient to charge the battery from a SOC of less than 30% (e.g., less than 20%) of its rated capacity to a SOC of from about 30% to about 40% of its rated capacity in about 240 min or less (e.g., about 180 min or less). For example, the first charging current, $I_1$, is sufficient to charge the battery from a SOC of less than 40% (e.g., less than 30%) of its rated capacity to a SOC of about 40% its rated capacity in less than about 240 min. In other methods, the first charging current, $I_1$, is sufficient to charge the battery to a voltage of $V_1$ in a period of about 75 min or less, when the battery's initial SOC is less than 40% (e.g., less than 30%) of its rated capacity.

In some methods, $V_{Batt}$ is from about 50% to about 87% of the voltage, $V_1$.

Other methods further comprise controlling the first charging current, $I_1$, when the voltage of the battery reaches a voltage, $V_1$, so that the voltage of the battery is maintained at $V_1$ with a deviation of no more than about ±10% of $V_1$ for a period of from about 6 s to about 1200 s (e.g., from about 6 s to about 900 s or from about 550 s to about 650 s).

Optionally, some of these methods further comprise generating an electrical signal that indicates a soft short in the battery if $V_{Batt}$ is lower than $V_P$ (e.g. 1.90 V) for a period of more than 1 second after the battery has been charged to a voltage of $V_2$.

Optionally, some of these methods further comprise charging the battery with a diagnostic charge current, $I_{Diag}$, to determine whether the battery is compatible with some steps of the present charging method. One embodiment comprises charging the battery with a diagnostic charge current, $I_{Diag}$, for a period of less than about 30 s, detecting the voltage of the battery, $V_{Batt}$, and terminating charging of the battery if $V_{Batt}$ is about 1.65 V or less (e.g., less than about 1.65 V). In some methods, $I_{Diag}$ is greater than or equal to $I_1$. In other methods, $I_{Diag}$ is from about 5% to about 200% greater than $I_1$. In some methods, $I_{Diag}$ is from about 30% to about 100% greater than $I_1$. And in some methods, $I_{Diag}$ is about equal to $I_1$. Other embodiments comprise charging the battery with a diagnostic charge current, $I_{Diag}$ that is about 10% to about 200% higher than $I_1$ for a period of less than about 10 s, detecting the voltage of the battery, $V_{Batt}$, and terminating charging of the battery if $V_{Batt}$ is about 1.60 V or less. Some methods comprise charging the battery with a diagnostic charge current, $I_{Diag}$ that is about 30% to about 100% higher than $I_1$ for a period of less than about 5 s, detecting the voltage of the battery, $V_{Batt}$, and terminating charging of the battery if $V_{Batt}$ is about 1.55 V or less.

In some methods, the voltage, $V_2$, is from about 90% to about 100% of $V_1$. For example, the voltage, $V_2$, is from about 96% to about 99.5% of $V_1$. In other methods, $V_1$ is about 2.04 V or less. For example, $V_1$ is from about 2.04 V to about 1.96 V. Or, $V_1$ is from about 1.99 V to about 1.96 V.

In other methods, $V_2$ is about 2.03 V or less. For example, $V_2$ is from about 2.03 V to about 1.93 V. In other examples, $V_2$ is from about 1.93 V to about 1.98 V.

One aspect of the present invention provides a method of detecting a rechargeable silver-zinc battery comprising charging the battery with a diagnostic charge current, $I_{Diag}$, for a period of less than about 60 s, detecting the voltage of the battery, $V_{Batt}$, and terminating charging of the battery if $V_{Batt}$ is about 1.60 V or less (e.g., about 1.55 V or less); wherein $I_{Diag}$ is about 25 mA or less. In some embodiments, the battery is charged with $I_{Diag}$ for a period of about 7 s or less, detecting the voltage of the battery, $V_{Batt}$, and generating an electrical signal if $V_{Batt}$ is about 1.60 V or less, wherein $I_{Diag}$ is from about 20 mA to about 25 mA or about 10 mA or less. In some embodiments, the electrical signal activates an audio alarm, a visual alarm, a vibrational alarm, or any combination thereof.

Figure 6:
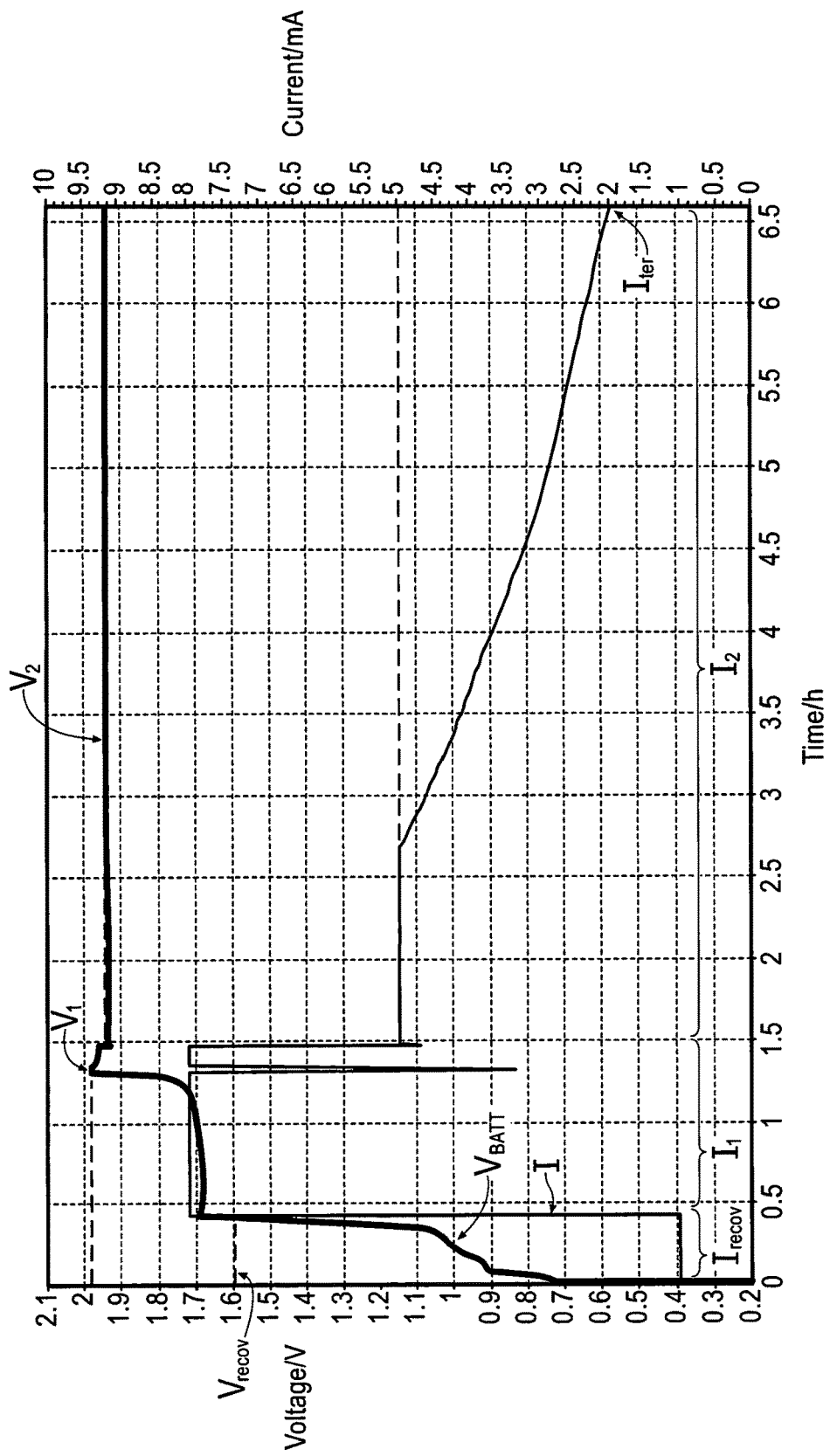
FIG. 6 is a plot of a charge curve of a rechargeable battery having at least one voltage plateau, wherein the battery is charged according to a multiple zone charging method of the present invention wherein the battery is charged from a low SOC with a recovery charge current, $I_{recov}$, until the voltage of the battery reaches a recovery voltage, $V_{recov}$, then the battery is charged with a first charge current, $I_1$, until the voltage reaches $V_1$, and finally the battery is charged with a second charge current, $I_2$, until the second charge current reaches $I_{ter}$.

Referring generally to FIG. 6, another aspect of the present invention provides a method of charging a rechargeable battery having multiple voltage plateaus wherein the battery has a voltage, $V_{Batt}$, that is less than about 80% (e.g., less than about 70%) of the voltage of a first sequential voltage plateau, $V_{P1}$, comprising:

a. charging the battery with a recovery charging current, $I_{recov}$, that is substantially constant for a period of no more than about 120 min (e.g., no more than 30 min, no more than about 20 min, or no more than about 15 min) after the voltage of charging battery reaches the first sequential voltage plateau, $V_{P1}$ that is greater than $V_{Batt}$;

b. charging the battery with a first charging current, $I_1$, wherein the first charging current, $I_1$, is substantially constant until the battery is charged to a voltage, $V_1$; and c. controlling the first charging current, $I_1$, when the voltage of the battery reaches the voltage, $V_1$, so that the voltage of the battery is maintained at $V_1$ with a deviation of no more than about ±20% of $V_1$, for a period of from about 6 s to about 1200 s (e.g., from about 6 s to about 900 s), wherein voltage, $V_1$, is less than the voltage of the natural polarization peak, $V_{PP}$, for a voltage plateau, $V_P$, that is higher than $V_{P1}$, and $V_1$ is greater than the voltage plateau, $V_P$.

In some methods, $I_{recov}$ is from about 5% to about 90% of $I_1$. For example, $I_{recov}$ is from about 10% to about 30% of $I_1$.

Some methods further comprise:

d. charging the battery with a second charging current, $I_2$, that is less than the first charging current, $I_1$, wherein the second charging current, $I_2$, is substantially constant until the battery voltage reaches a voltage, $V_2$, wherein the voltage, $V_2$, is less than the voltage, $V_1$, and greater than the first sequential voltage plateau, $V_{P1}$; and e. controlling the second charging current, $I_2$, when the voltage of the battery reaches the voltage, $V_2$, so that the voltage of the battery is maintained at $V_2$ with a deviation of no more than about ±20% of the voltage $V_2$.

Other methods further comprise:

f. terminating the second charging current, $I_2$, after a period of about 10 minutes or less from the point when the battery is charged to a capacity of from about 80% to about 150% (e.g., from about 80% to about 110%) of the battery's rated capacity.

And some methods further comprise generating an electrical signal that indicates that the battery is experiencing a short (e.g., a soft short or a hard short) if the voltage of the battery, $V_{Batt}$, fails to reach the first sequential voltage plateau, $V_{P1}$, that is greater than $V_{Batt}$ after being charged with $I_{recov}$ for a period of from about 15 minutes to 2 hours (e.g., from about 30 min to about 120 min).

Some methods of this aspect also exclude counting Coulombs to assess the capacity that is charged to a battery.

In some methods, the rechargeable battery comprises an anode comprising a zinc material.

In other methods, the rechargeable battery comprises a cathode comprising a silver material.

Exemplary batteries that may be recharged using methods of the present invention include button cells, coin cells, cylinder cells, or prismatic cells.

The methods above may optionally include additional steps such as generating an electrical signal when the second charging current, $I_2$, terminates. Some methods further include activating a visual signal, activating an audio signal, activating a vibrational signal, or any combination thereof when the second charging current, $I_2$, terminates.

Figure 7A:
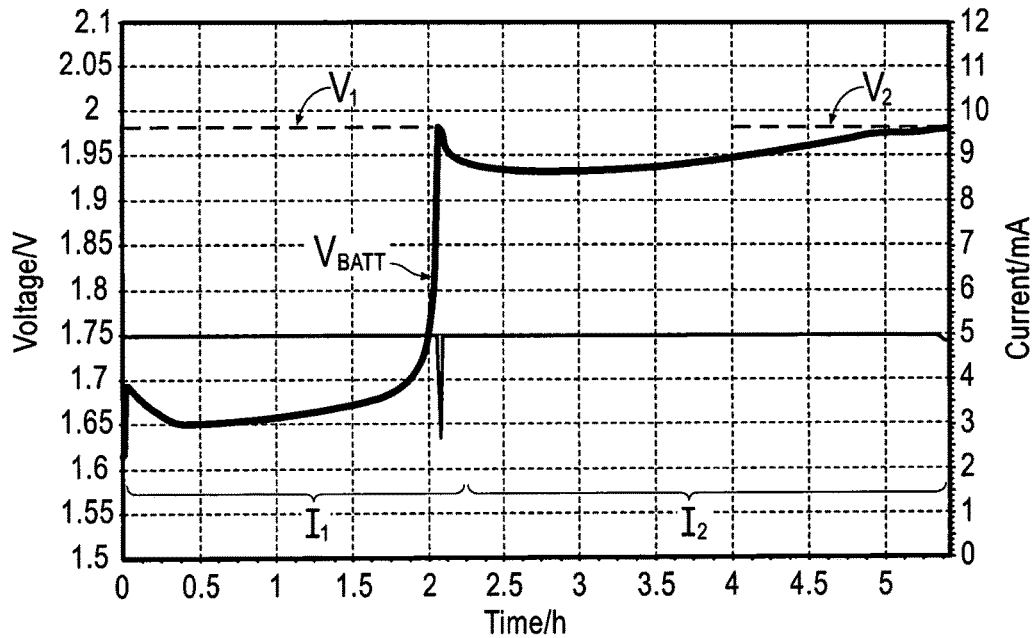
FIG. 7A is a plot of a charge curve for recharging a battery in accordance with an exemplary embodiment of the invention.
Figure 7B:
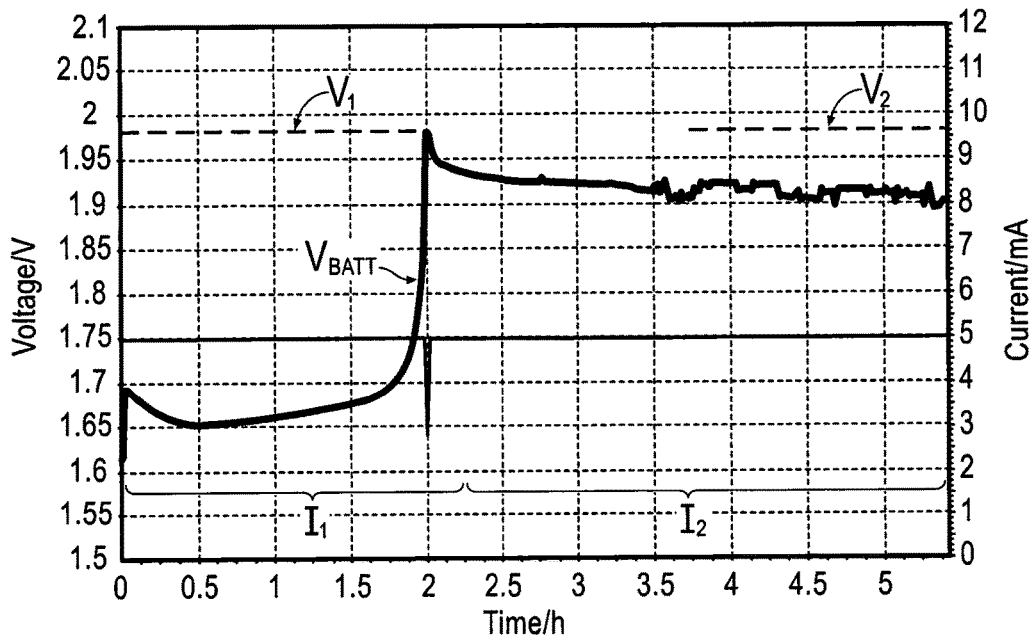
FIG. 7B is a plot of a charge curve for recharging a battery experiencing a soft-short in accordance with an exemplary embodiment of the invention.
Figure 8A:
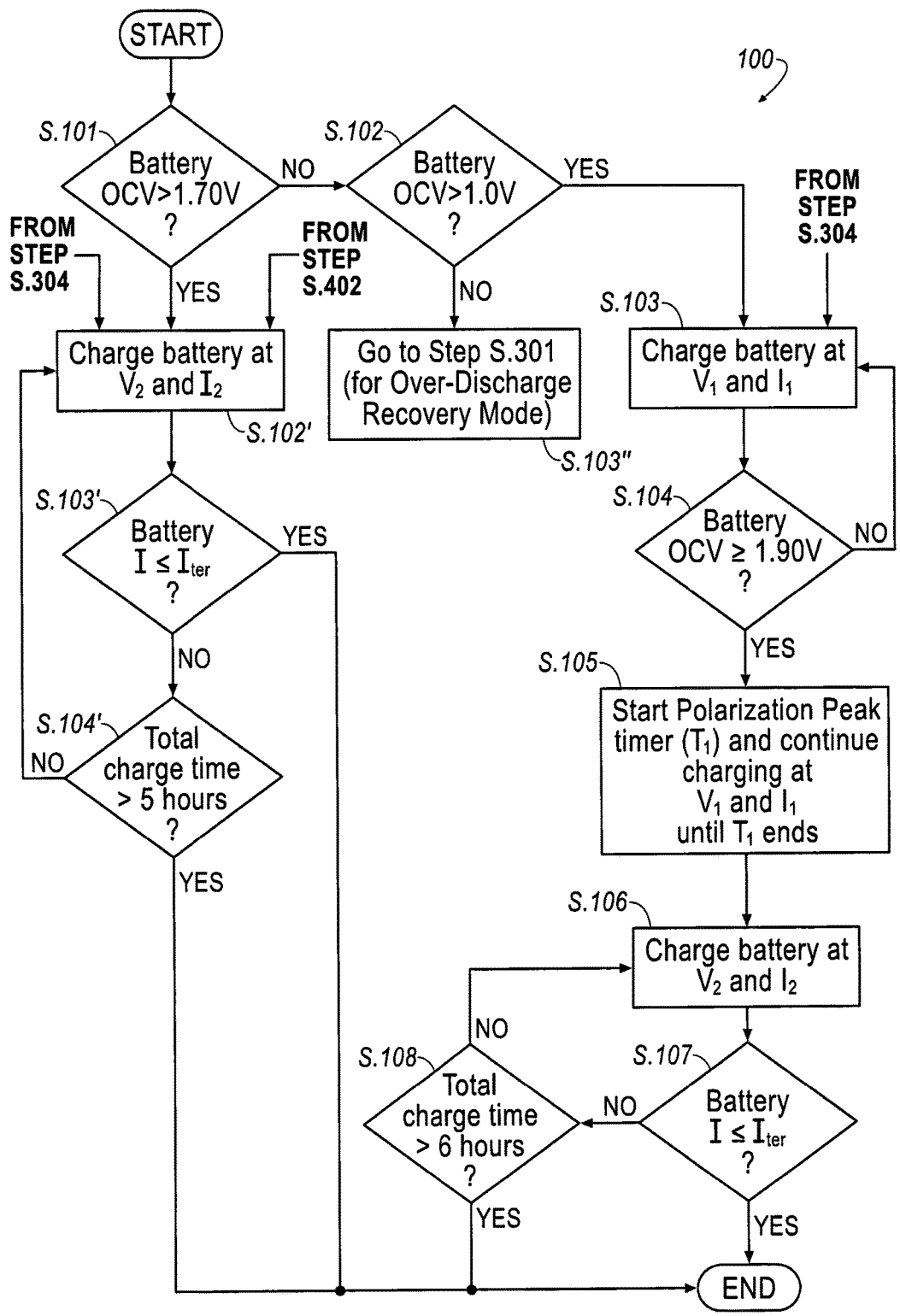
FIG. 8A is a step-diagram representing one exemplary method for recharging a rechargeable battery having at least one voltage plateau according to one embodiment of the invention.
Figure 8B:
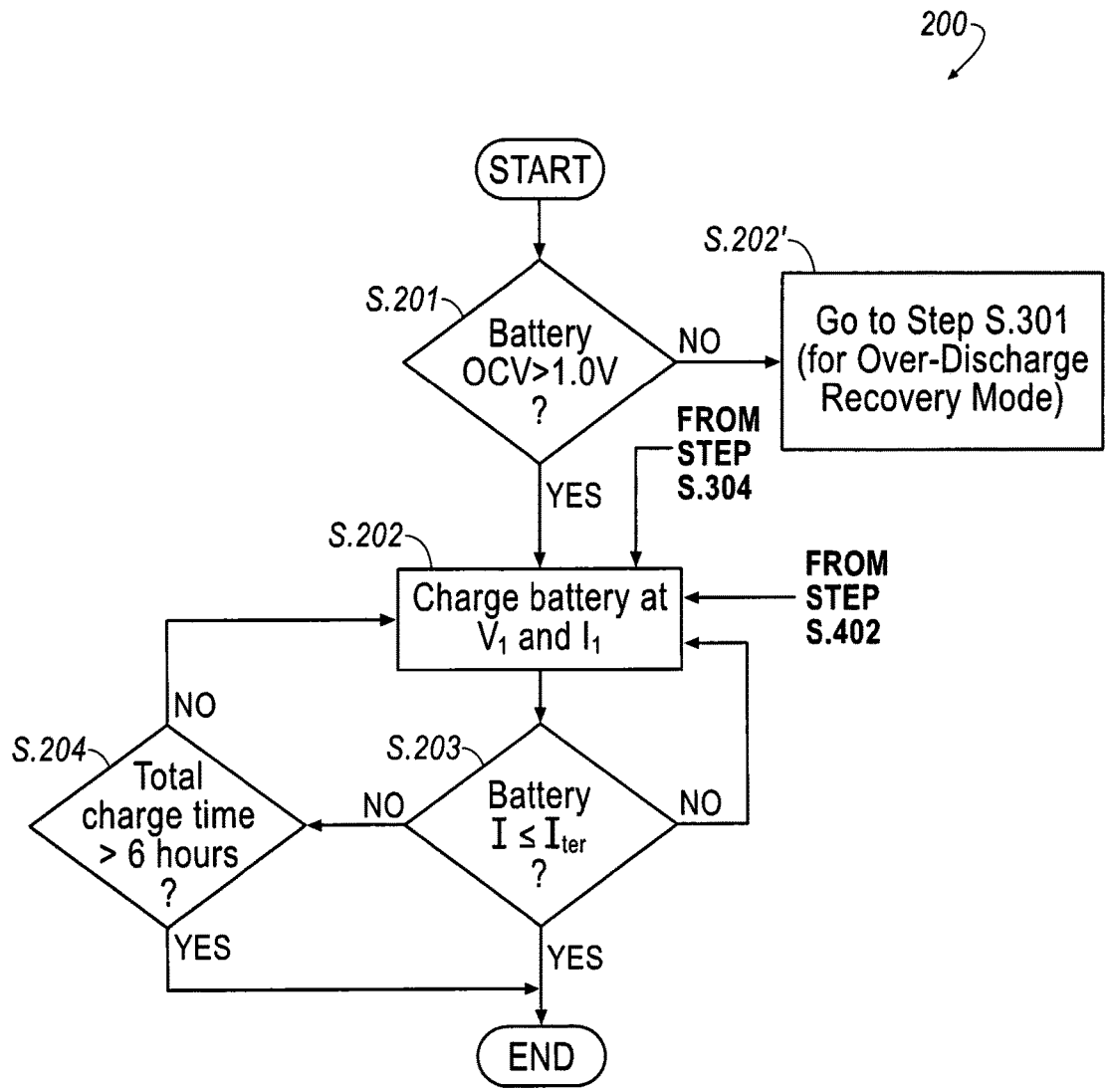
FIG. 8B is a step-diagram representing another exemplary method for recharging a rechargeable battery having at least one voltage plateau according to one embodiment of the invention.
Figure 8C:
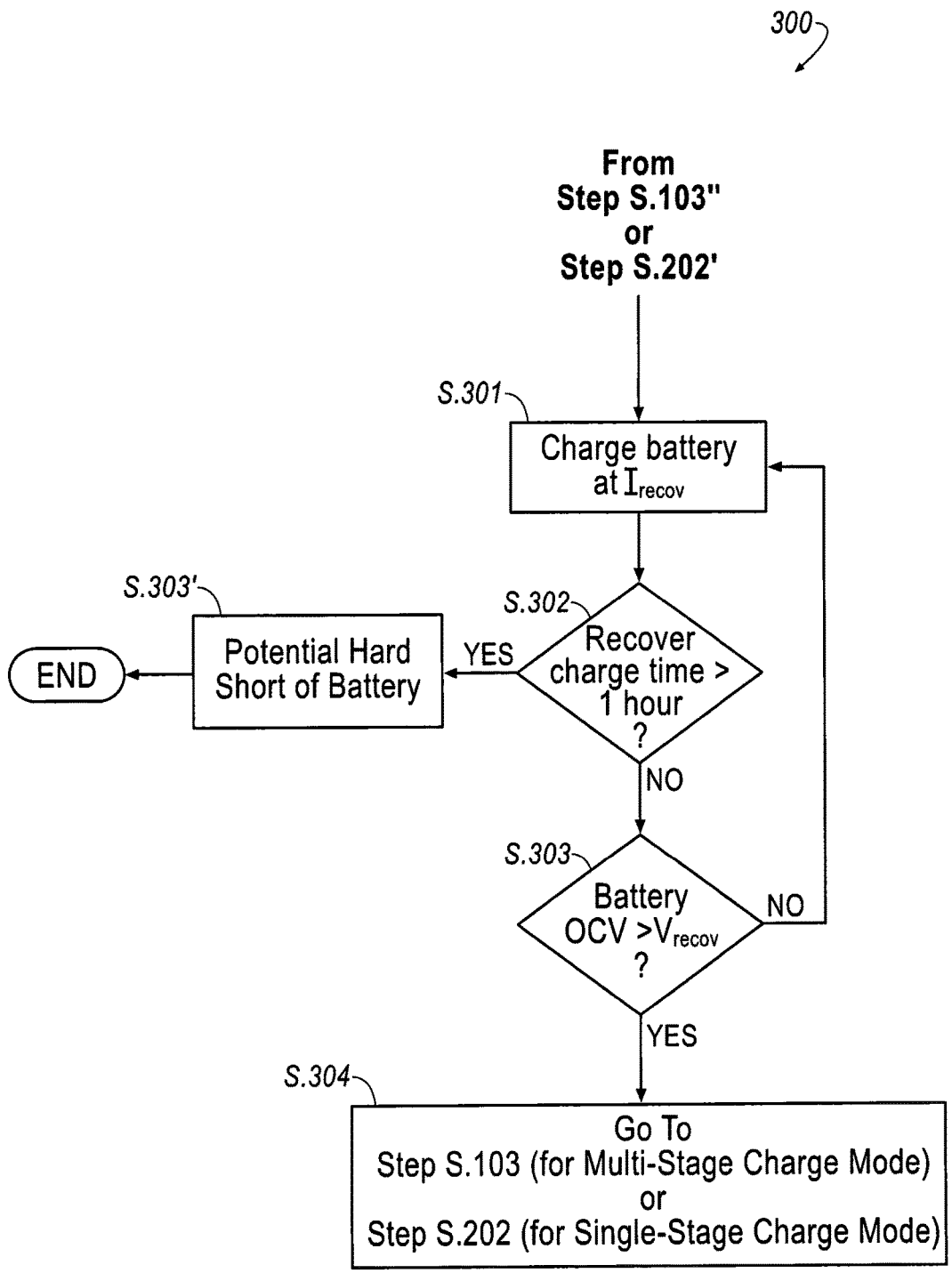
FIG. 8C is a step-diagram representing another exemplary method for recharging a rechargeable battery having at least one voltage plateau according to one embodiment of the invention.

Referring to FIGS. 7A, 7B, and 8A, another aspect of the present invention provides a method of charging a rechargeable button cell having multiple voltage plateaus wherein the cell has a voltage greater than about 1.10 V and less than about 1.70 V (e.g., greater than 1.20 V and 1.70 V) comprising:

a. charging the cell with a first charging current, $I_1$, wherein the first charging current, $I_1$, is substantially constant until the cell is charged to a voltage, $V_1$, that is greater than 1.70 V and less than 2.04 V; and b. controlling the first charging current, $I_1$, when the voltage of the cell reaches the voltage, $V_1$, so that the voltage of the cell is maintained at $V_1$ with a deviation of no more than about ±10% of $V_1$ for a period of from about 6 s to about 1500 s (e.g., from about 6 s to about 1200 s).

Some methods further comprise:

c. charging the cell with a second charging current, $I_2$, that is less than or equal to the first charging current, $I_1$, when the battery has a voltage of less than $V_1$, wherein the second charging current, $I_2$, is substantially constant until the cell voltage reaches a voltage, $V_2$, wherein the voltage, $V_2$, is less than or equal to the voltage, $V_1$, and greater than 1.7 V; and d. controlling the second charging current, $I_2$, when the voltage of the cell reaches the voltage, $V_2$, so that the voltage of the cell is maintained at $V_2$ with a deviation of no more than about ±10% of the voltage $V_2$.

And, other methods further comprise:

e. terminating the second charging current, $I_2$, after no more than 5 minutes from the point when the cell is charged to a capacity of from about 80% to about 150% (e.g., from about 80% to about 110%) of the cell's rated capacity.

In some methods, the first charging current, $I_1$, is sufficient to charge the battery to the voltage, $V_1$, in a period of from about 1 min to about 180 min (e.g., from about 30 min to about 180 min).

Other methods further comprise controlling the first charging current, $I_1$, when the voltage of the cell reaches the voltage, $V_1$, so that the voltage of the battery is maintained at $V_1$ with a deviation of no more than about ±10% of $V_1$ for a period of from about 550 s to about 650 s.

In some methods, the voltage, $V_2$, is from about 90% to about 100% of $V_1$. For example, the voltage, $V_2$, is from about 96% to about 99.5% of $V_1$.

In some methods, $I_1$ is about 1 Amp or less. For example, $I_1$ is from about 1 Amps to greater than 80 mA. In other examples, $I_1$ is from about 80 mA to about 1 A (e.g., from about 8 mA to about 0.99 A). In some of these methods, $I_2$ is less than 1 Amp. For example, $I_2$ is less than 1 Amp to about 80 mA. In other examples, $I_2$ is from about 80 mA to about 0.99 A. In other examples, the battery has a rated capacity of from about 100 mAh to about 1000 mAh.

In some methods, $I_1$ is about 300 mA or less. For example, $I_1$ is from about 250 mA to about greater than 8 mA. In other examples, $I_1$ is from about 8 mA to about 299.99 mA. In some of these methods, $I_2$ is less than 300 mA (e.g., less than 250 mA). For example, $I_2$ is from less than 250 mA to about 4 mA. In other examples, $I_2$ is from about 4 mA to about 299.99 mA. In some of these methods, the battery has a rated capacity of from about 15 mAh to about 150 mAh (e.g., from about 50 mAh to about 100 mAh).

In some methods, the voltage, $V_2$, is from about 1.93 V to about 1.98 V.

In some methods, $I_1$ is about 25 mA or less. For example, $I_1$ is from about 25 mA to greater than 4 mA. In some of these methods, $I_2$ is less than 25 mA. For example, $I_2$ is from less than 25 mA to about 2 mA. In some of these methods, the battery has a rated capacity of from about 4 mAh to about 50 mAh.

In some methods, $I_1$ is about 15 mA or less. For example, $I_1$ is from about 15 mA to greater than 0.1 mA. In some of these methods, $I_2$ is less than 15 mA. For example, $I_2$ is from less than 15 mA to about 0.1 mA.

In some methods, $I_1$ is from about 3.0 mA to about 3.5 mA. In some of these methods, the battery has a theoretical capacity of from about 40 mAh to about 50 mAh (e.g., about 44 mAh). In others, the battery has a rated capacity of from about 15 mAh to about 20 mAh (e.g., about 18 mAh). And, in some embodiments, the battery stores from about 25 mWh to about 30 mWh (e.g., about 29 mWh).

In some methods, $I_1$ is from about 4.7 mA to about 5.6 mA. In some of these methods, the battery has a theoretical capacity of from about 50 mAh to about 60 mAh (e.g., about 57 mAh). In others, the battery has a rated capacity of from about 20 mAh to about 30 mAh (e.g., about 28 mAh). And, in some embodiments, the battery stores from about 40 mWh to about 50 mWh (e.g., about 45 mWh).

In some methods, $I_1$ is from about 5.4 mA to about 6.4 mA. In some of these methods, the battery has a theoretical capacity of from about 70 mAh to about 80 mAh (e.g., about 78 mAh). In others, the battery has a rated capacity of from about 30 mAh to about 40 mAh (e.g., about 32 mAh). And, in some embodiments, the battery stores from about 50 mWh to about 60 mWh (e.g., about 51 mWh).

In some methods, $I_1$ is from about 15 mA to about 24 mA. In some of these methods, the battery has a theoretical capacity of from about 250 mAh to about 275 mAh (e.g., about 269 mAh). In others, the battery has a rated capacity of from about 100 mAh to about 140 mAh (e.g., about 120 mAh). And, in some embodiments, the battery stores from about 175 mWh to about 225 mWh (e.g., about 192 mWh).

In some methods, the voltage, $V_2$, is from about 90% to about 100% of $V_1$. For example, the voltage, $V_2$, is from about 96% to about 99.5% of $V_1$.

In some methods, the voltage, $V_1$, is from about 1.95 V to about 1.99 V.

In other methods, the first charging current, $I_1$, is modulated for a period of about 550 s to about 650 s.

In some methods, the voltage, $V_2$, is from about 1.93 V to about 1.98 V.

Other methods exclude counting Coulombs as described above.

In some methods, the battery comprises an anode comprising a zinc material.

In other methods, the battery comprises a cathode comprising a silver material.

Some methods further comprise generating an electrical signal when the second charging current, $I_2$, is terminated. And, other methods further comprise activating a signal or alert (e.g., a visual signal, an audio signal, a vibrational signal, or any combination thereof) when the second charging current, $I_2$, is terminated.

Figure 4:
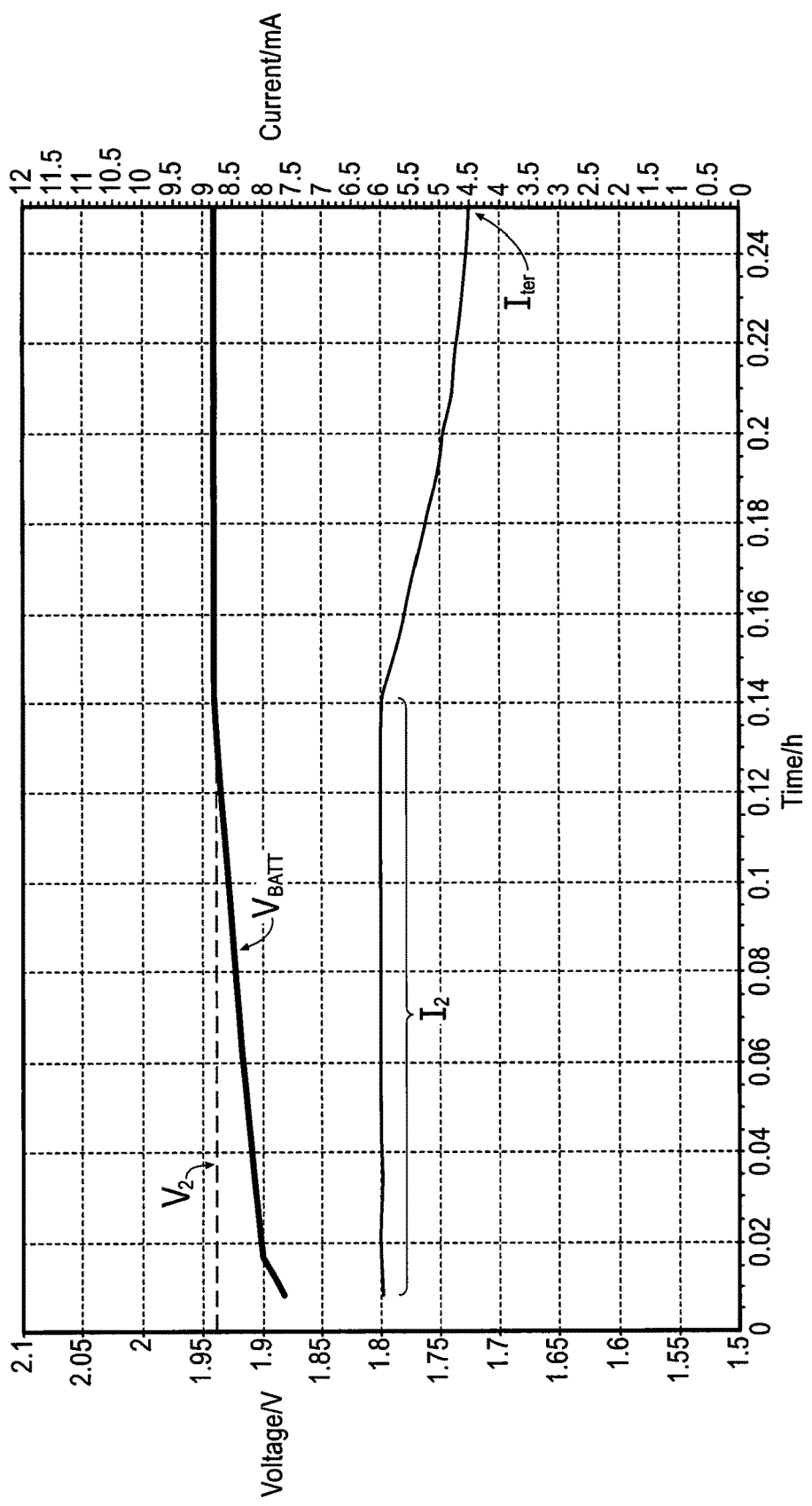
FIG. 4 is a plot of a charge curve for a rechargeable battery having at least one voltage plateau, wherein the battery voltage and charging current are plotted as the battery is charged until the charge current, $I_2$, reaches a terminal charge current, $I_{ter}$, according to one method of the present invention where $V_{Batt} > V_1 > V_{P1}$.
Figure 5:
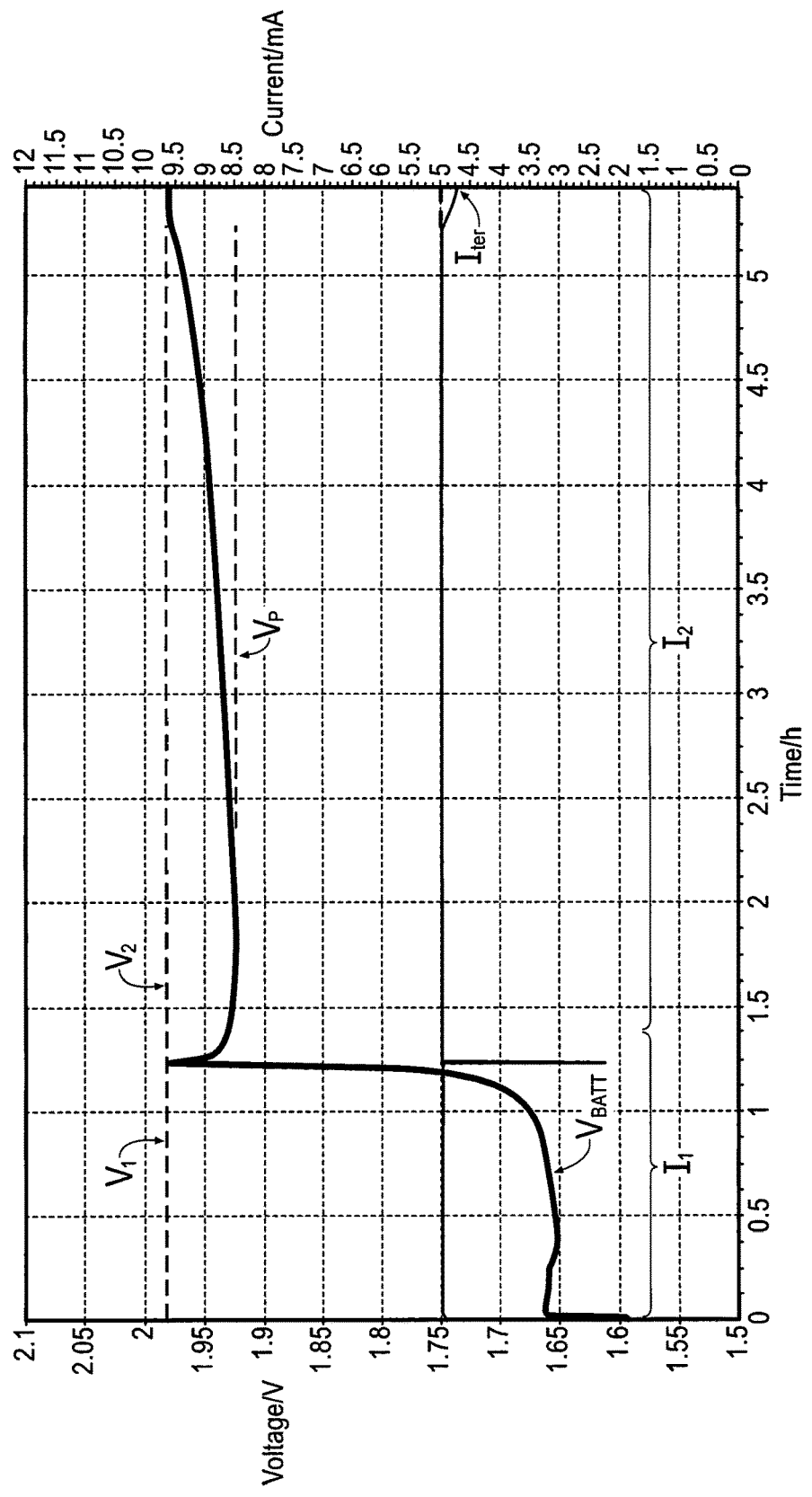
FIG. 5 is a plot of a charge curve for a rechargeable battery having at least one voltage plateau, wherein the battery is charged according to a multiple zone charging method of the present invention wherein the battery is charged to a first voltage $V_1$ with charge current $I_1$, then battery is charged to voltage $V_2$ with charge current $I_2$, and voltage $V_1$ is about equal to voltage $V_2$.

Some methods of the present invention are useful for recharging a battery having a relatively high initial SOC. Referring to FIG. 4, the present invention provides a method of charging a rechargeable battery having multiple voltage plateaus and an initial SOC of greater than 50% of its rated capacity, wherein the battery has a voltage, $V_{Batt}$, that is less than or equal to its highest voltage plateau comprising:

a. Charging the battery with a substantially constant charging current, $I_2$, until the battery is charged to a voltage, $V_2$; and b. Controlling the charging current, $I_2$, so that the voltage of the battery is maintained at $V_2$ with a deviation of no more than about ±20% of $V_2$, wherein voltage, $V_2$, is greater than or equal the voltage of a voltage plateau, $V_P$, that is less than the voltage of a natural polarization peak, $V_{PP}$.

Some methods further comprise:

c. Terminating the charging current, $I_2$, when $I_2$ reaches $I_{ter}$, wherein $I_{ter}$ is about 85% or less of $I_2$ during the period when the battery was being charged at $V_2$.

Other methods further comprise further comprise:

d. Terminating the charging current, $I_2$, when $I_2$ reaches $I_{ter}$, wherein $I_{ter}$ is about 75% or less of $I_2$ during the period when the battery was being charged at $V_2$.

And in other methods, $V_2$ is about 2.0 V or less.

In some methods, $I_2$ is about 6 mA. In other methods, $I_{ter}$ is about 4.5 mA.

Other aspects of the present invention incorporate one or more of the methods above into a charge method that is useful for recharging a rechargeable cell and that operates to maximize the rechargeable cell's cycle life.

Examples of additional methods of the present invention are presented in the FIGS. 8A-8D.

One method includes the following steps:

Step 1: Measuring the SOC of the cell.

Step 2A: If the SOC of the cell is greater than about 0.0% and less than or equal to about 40% (e.g., the open circuit voltage (OCV) is greater than about 1.2 V and less than or equal to about 1.7 V), then charging the cell according to a multi-stage charge process (starting at step 3A, below).

Step 2B: If the SOC is greater than about 50% (e.g., the OCV is greater than about 1.7 V (e.g., about 1.85 V or greater)), then charging the cell according to a single stage charge process (starting at step 3B, below).

Step 2C: If the SOC is less than 30% (e.g., the OCV is about 1.2 V or less), then charging the cell according to an over-discharge recovery process (starting at step 3C, below).

Multi-Zone Charge Process

Step 3A (Zone 1 of Multi-zone Charge Process): Charging the cell with a substantially constant charge current, $I_1$, having sufficient amperage to charge the cell to a SOC of from about less than 30% to about 40% of its rated capacity within about 1 hour of charging, wherein the charge current, $I_1$, is controlled such that the cell is charged to a voltage, $V_1$, that is less than its natural polarization peak voltage, $V_{PP}$, for a period of time ending from about 6 s to about 1500 s (e.g., from about 6 s to about 1200 s, from about 6 s to about 900 s, or from about 6 s to about 600 s) after the cell is charged to a voltage of $V_1$, then charging the cell according to stage 2 of the multi-zone charge process.

Step 4A (Zone 2 of Multi-zone Charge Process): Charging the cell with a substantially constant charge current, $I_2$, wherein the charge current is controlled such that the voltage of the cell does not rise above a maximum voltage, $V_2$ that is less than its natural polarization peak voltage, $V_{PP}$; and greater than the voltage of the voltage plateau; clocking the time that the cell is charged with a charge current of $I_2$, and terminating the charge current about 60 s after the battery is charged to an SOC of 85% or higher (e.g., from about 85% to about 150% or from about 85% to about 130%) of its rated capacity.

1. Single Zone Charge Process

Step 3B: Charging the cell with a charge current, $I_2$, wherein the charge current is controlled such that the voltage of the cell does not rise above a maximum voltage, $V_2$ that is less than its natural polarization peak voltage, $V_{PP}$; and greater than the voltage of the voltage plateau; clocking the time that the cell is charged with a charge current of $I_2$ to a voltage of $V_2$, and terminating the charge current about 60 s after the cell is charged to an SOC of 85% or higher (e.g., from about 80% to about 150% or from about 80% to about 110%) of its rated capacity.

2. Over-Discharge Recovery Process

Step 3C: Charging the cell with a constant charge current, $I_{recov}$, until the cell is charged to a voltage, $V_{P1}$, of the first sequential voltage plateau (e.g., an SOC of about less than about 30% or an SOC of less than about 5% of the cell's rated capacity), followed by charging the cell according to the multi-stage charge method described above.

Each of the abovementioned charging methods (e.g., the multi-stage charge process, the single-stage charge process, or the over-discharge recovery charge process) is exemplified in FIGS. 2, 4, 5, 6, and 8A-8D.

Referring now to FIG. 2, a charge curve that is related to the "multi-zone charge mode" of a silver-zinc cell is shown according to an embodiment of the invention. In an embodiment, the charge curve includes two corresponding curves, which are plotted against time and read left-to-right. In an embodiment, the first curve, starting at about 1.65 V, is the voltage of the silver-zinc cell after charging has commenced, and, in an embodiment, the second curve, starting at about 8.5 mA is the charge current of the silver-zinc cell.

Figure 1:
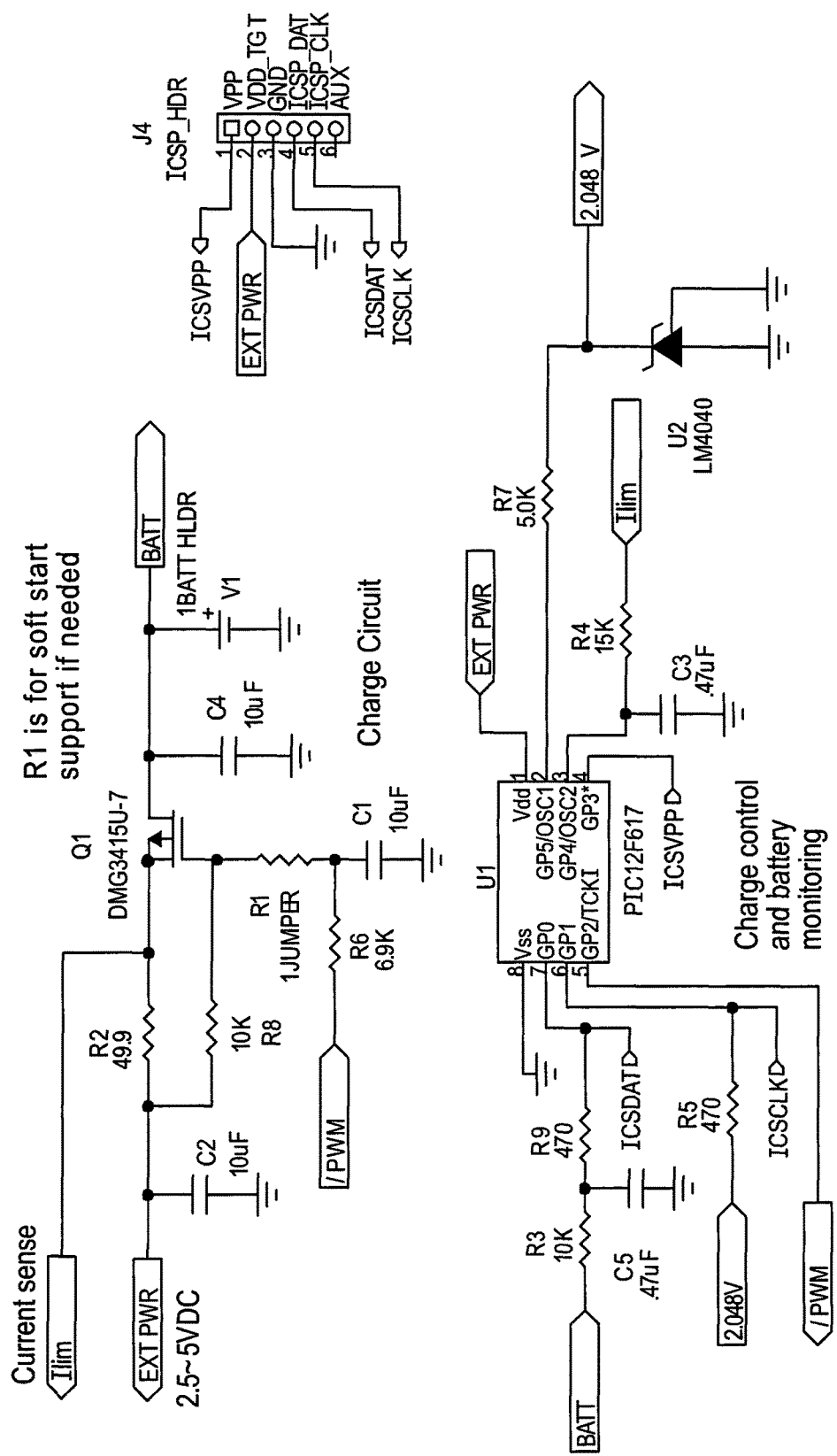
FIG. 1 is a circuit diagram for battery charging circuitry that is capable of performing an exemplary method for charging a rechargeable battery or button cell according to one embodiment of the present invention.

In view of what is described above, in an embodiment, recharging management circuitry, such as the circuitry illustrated in FIG. 1, useful for practicing the method of the present invention may be located within a charging base, which may be described as a current-limited voltage source. In other embodiments, the management circuitry may be split between the charging base, the battery, an electronic device powered by the battery, or any combination thereof. Accordingly, the recharging management circuitry may include the hardware for implementing the charge method and cause the charging base to deliver the first charge current, $I_1$, when the SOC of the silver-zinc cell is less than about 40%, wherein the first charge current, $I_1$, is controlled so that the voltage of the battery does not exceed $V_1$. When the battery is charged to voltage $V_1$, and for a period of no more than 1500 s (e.g., about 1200 s, about 900 s, or about 600 s), the recharging management circuitry may cause the charging base to deliver a second charge current, $I_2$, wherein the second charge current is controlled so that the cell is not charged above a second maximum voltage level, $V_2$, wherein $V_2$ is less than or equal to $V_1$. Further, in an embodiment, the charging method for charging of the silver-zinc cell may be terminated when the controlled charge current, $I_2$, is less than or equal to a minimum charge current, $I_{ter}$, for a period of about 60 s (e.g., from about 30 s to about 90 s, or from about 50 s to about 70 s).

Prior to describing further aspects of the method, some aspects of one or more embodiments of the system are provided. In an embodiment, the charge voltage accuracy may be within about ±2 mV between 1.900-2.000 V. In an embodiment, the voltage accuracy may be within about ±25 mV between 1.900-1.200 V. Further, in an embodiment, the charge current accuracy may be within about ±0.1 mA.

Further, in an embodiment, the temperature measurement accuracy may be within about ±5° C. (e.g., ±2° C.) and be a measure of the ambient temperature; further, in an embodiment, the temperature measurement does not have to measure the cell case temperature.

In an embodiment, the following limits may also be considered in the design of one or more of the silver-zinc cell, system, and charge methods. In an embodiment, the voltage of the silver-zinc cell may not exceed 2.00 V for more than one (1) second continuously. Further, in an embodiment, any voltage excursion above the 2.00 V limit may result from a charge voltage/current transition while the charging base is stabilizing the charge voltage on the silver-zinc cell. Further, in an embodiment, the charge current, $I_2$ or $I_{ter}$, may not fall below a "trickle" charge level of about 1 mA for more than thirty (30) minutes continuously. Further, in an embodiment, the maximum charge time (at about room temperature) of a silver-zinc cell may be about six (6) hours. Further, in an embodiment, a silver-zinc cell may be charged when ambient temperature conditions are between about approximately about 0° C. and about approximately about 40° C. Further, in an embodiment, the cell current may be integrated during charging and may not exceed 27 mAh in a single charge.

In some methods of the present invention, a discharge warning signal triggers a Coulomb count terminated cycle.

Figure 12:
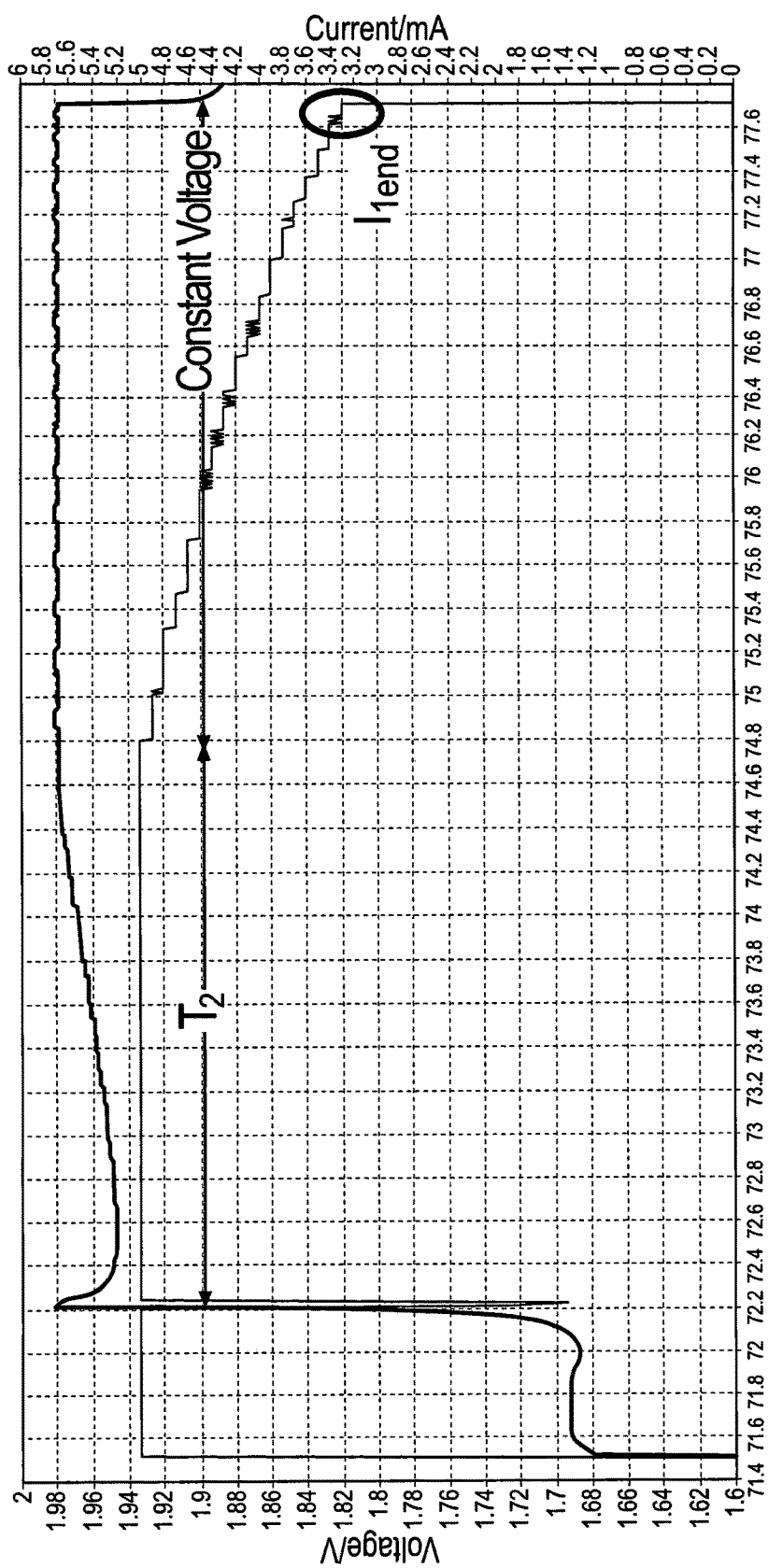
FIG. 12 is a plot of a charge curve for a battery being charged with a multi-zone charge method in accordance with an exemplary embodiment of the invention.
Figure 13:
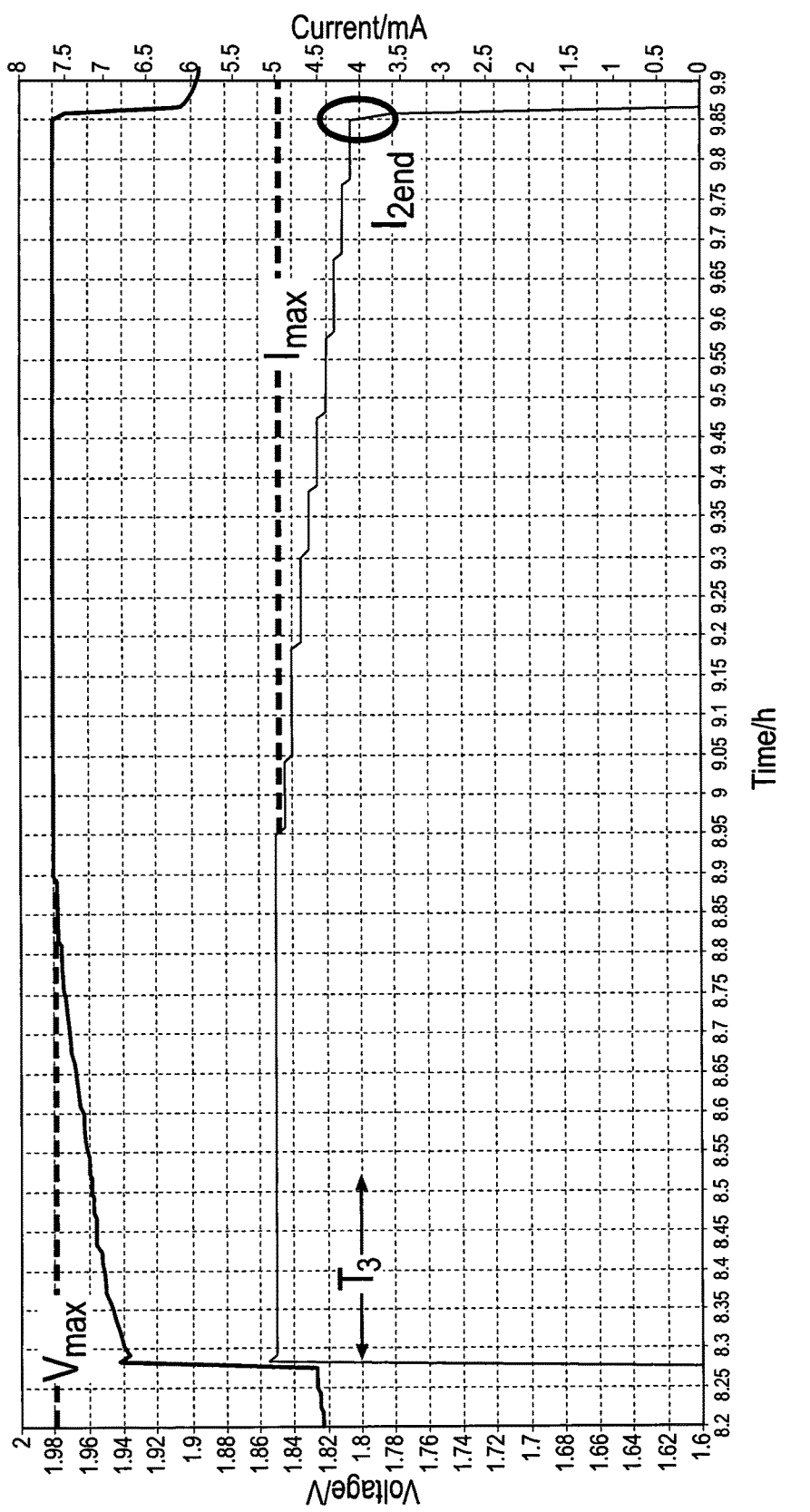
FIG. 13 is a plot of a charge curve for a battery having an SOC of about 50% or more being charged in accordance with an exemplary embodiment of the invention.
Figure 14:
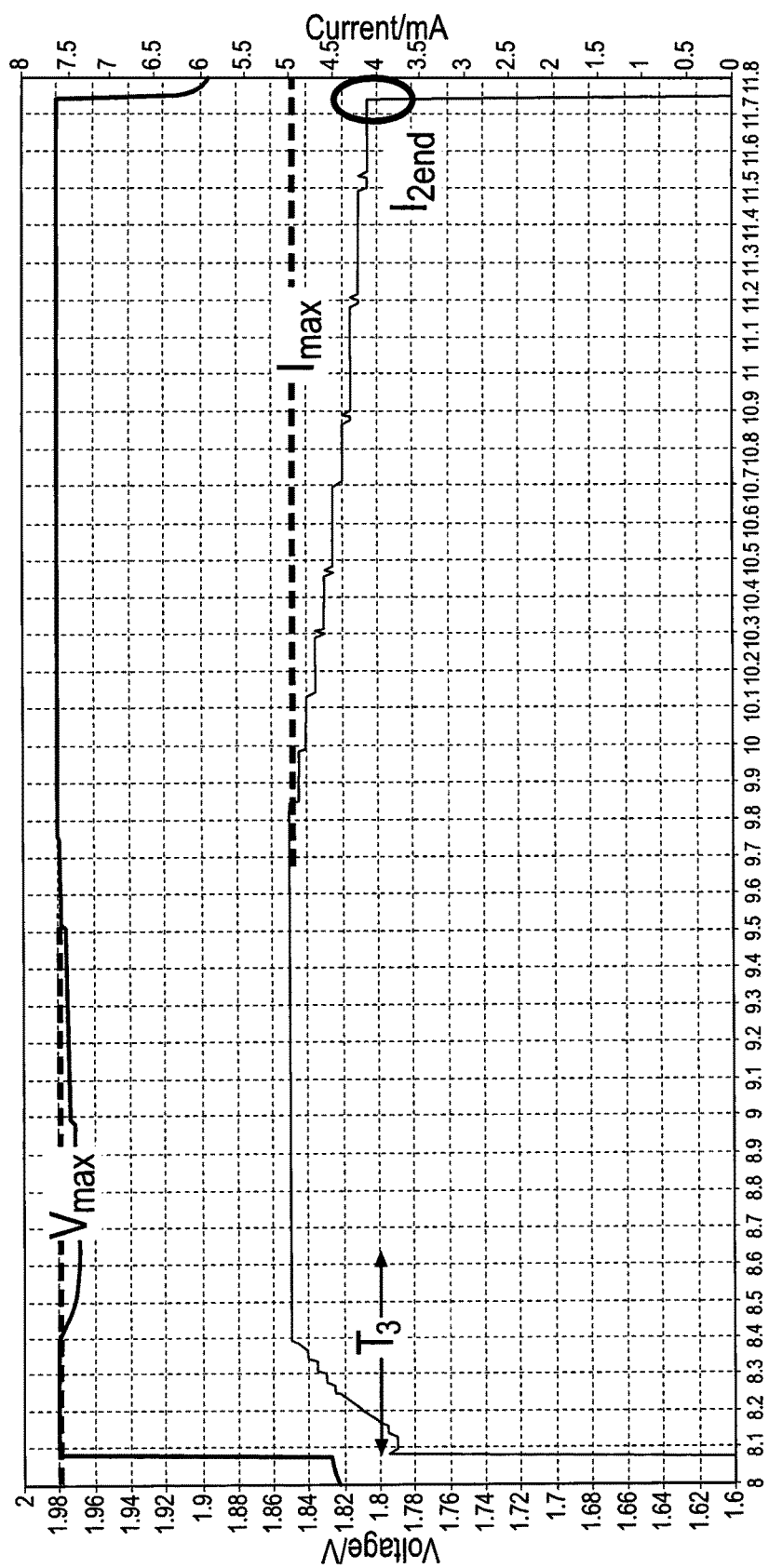
FIG. 14 is a plot of a charge curve for a battery having an SOC of about 50% or more being charged in accordance with an exemplary embodiment of the invention.
Figure 15:
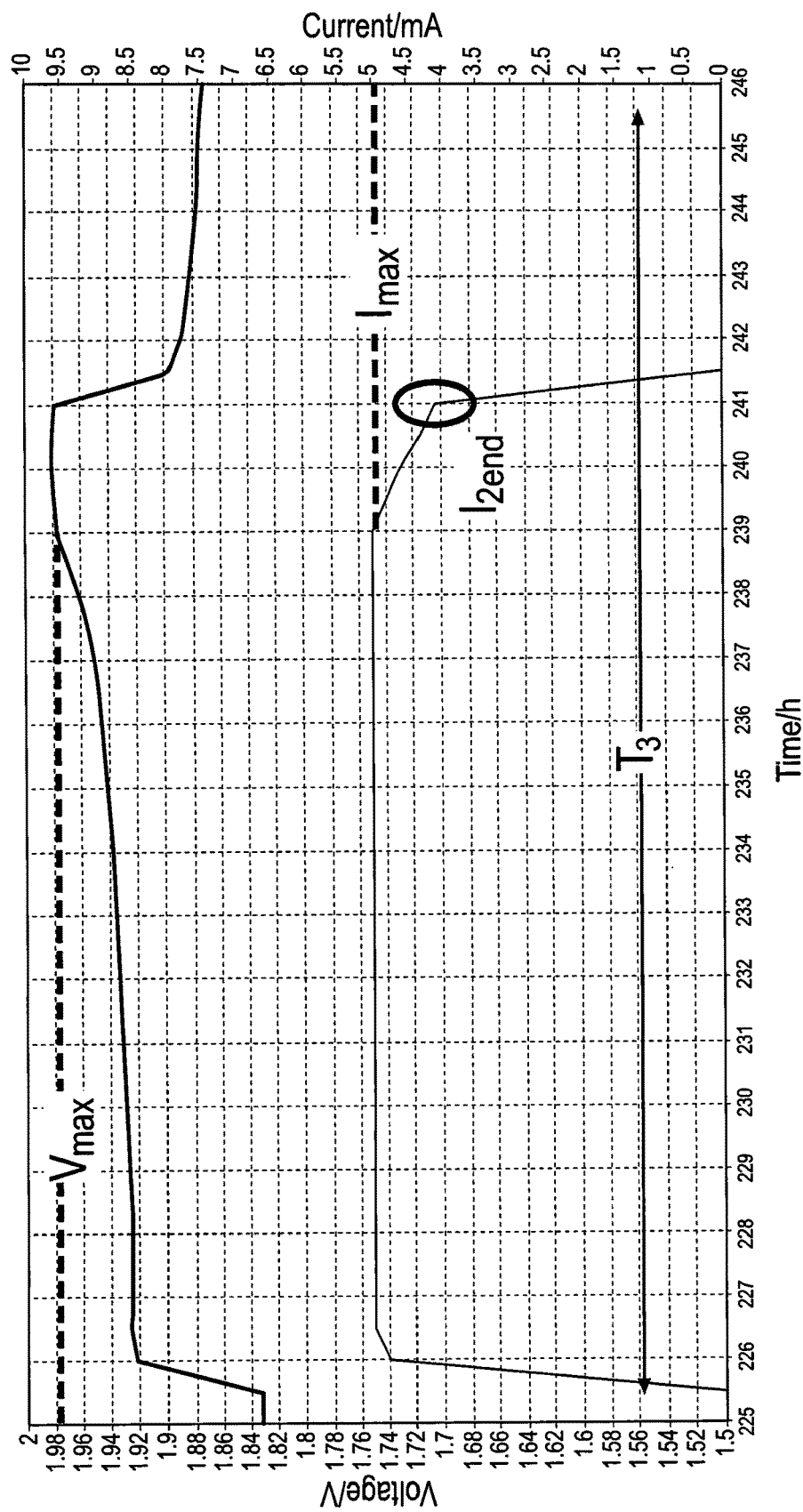
FIG. 15 is a plot of a charge curve for a battery having an SOC of about 50% or more being charged in accordance with an exemplary embodiment of the invention.
Figure 16:
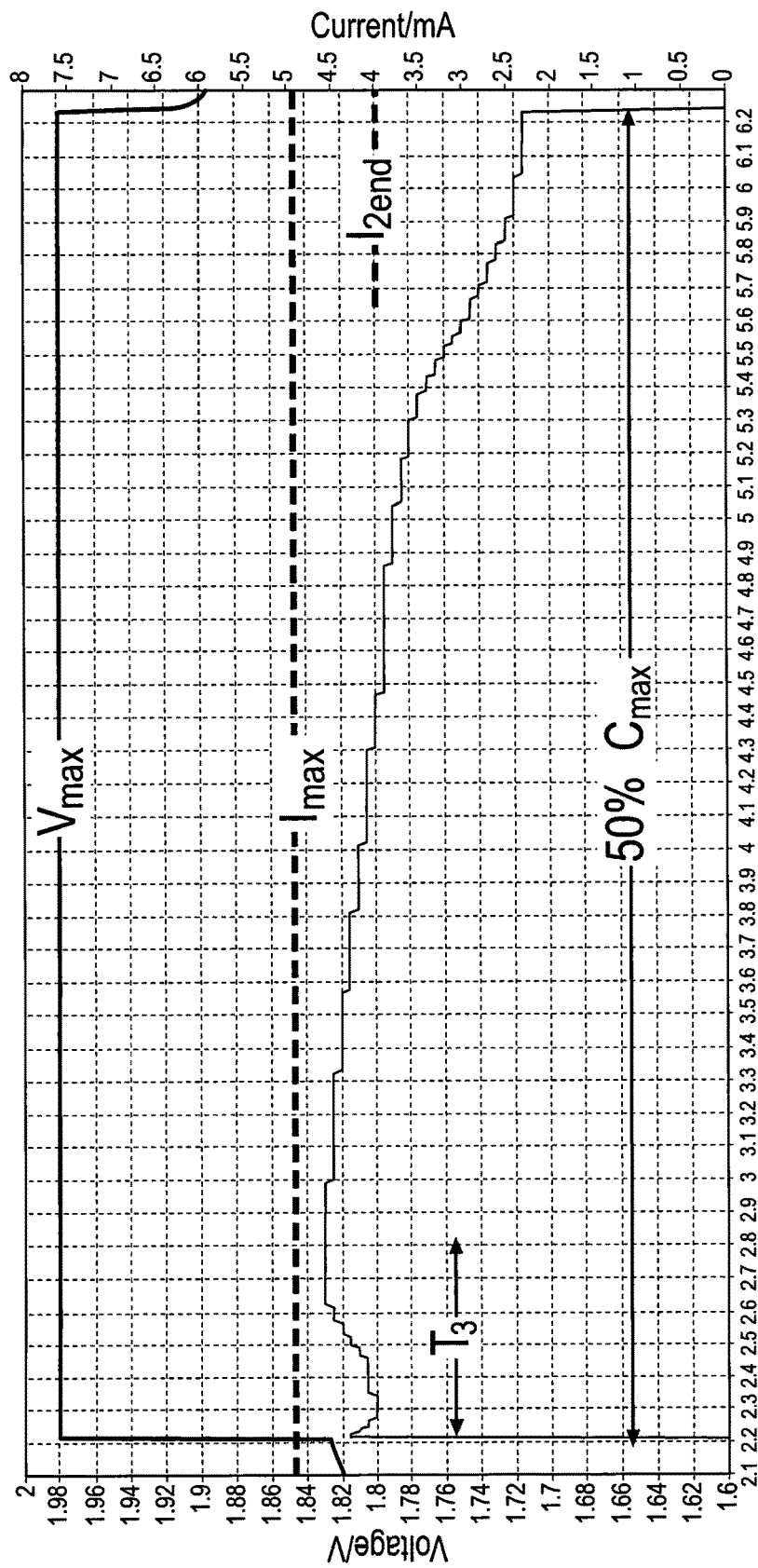
FIG. 16 is a plot of a charge curve for a battery having an SOC of about 50% or more being charged in accordance with an exemplary embodiment of the invention.
Figure 17:
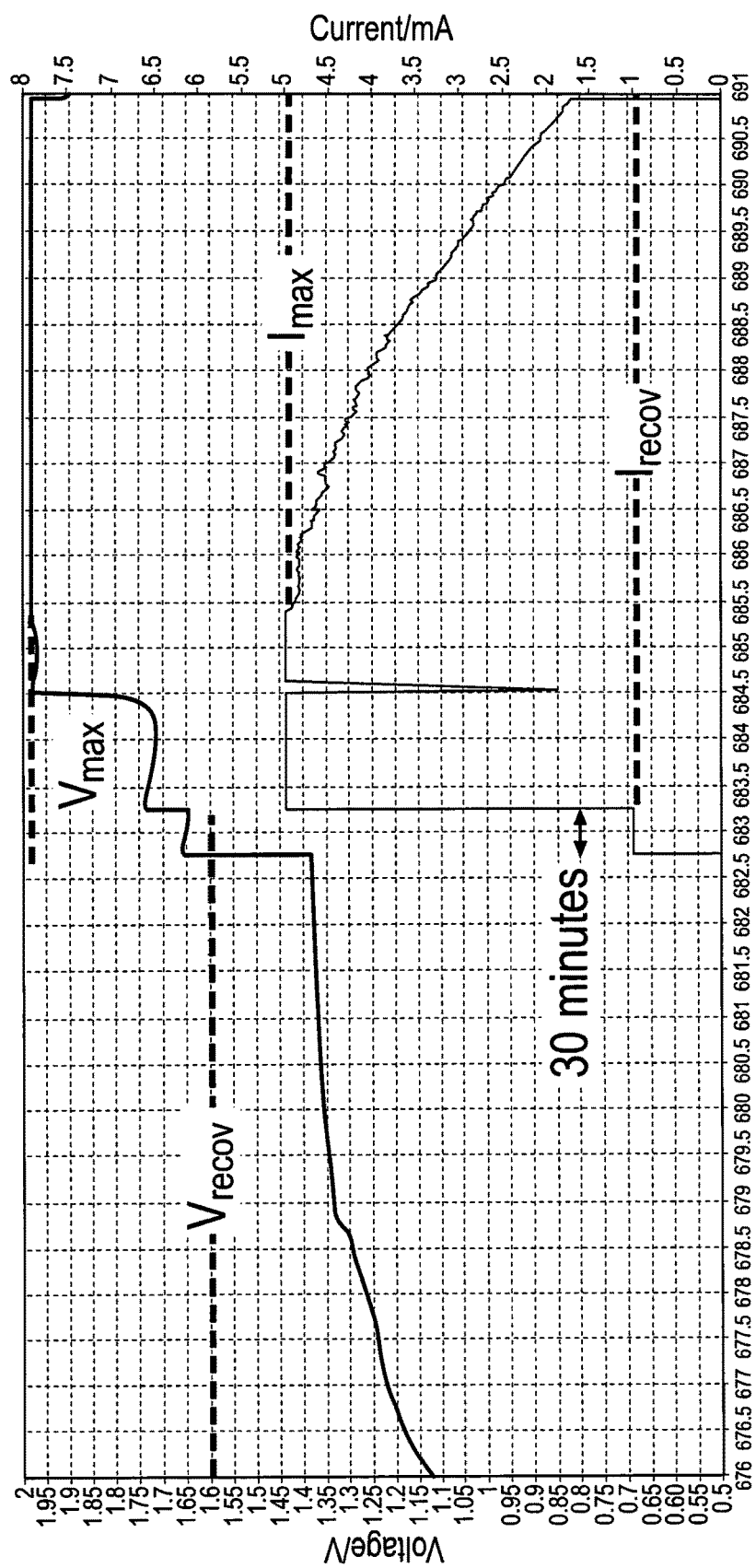
FIG. 17 is a plot of a charge curve for a battery having an OCV of about 1.25 V or less being charged in accordance with an exemplary embodiment of the invention.

B. Charging Method 2:

Referring to FIGS. 10-17, another aspect of the present invention provides a method of charging a rechargeable battery having multiple voltage plateaus comprising:

a) Continuously charging the battery with a modulated charge current, $I_1$, wherein the charge current, $I_1$, has a maximum amperage, $I_{max}$, and is modulated so that the voltage of the battery is restricted to $V_{max}$, which is less than the voltage of the next sequentially higher natural polarization peak, $V_{PP}$, and higher than the next sequentially higher voltage plateau; and b) Arresting the charge current, $I_1$, when the charge current reaches a minimum threshold amperage for a given period of time (e.g., $I_{1end}$ in FIG. 12 or $I_{2end}$ in FIGS. 13-16).

In some embodiments, the minimum threshold amperage, $I_{end}$, is calculated as follows:

$$I_{end}=I_{Chg}+I_{Temp}I_{Chg}=(T_2 \times I_{max})/T_{Chg}, \text{ wherein}$$

$I_{Temp}$ is the temperature compensation current, $T_2$ is the time necessary to charge the battery from a voltage of from about 87% to about 96% (e.g., about 95.9%) of $V_{max}$, prior to the polarization peak, to a voltage of $V_{max}$ (e.g., from 1.9 V to a voltage of about 2.05 V or about 2.03 V in a 2 V battery) after the polarization peak. $I_{max}$ is the maximum current charged to the battery, and $T_{Chg}$ is the cell time constant; and the voltages have a deviation of ±0.5%, the current amperages have deviations of ±2%, and clocked times have a deviation of ±2%. This calculation is discussed in detail below.

In some methods, $I_{end}$ is $I_{1end}$. In others, $I_{end}$ is $I_{2end}$.

In other embodiments, the charge current is arrested when the charge current, $I_1$, has an amperage less than or equal to $I_{end}$ for a continuous period of from about 30 s to about 90 s (e.g., 60 s).

In some embodiments, the charge current is arrested when the cell experiences a hard short.

In some embodiments, the charge current is arrested when the cell is determined to be other than a silver zinc cell.

In several methods, $V_{max}$ is 2.03 V or 2.0 V. In other methods, the charge current has a maximum amperage, $I_{max}$, of about 10 mA or less (e.g., about 6 mA or less). For example, the charge current has a maximum amperage, $I_{max}$, of 5.5 mA or less.

And, some methods include measuring the temperature, wherein the temperature measurement accuracy has a deviation of ±5° C.

Another aspect of the present invention provides a method of charging a rechargeable battery having multiple voltage plateaus comprising:

a) Charging the battery with a modulated charge current, $I_1$, wherein the charge current, $I_1$, has a maximum amperage, $I_{max}$, and is modulated so that the voltage of the battery is restricted to $V_{max}$, which is less than the voltage of the next sequentially higher natural polarization peak, $V_{PP}$, and higher than the next sequentially higher voltage plateau;

b) Arresting charge current $I_1$ after a period of from about 10 min to about 30 min (e.g., about 20 min) has elapsed starting from the point when the battery has a voltage of from about 87% to about 97% of $V_{max}$; and c) Charging the battery with a modulated charge current, $I_2$, wherein the charge current, $I_2$, has a maximum amperage, $I_{max}$, and is modulated so that the voltage of the battery is restricted to $V_{max}$.

Some embodiments further comprise arresting charge current $I_2$ when the amperage of $I_2$ is below $I_{2end}$ for a period of from about 30 to about 90 (e.g., about 60) continuous seconds.

Some embodiments further comprise arresting charge current $I_2$ once the battery is charged to an SOC of about 50%, if the lowest amperage of $I_2$, $I_{2low}$, is less than the amperage of charge current $I_2$ after 20 minutes has been clocked, wherein the SOC of the battery is determined by integrating the charge current while time is being clocked.

Some embodiments further comprise arresting charge current $I_1$ when the amperage of $I_1$ is below $I_{1min}$, e.g., 1.0 V, for a period of about 5 min or less.

In some embodiments, the voltages have a deviation of ±0.5%; the charge current amperages have deviations of ±2%; and clocked time has a deviation of ±2%.

Figure 11:
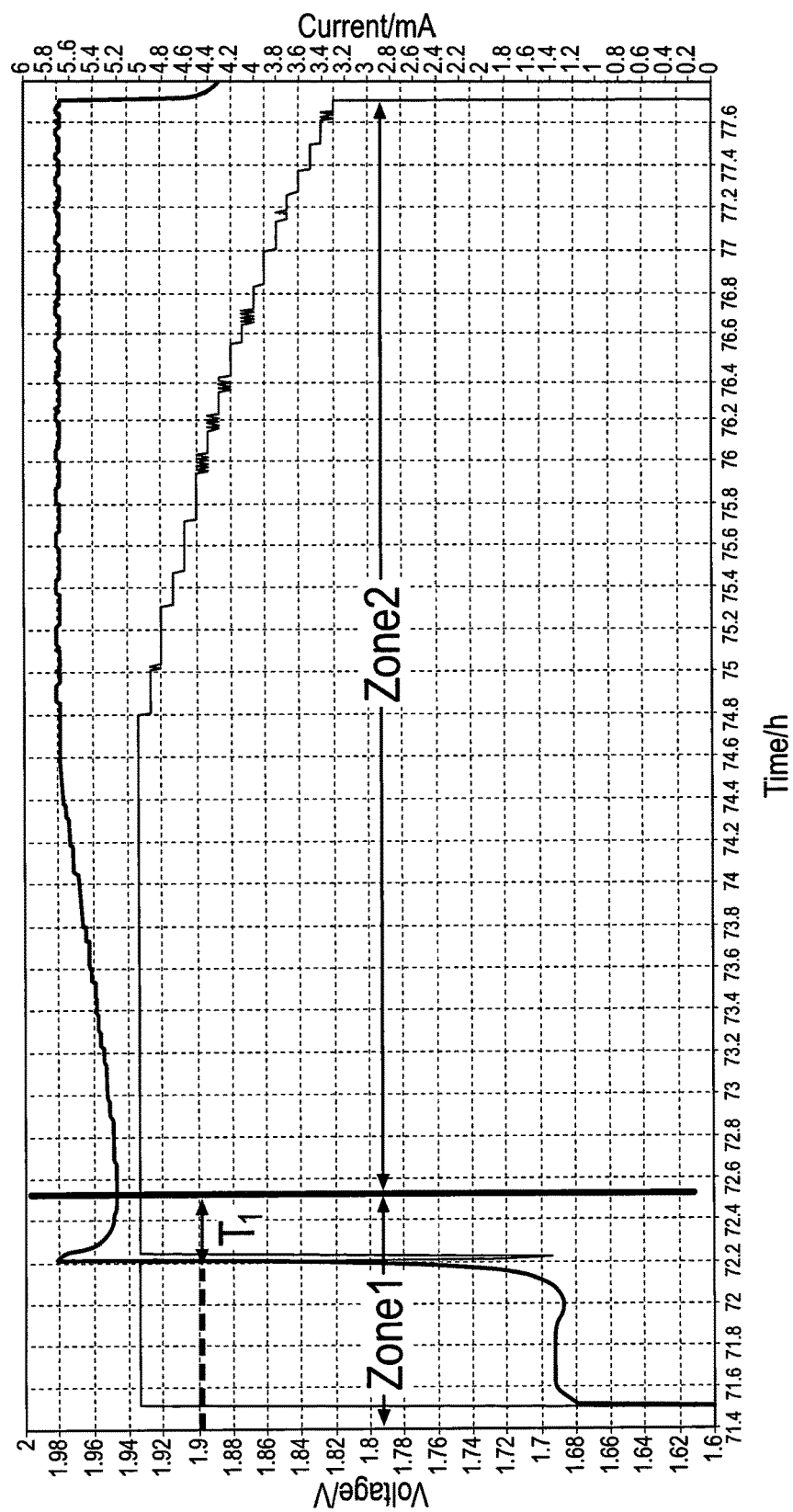
FIG. 11 is a plot of a charge curve for a battery being charged with a multi-zone charge method in accordance with an exemplary embodiment of the invention.

Another aspect of the present invention provides a method of charging a 2.0 V rechargeable battery comprising:

a) Charging the battery with a modulated charge current $I_2$, wherein the charge current, $I_2$, is modulated so that the voltage of the battery is restricted to 2.0 V or less (e.g., 1.98 V), and the charge current has a maximum amperage, $I_{max}$, of 6.0 mA or less (e.g., 5.5 mA or 5.0 mA);

b) Clocking time 15 seconds after charging begins (shown in FIG. 11 as the start of period $T_1$);

c) Measuring the amperage of charge current, $I_2$, when time is being clocked; and d1) Arresting charge current $I_2$ when the amperage of $I_2$ is below $I_{2end}$ for a period of 60 continuous seconds if the amperage of $I_2$ is $I_{max}$ for a period of 5 or more continuous seconds when time is being clocked, wherein $I_{2end}$ is the temperature dependent minimum charge current necessary to maintain a voltage of 2.0 V in the battery when the battery is charged to an SOC of about 100% of its rated capacity; or d2) Arresting charge current $I_2$ once the battery is charged to an SOC of about 100% to about 150%, if the amperage of $I_2$ is $I_{max}$ for a period of less than 5 continuous seconds when time is being clocked, wherein the SOC of the battery is determined by integrating the charge current while time is being clocked; or d3) Arresting charge current $I_1$ when the amperage of $I_1$ is below $I_{1min}$ (e.g., 1.0 mA), for a period of about 5 min or less, wherein the voltages have a deviation of ±0.5%; the charge current amperages have deviations of ±2%; and clocked time has a deviation of ±2%.

Some methods further comprise charging the battery with a second modulated charge current $I_2$, wherein the second charge current $I_2$ is modulated so that the voltage of the battery is restricted to 2.0 V or less, and the charge current amperage is restricted to a maximum amperage, $I_{max}$, of 5.0 mA; clocking time when the voltage of the battery is 1.9 V; and continuously charging the battery with charge current $I_2$ until 20 minutes has been clocked.

In some instances, the battery being charged is a size 10, 13, 312, or 675 rechargeable silver-zinc button cell.

Another aspect of the present invention provides a method of charging a rechargeable 2.0 V silver-zinc battery comprising charging the battery with a charge current, $I_2$, having a maximum amperage, $I_{max}$, of about 10 mA or less (e.g., about 6 mA or less) wherein the charge current $I_2$ is modulated so that the voltage of the battery is restricted to about 2.03 V or less; clocking time 60 seconds after charging with second charge current, $I_2$, begins; measuring the lowest amperage, $I_{low}$, of charge current $I_2$ when time is being clocked; and arresting charge current $I_2$ once the battery is charged with from about 40% to about 60% (e.g., about 50%) of its rated capacity with charge current, $I_2$, wherein the capacity charged to the battery is determined by integrating the charge current, $I_2$, while time is being clocked; and the voltages have a deviation of ±0.5%, the current amperages have deviations of ±2%, and clocked times have a deviation of ±2%.

In some embodiments, the battery has an OCV of greater than about 1.6 V (e.g., greater than about 1.65 V or greater than about 1.7 V) in its discharged state, i.e., immediately before charging.

Another aspect of the present invention provides a method of charging a rechargeable 2.0 V silver-zinc battery comprising charging the battery with a charge current, $I_2$, having a maximum amperage, $I_{max}$, of about 10 mA or less (e.g., about 6 mA or less) wherein the charge current $I_2$ is modulated so that the voltage of the battery is restricted to about 2.03 V or less; clocking time 60 seconds after charging with second charge current, $I_2$, begins; measuring the lowest amperage, $I_{low}$, of charge current $I_2$ when time is being clocked; and arresting charge current $I_2$ when the amperage of $I_2$ is below $I_{end}$ for a period of 60 continuous seconds if the amperage of $I_2$ is $I_{max}$ for a period of 2 continuous seconds while time is being clocked; or arresting charge current $I_2$ once the battery is charged with from about 40% to about 60% (e.g., about 50%) of its rated capacity with charge current $I_2$, if $I_{low}$ is less than the amperage of charge current $I_2$ after 20 minutes has been clocked, wherein the capacity charged to the battery is determined by integrating the charge current, $I_2$, while time is being clocked; or arresting charge current $I_2$ when the amperage of $I_2$ is below $I_{end}$ for a period of 60 continuous seconds, if $I_{low}$ is greater than or equal to the amperage of $I_2$ after 20 minutes has been clocked; or arresting charge current $I_2$ when the amperage of $I_2$ is below 1.0 V, for a period of about 5 min or less; wherein $I_{end}=I_{Chg}+I_{Temp}$, $I_{Chg}=(T_2 \times I_{max})/T_{Chg}$, $I_{Temp}$ is the temperature compensation current, $T_2$ is the time necessary to charge the battery from a voltage of about 1.9 V to a voltage of about 2.0 V, $I_{max}$ is the maximum current charged to the battery, and $T_{Chg}$ is the cell time constant; and the voltages have a deviation of ±0.5%, the current amperages have deviations of ±2%, and clocked times have a deviation of ±2%.

In some embodiments, the battery has an OCV of greater than about 1.6 V (e.g., greater than about 1.65 V or greater than about 1.7 V) in its discharged state.

Some embodiments further comprise measuring the temperature, wherein the temperature measurement has accuracy of about ±5° C. (e.g., ±2° C.).

Another aspect of the present invention provides a method of charging a rechargeable 2.0 V silver-zinc battery comprising charging the battery with first charge current, $I_1$, having a maximum amperage, $I_{max}$, of about 10 mA or less (e.g., about 6 mA or less); clocking time once the battery is charged to a voltage of 1.90 V; modulating the first charge current, $I_1$, so that the voltage of the battery is restricted to about 2.03 V or less; arresting the first charge current, $I_1$, once from between about 10 min to about 30 min (e.g., about 20 min) has been clocked; charging the battery with second charge current, $I_2$, having a maximum amperage, $I_{max}$, of about 10 mA or less (e.g., about 6 mA or less) wherein the second charge current $I_2$ is modulated so that the voltage of the battery is restricted to about 2.0 V or less; clocking time 60 seconds after charging with second charge current, $I_2$, begins; measuring the lowest amperage, $I_{low}$, of charge current $I_2$ when time is being clocked; and arresting charge current $I_2$ when the amperage of $I_2$ is below $I_{end}$ for a period of 60 continuous seconds if the amperage of $I_2$ is $I_{max}$ for a period of 2 continuous seconds while time is being clocked; or arresting charge current $I_2$ once the battery is charged with from about 40% to about 60% (e.g., about 50%) of its rated capacity with charge current $I_2$, if $I_{low}$ is less than the amperage of charge current $I_2$ after 20 minutes has been clocked, wherein the capacity charged to the battery is determined by integrating the charge current, $I_2$, while time is being clocked; or arresting charge current $I_2$ when the amperage of $I_2$ is below $I_{end}$ for a period of 60 continuous seconds, if $I_{low}$ is greater than or equal to the amperage of $I_2$ after 20 minutes has been clocked; or arresting charge current $I_2$ when the amperage of $I_2$ is below 1.0 V, for a period of about 5 min or less; wherein $I_{end}=I_{Chg}+I_{Temp}$, $I_{Chg}=(T_2 \times I_{max})/T_{Chg}$, $I_{Temp}$ is the temperature compensation current, $T_2$ is the time necessary to charge the battery from a voltage of about 1.9 V to a voltage of about 2.0 V, $I_{max}$ is the maximum current charged to the battery, and $T_{Chg}$ is the cell time constant; and the voltages have a deviation of ±0.5%, the current amperages have deviations of ±2%, and clocked times have a deviation of ±2%.

Some of these methods further comprise measuring the temperature, wherein the temperature measurement has an accuracy of about ±5° C. (e.g., ±2° C.).

In some embodiments, the maximum amperage, $I_{max}$, is about 6 mA or less. For example, $I_{max}$ is about 5.5 mA or less.

In other embodiments, the battery has an OCV of less than about 1.70 V (e.g., about 1.65 V or less) in its discharged state.

In some embodiments, the OCV of the battery is greater than 1.25 V prior to charging.

In other embodiments, the OCV of the battery is less than 1.25 V prior to charging.

Some embodiments further comprise charging the battery with a recovery charge current of 1.0 mA for a period of at least 20 minutes (e.g., at least 30 minutes); and arresting the recovery charge current when the battery is charged to a voltage of about 1.50 V or more (e.g., about 1.6 V).

Figure 8D:
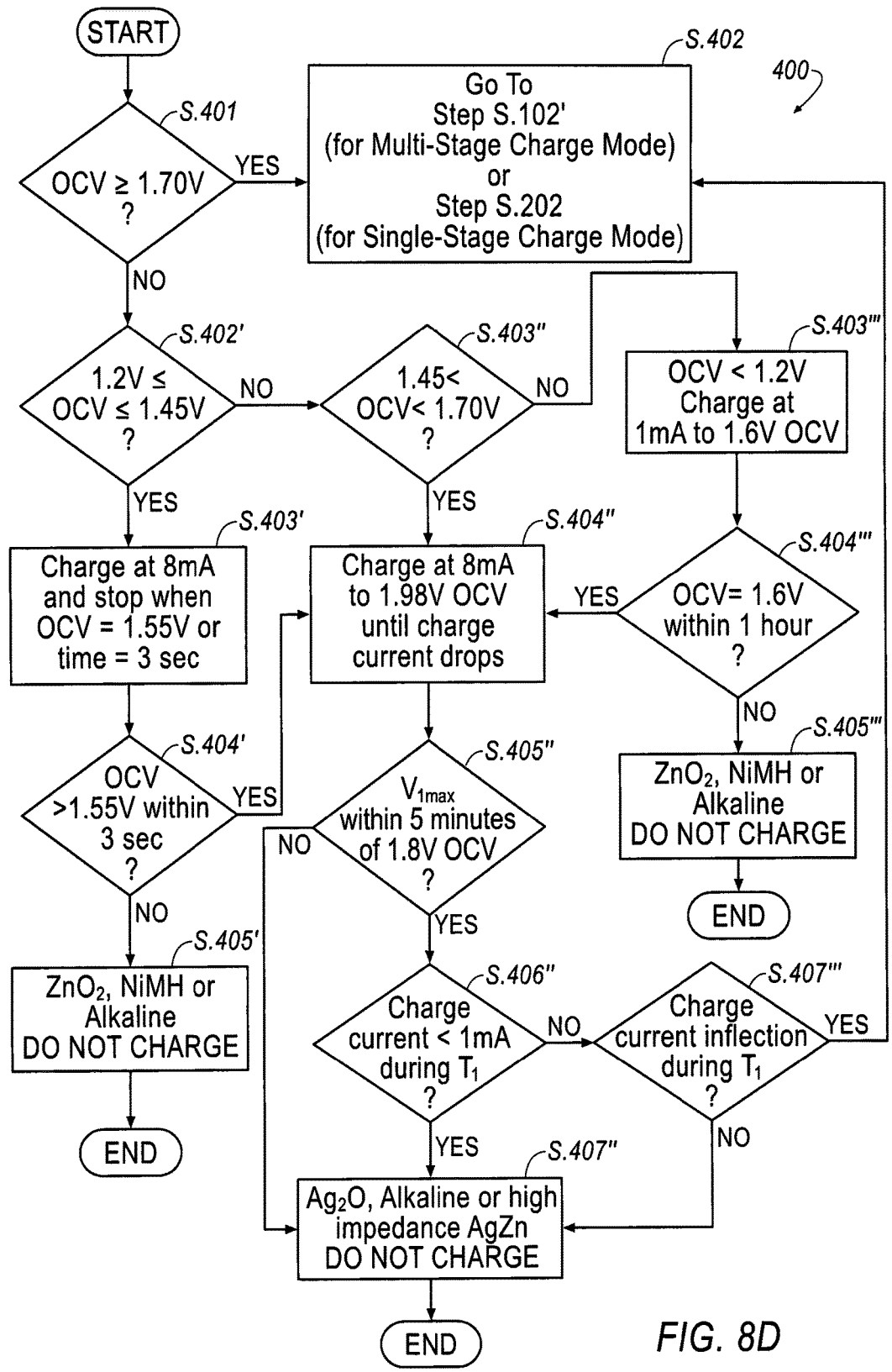
FIG. 8D is a step-diagram representing another exemplary method for recharging a rechargeable battery having at least one voltage plateau according to one embodiment of the invention.
Figure 9:
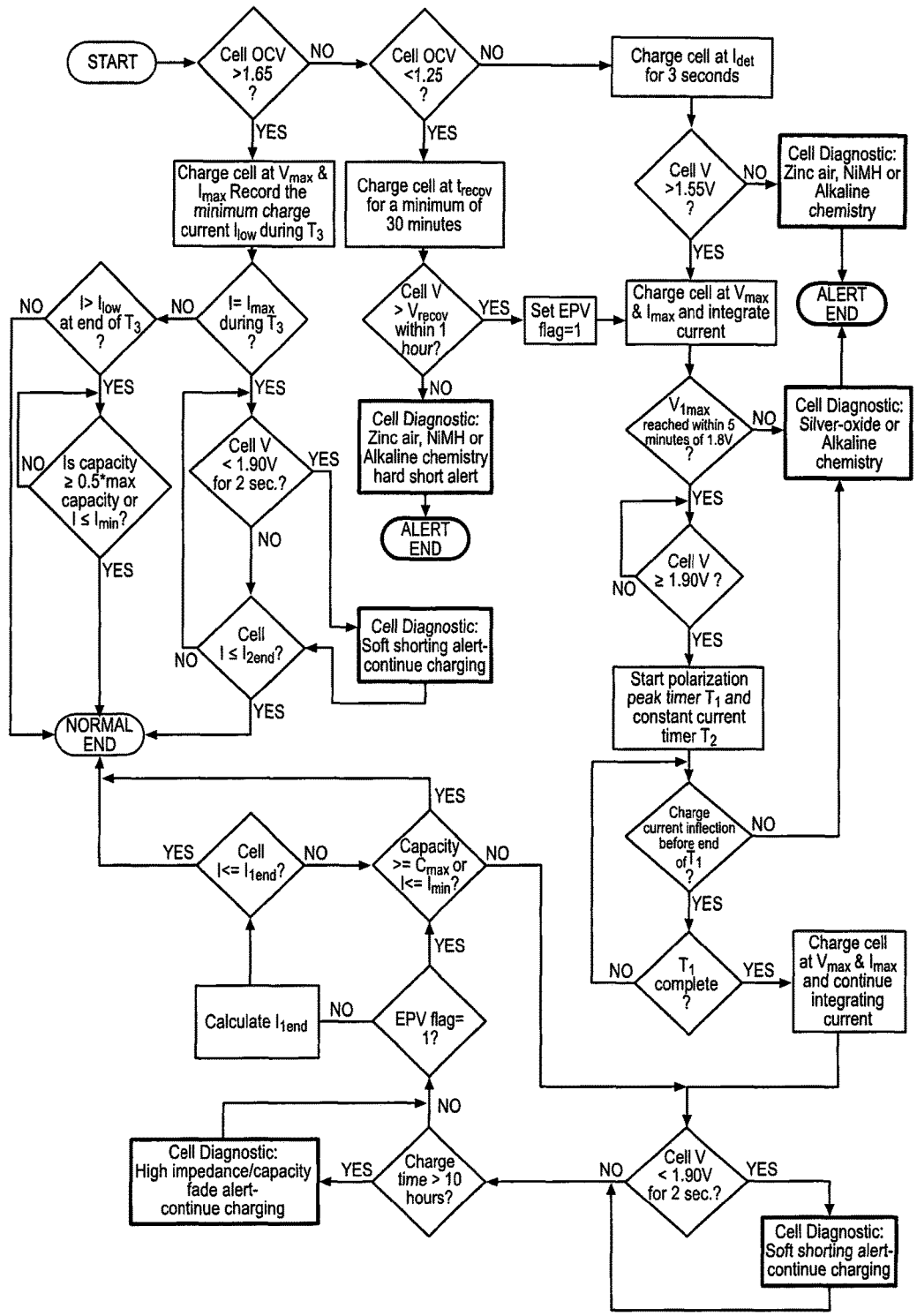
FIG. 9 is a step-diagram representing another exemplary method for recharging a rechargeable battery having at least one voltage plateau according to one embodiment of the invention.
Figure 10:
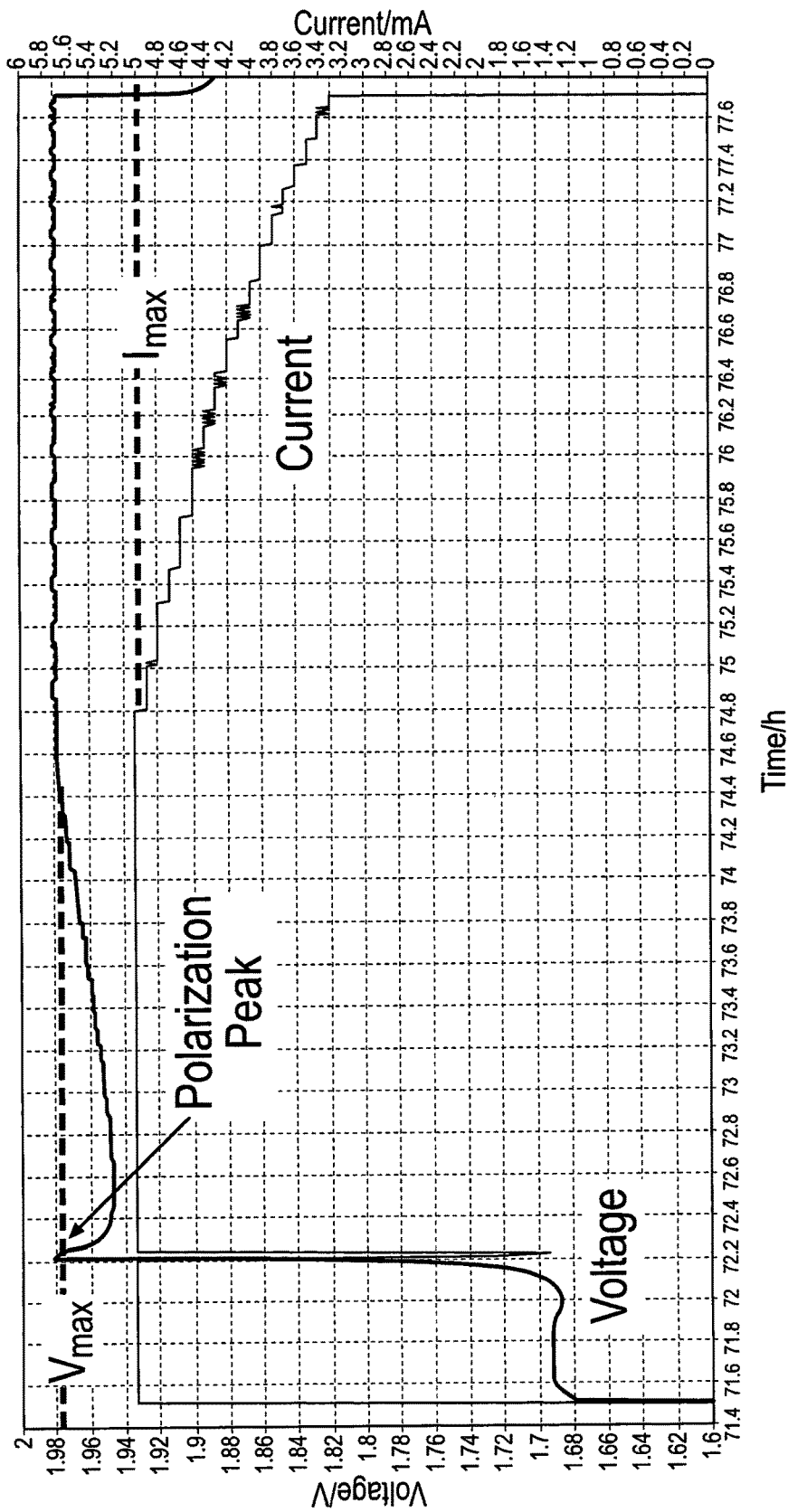
FIG. 10 is a plot of a charge curve for a battery being charged with a multi-zone charge method in accordance with an exemplary embodiment of the invention.

Other exemplary methods are provided, as a step-diagrams, in FIGS. 8A-9.

In some methods, the battery charger is a current limited voltage source. When cell impedance is low the charger delivers maximum allowed current as set by the charge method. As cell impedance increases, cell voltage rises to the maximum allowed voltage, and the charge current is modulated, i.e., reduced, to maintain the battery's voltage at the maximum allowed voltage.

In some methods, the charge voltage accuracy has a deviation of ±0.5% (e.g., ±10 mV between 1.200-2.000 V). In other methods, the charge current accuracy has a deviation of ±2% (e.g., ±0.1 mA between 1-5 mA). In some methods, time is measured or clocked with an accuracy of ±2% (e.g., for a 5 hour time period, the accuracy is ±0.1 hours). And, in some methods, the temperature measurement accuracy has a deviation of ±5° C. (e.g., ±2° C.). The temperature measurement does not have to measure the cell case temperature, only the ambient temperature.

In some methods, the cell voltage does not exceed 2.00 V for more than 1 second continuously. Voltage excursions above this voltage limit should be due to a charge voltage/current transition while the charger is stabilizing the charge voltage on the cell. In FIGS. 10 and 13-17, the maximum charge voltage for the cell is labeled as $V_{max}$. Voltage ripple is allowed in these charge methods, but the peak should not exceed 2.0V.

In some methods, $V_{max}$ is 1.98 V.

In some methods, the cell charge current does not fall below a minimum level, $I_{min}$ for more than 5 minutes continuously. The maximum charge current for the cell is $I_{max}$. Current ripple is allowed but the voltage peak should not exceed 2.0 V. In some methods, $I_{min}$ is 1.0 mA. In other methods, $I_{max}$ is 5.0 mA (e.g., $I_{max}$ is 5.0 mA when the rated capacity of the battery is 31 mAh). In some methods, $I_{max}$ is 5.5 mA (e.g., $I_{max}$ is 5.5 mA when the rated capacity of the battery is 35 mAh).

1. Deep Discharge (Zone 1)

Another aspect of the present invention provides a method of charging a rechargeable 2.0 V silver-zinc battery having an voltage (e.g., OCV) of less than 1.7 V comprising:

a) Charging the battery with first charge current, $I_1$, having an amperage of 6.0 mA or less (e.g., 5.5 mA or 5.0 mA);

b) Clocking time once the battery is charged to a voltage of 1.90 V;

c) Modulating the first charge current so that the voltage of the battery is restricted to 2.0 V or less, and the first charge current has a maximum amperage, $I_{max}$, of about 10 mA or less (e.g., about 6.0 mA or less, about 5.5 mA or about 5.0 mA);

d) Continuously charging the battery with the first charge current until 20 minutes has been clocked and arresting the first charge current;

e) Charging the battery with second charge current $I_2$, wherein the charge current $I_2$ is modulated so that the voltage of the battery is restricted to 2.0 V or less, and the second charge current has a maximum amperage, $I_{max}$, of about 10 mA or less (e.g., about 6.0 mA or less, about 5.5 mA or about 5.0 mA);

f) Arresting charge current $I_2$ when the amperage of $I_2$ is below $I_{2end}$ for a period of 60 continuous seconds, wherein $I_{2end}=I_{Chg}+I_{Temp}$, $I_{Chg}$ is the charge compensation current, $I_{Temp}$ is the temperature compensation current, and $I_{Chg}=(T_2 \times 5.0 \text{ mA})/T_{Chg}$, wherein $T_2$ is the time necessary to charge the battery to a voltage of about 2.0 V with the second charge current, $I_2$, and $T_{Chg}$ is the cell time constant; or g) Arresting charge current $I_2$ when the amperage of $I_2$ is below 1.0 mA, for a period of about 5 min or less, wherein the voltages have a deviation of ±0.5%; the current amperages have deviations of ±2%; and clocked times have a deviation of ±2%.

In some methods, a two zone approach is utilized for charging. Referring to FIGS. 11 and 12, zone 1 includes the steps of the charge method starting from the initial steps through the steps charging the battery to a voltage, $V_{max}$, that is less than the natural polarization peak. Zone 2 includes the steps of the charge method starting from about 30 s to about 90 s after the battery is charged to $V_{max}$ (e.g., at the end of $T_1$ in FIG. 11) and continues until the charge current is terminated. Charging is terminated when the charge current drops to a termination current level in Zone 2. The termination current level depends on which zone the cell started charging.

In some methods, as illustrated in FIG. 11, when the battery voltage (e.g., OCV) is less than or equal to 1.7 V prior to charge, the cell is deeply discharged, typically to a SOC of less than 50% of its rated capacity. If allowed to settle, the battery's open circuit voltage (OCV) will settle at 1.60 V. The cell is charged at $I_{max}$ (e.g., 5.0 mA or 5.5 mA) to a maximum voltage of $V_{max}$ (e.g., 1.98 V or 2.0 V). When the cell voltage reaches 1.90 V, the battery voltage is near the polarization peak, and a Polarization Peak timer, $T_1$, is started. The Polarization Peak timer clocks about 20 minutes of time (e.g., from 60-240 minutes). While this timer is active, the charge current will rapidly drop and recover. While the $T_1$ timer is active, the charge current is not terminated even if the charge current falls below $I_{min}$. Zone 2 is entered when $T_1$ timer is complete, i.e., the timer has clocked 20 minutes. After the $T_1$ timer is complete, the charge set points are maintained at $V_{max}$ (e.g., 1.98 V or 2.0 V) and $I_{max}$ (e.g., 5.0 mA or 5.5 mA). The charge current continues until the charge current is less than $I_{end}$ for 60 seconds continuously. $I_{end}$ is the calculated charge termination current in mA, which compensates for state of charge, cell aging, and ambient temperature. The calculation for $I_{end}$ is expressed in equation (1):

$$I_{end}=I_{Chg}+I_{Temp} \quad (1)$$

where $I_{Chg}$ is the charge compensation current, in mA, and $I_{Temp}$ is the temperature compensation current in mA that are provided in Tables 1A and 1B:

TABLE 1A $T_{Temp}$ and $I_{end}$ values for 31 mAh capacity batteries.

| Temperature | Maximum Charge Time | $I_{Temp}$ | $I_{2end}$ |
|---|---|---|---|
| T ≥ 25° C. | 0.0 hr | 0.6 | 4.0 |
| 15° C. ≤ T < 25° C. | +1.0 hr | 0.4 | 3.5 |
| 5° C. ≤ T < 15° C. | +2.0 hr | 0.2 | 3.0 |
| 0° C. ≤ T < 5° C. | +2.5 hr | 0.0 | 2.5 |

TABLE 1B $T_{Temp}$ and $I_{end}$ values for 35 mAh capacity batteries

| Temperature | Maximum Charge Time | $I_{Temp}$ | $I_{2end}$ |
|---|---|---|---|
| T ≥ 25° C. | 0.0 hr | 1.0 | 4.5 |
| 15° C. ≤ T < 25° C. | +1.0 hr | 0.6 | 4.0 |
| 5° C. ≤ T < 15° C. | +2.0 hr | 0.3 | 3.5 |
| 0° C. ≤ T < 5° C. | +2.5 hr | 0.0 | 3.0 |

$I_{Chg}$ is a calculated value based on a constant current timer, $T_2$, the measured length of time the cell is charged under constant current in Zone 2, e.g., when $I_2$ is substantially constant. When timer $T_1$ starts, timer $T_2$ also starts. Timer $T_2$ ends when charge current falls below $I_{max}$ after $T_1$ ends. The minimum value for $T_2$ is $T_1$. $I_{Chg}$ is determined with equation (2):

$$I_{Chg}=(T_2 \times I_{max})/T_{Chg} \qquad (2)$$

where $T_{Chg}$ is the cell time constant in hours. Note that $T_{Chg}$ is empirically determined for a specific cell design such as the 31 mAh button cell or the 35 mAh button cell. Some values for $T_{Chg}$ for 31 and 35 mAh button cells above are provided in Table 2:

TABLE 2

$T_{Chg}$ values for two types of rechargeable button cells.

| Capacity | $T_{chg}$ |
|---|---|
| 31 mAh | 5.0 hours |
| 35 mAh | 5.5 hours |

Note that a battery that is in its early stages of cycle life will have a lower impedance and will accept charge more easily, which results in a longer measured $T_2$. A longer $T_2$ results in a larger $I_{Chg}$ which terminates charge sooner while the charge current is higher. A battery that is in its later stages of life will have a higher impedance and more difficulty in accepting charge, which results in a shorter $T_2$. A shorter $T_2$ results in a smaller $I_{Chg}$ which terminates charge later when the charge current is lower.

2. Temperature Dependent Methods

In some methods, the value for maximum charge time may be modified to compensate for the effect temperature has on conductivity.

Tables 1A and 1B, above, detail the offsets to use with the maximum charge time based on ambient temperature. For temperatures in between the specific values indicated below, scale the offset proportionally. Regardless of temperature, the minimum charge current value remains the lowest acceptable charge current.

Some methods of the present invention further comprise measuring the temperature, wherein the temperature measurement accuracy has a deviation of ±5° C. (e.g., ±2° C.).

5. Diagnostics a. Diagnostics—Soft Shorting

In an embodiment, one or more of the methods may also take into account a "soft short," which is an internal short circuit caused by a zinc dendrite that momentarily pierces the separator stack but is burned back by the short circuit current. For comparative purposes, a charge curve that does not include a soft short is shown in FIG. 7A whereas a charge curve including a soft short is shown in FIG. 7B. It is noted that soft shorts are an expected failure mode for silver-zinc batteries.

Soft shorts typically occur during charging in the upper plateau at the highest voltage level across the electrodes. After each burn-back event, the zinc dendrite grows larger and is able to carry more short circuit current until the dendrite vaporizes or dissolves. A soft short progressively gets worse until it ultimately forms a "hard short," which is described in greater detail below.

Typically, soft shorts will occur in one charge cycle and not reappear until several cycles later as it takes time for the dendrite to grow back. Initially, the soft shorts will slightly reduce the rated charge capacity of the silver-zinc cell, and, as the zinc dendrite is able to carry more current, the rated charge capacity of the silver-zinc cell will be even further reduced. Accordingly, early detection of soft shorts may allow one or more of the methods associated with the system to communicate to the user that the silver-zinc battery may have to be replaced at some point in the future.

To account for battery shorting, some methods of the present invention optionally comprise generating an electrical signal if the voltage of the battery is lower than $V_P$ for a period of 2 seconds or more (e.g., 2 to 10 seconds), which may be indicative of a soft short in the battery.

In a multi-zone charge method, a soft short first appears in the Zone 2 charging step since the potential is highest and is most favorable to drawing current through the dendrite. If the charge voltage in Zone 2 is less than or equal to the voltage plateau, $V_P$, (e.g., 1.90 V) for a period of more than 1 second, (e.g., about 2 seconds or more) continuously, once the battery has been charged to a voltage of $V_2$, the soft short diagnostic may be confirmed. Some methods of the present invention include generating an electrical signal when the soft short is confirmed.

b. Diagnostics—Hard Shorting

In an embodiment, one or more of the methods may also take into account a "hard short," which renders the silver-zinc cell as being inoperable as a result of the hard short completely discharging the silver-zinc cell, causing the voltage of the cell to drop to nearly 0.00V. Typically, hard shorts are caused by dendrite shorts through the separators, which are internal structures that compromise the insulating barrier between the can and lid resulting in zinc dendrite growth under or around the gasket and external conductive bridges from can to lid. Separators are typically designed to withstand dendrite growth, but at the end of life of the battery, the separators will become weaker and eventually may allow dendrites to grow through, causing a 'hard short'.

A silver-zinc cell with a hard short can be distinguished from an over-discharged silver-zinc cell during an over-discharge recovery event (see, e.g., steps S.302, S.303' of the charge method 300). For example, if the voltage of the cell, V, does not reach the $V_{recov}$ within the specified time limit (e.g., within about one (1) hour, which is seen, e.g., at step S.302), the charge method 300 may determine that the silver-zinc cell has a hard short and may be advanced from step S.302 to step S.303'. In an embodiment, when determining if the silver-zinc cell includes a hard short, the charge method 300 may consider a minimum OCV detection level of about 0.100V to about 0.300V.

A hard short renders the cell inoperable due to its completely discharging the cell and causing the cell voltage to drop to nearly zero (0) V.

Hard shorts are caused by dendrite shorts through the separators, internal mechanical issues that compromise the insulating barrier between the can and lid, zinc dendrites that grow under or around the gasket, and external conductive bridges from can to lid.

A cell with a hard short can be distinguished from an over-discharged cell during the Over-Discharge Recovery charge. If the cell voltage does not reach the $V_{recov}$ within the specified time limit, i.e., 1 hr, the cell has a hard short.

c. Detection

A high impedance cell has difficulty getting the charge capacity back into electrodes. A cell with this condition gradually requires more time to become fully charged. This results in longer charge times and lower current thresholds. Eventually, as the impedance rises, the cell will no longer charge to full capacity within 6 hours at room temperature.

The capacity tends to gradually drop with each successive cycle when less charge is put back into the cell.

High impedance cells are caused by the zinc anode gradually densifying and becoming more difficult to charge, aging of the cell which affects how efficiently the electrodes accept charge and electrolyte imbalance which can occur when the separators are blocked and do not allow water transfer to efficiently occur.

In an embodiment, one or more of the methods may also take into account a silver-zinc cell having a relatively high impedance, which may result in the silver-zinc cell having difficulty in getting the charge back into electrodes. Typically, a high impedance silver-zinc cell is usually caused by the zinc anode gradually densifying and becoming more difficult to charge, thereby aging silver-zinc cell, which may affect (a) how efficiently the electrodes accept charge, and (b) electrolyte imbalance, which may occur when the separators are blocked and do not allow water transfer to efficiently occur.

In one embodiment, when $I_{min}$ terminates charge, the high impedance/capacity fade diagnostic is confirmed. Multiple high impedance/capacity fade warnings may be confirmed before warning the user.

d. Incorrect Battery Chemistry Detection

As noted above, the methods of recharging batteries according to the present invention are not compatible for all types of batteries. It is appreciated that many cells having a non-silver-zinc chemistry may share the same casing geometry as that of the silver-zinc cell; as such, when designing the one or more methods, the different chemistries should be kept in mind and considered in order to prevent a user from attempting to recharge a cell having a non-compliant chemistry. For example, in an embodiment, similar cell casing may not include a silver-zinc chemistry, but rather, for example: zinc-air ($ZnO_2$), nickel-metal hydride (NiMH) or the like.

Zinc-air batteries or manganese-oxide batteries may undergo gassing or explode when some charging methods of this invention are applied to the cell. To avoid this, some charging methods of the present invention further comprise a step or series of steps that assess the chemistry of the battery being charged, and if battery is assessed to have incompatible charging characteristics, the charge method is terminated. These steps may occur upon charging the battery or upon discharging the battery.

Zinc-air and NiMH cells tend to have a slower charge voltage rise than AgZn when charged at $I_{Diag}$. The rise in charge voltage can be measured and the zinc-air and NiMH cells identified. If the cell voltage before charge is between about 1.20 V and about 1.60 V and the cell voltage has not exceeded 1.55 V after 3 seconds of being charged at $I_{Diag}$, the cell is zinc-air or NiMH. For zinc-air and NiMH cells where the cell voltage before charge is less than 1.25 V, the over-discharge recovery method is used for detection. Over-discharged zinc-air and NiMH cells will not reach $V_{recov}$ when charged at $I_{recov}$ for 1 hour. $I_{Diag}$ values for two batteries are provided in Table 4:

TABLE 4

$I_{Diag}$ values for 2 batteries.

| Capacity | $I_{Diag}$ |
|---|---|
| 31 mAh | 8 mA |
| 35 mAh | 10 mA |

A partially discharged $Ag_2O$ or silver-oxide cell looks nearly identical to AgZn during charge because the anode and cathode are the same chemistry. As a result, the $Ag_2O$ cell may be charged up to $V_1$. When $V_1$ is reached, the charge current in an $Ag_2O$ cell will drop similar to AgZn. The differentiator is that the charge current for $Ag_2O$ typically drops below 1.0 mA and never recovers to a higher level. The AgZn cell also has a charge current drop when $V_1$ is reached, but the charge current drop is only momentary before the current rises back up again before the polarization peak timer is complete. The inflection point of the charge current is used to identify AgZn. An inflection is defined as a rise of 0.5 mA or more. A fully discharged $Ag_2O$ cell has a fairly slow voltage rise during charge. This is detected by measuring the voltage rise after the charge voltage has exceeded 1.80 V. The AgZn cell will reach $V_1$ within 5 minutes after reaching 1.80 V, but the $Ag_2O$ cell will take much longer. The silver-oxide chemistry may take as long as 1 hour to detect but the cell is not damaged and will take charge during this time.

A deeply discharged alkaline cell also has a slower charge voltage rise than AgZn and can be detected similar to zinc-air and NiMH. A fresh alkaline cell has an open circuit voltage closer to AgZn and $Ag_2O$. As a result, it may be charged up to $V_1$ and then the charge current may be monitored like $Ag_2O$ during the polarization peak timer.

One method of the present invention includes steps for detecting AgZn cells and charging them according to the methods of the present invention. In one method, if the cell OCV before charge is between about 1.2 V and about 1.6 V, the chemistry detect algorithm should be applied. Before $I_{Diag}$ is applied, the cell OCV is recorded as $V_{d0}$. The cell is charged for about 10 seconds or less (e.g., about 5 seconds or less, or about 2 seconds) at $I_{Diag}$ and the cell voltage, $V_{d1}$, recorded at the end of this time period. The $\Delta V$ of $V_{d1}-V_{d0}$ is compared to the linear equation $y=-mx+b$ equation to determine the whether the cell should be charged in accordance with the present invention or whether charging should cease. If $\Delta V \leq (-m_d \times V_{d0} + b_d)$, then cell charging is terminated. In this expression, $m_d$ is initial OCV scaler (no units), $b_d$ is AgZn detection offset (V). Examples for values for $b_d$ are provided below in Table 5:

TABLE 5

$b_d$ values for 2 batteries.

| Capacity | $m_d$ | $b_d$ |
|---|---|---|
| 31 mAh | 0.5 | 0.85 |
| 35 mAh | 0.5 | 0.88 |

Some methods of the present invention further comprise secondary detection steps for the detection of AgZn cells. Once the voltage passes the polarization peak (or 1.98 V) after 20 min (after polarization peak timer) if the current returns to $I_{max}$ the cell identified as AgZn. However, if the current does not return to $I_{max}$ due to low temperature or high impedance, the secondary chemistry detection method is implemented and charging pauses for 2 minutes. If the OCV falls below 1.85 V during this 2 minute detection window, the cell is not AgZn. If the OCV stays at 1.85 V or higher during this 2 minute detection window, the cell is AgZn and should resume normal charging.

Referring to FIG. 8D, the above-mentioned charging method 400 is described in accordance with an embodiment of the invention. In an embodiment, the charging method 400 includes several branches, each including a different outcome in determining if charging of a cell interfaced with/connected to the system should or should not proceed. In circumstances where charging should not proceed, the reason may include any of the following, such as, for example: (a) an attempt to charge a cell having a non-compliant chemistry, or, for example: (b) the cell includes a compliant chemistry, but, for example, includes an impermissibly high impedance.

However, if the cell to be charged by the system includes an appropriate OCV criteria (e.g., the OCV, or voltage of the battery, at the outset of the charging period is greater than or equal to about, for example, 1.7 V) the method 400 may be advanced from step S.401 to step S.402 (i.e., at step S.402, the method 400 may be advanced to one of the "multi-stage charge mode" at step S.102' or the "single-stage charge mode" at step S.202). Conversely, if, however, the cell to be charged by the charging system does not include an appropriate OCV criteria (e.g., the OCV, or voltage of the battery, at the outset of the charging period is less than 1.7 V), the method 400 may be advanced from step S.401 to step S.402' in order to further investigate the OCV of the cell to be charged by the charging system.

1. Branch S.402'-S.405'

At step S.402', for example, the method determines if the OCV of the cell is greater than or equal to about approximately 1.2 V and less than or equal to about approximately 1.45 V. If the above condition at step S.402' is true, the method 400 is advanced from step S.402' to step S.403' where the cell is charged at 8 mA until the voltage of the cell is equal to about approximately 1.55 V or the time of charging is about equal to three (3) seconds. The method 400 is then advanced from step S.403' to step S.404' to determine if the voltage of the cell is less than 1.55V within three (3) seconds of being charged at 8 mA. If the above condition at step S.404' is not true, then the method 400 is advanced to step S.405' where charging is ceased due to the cell potentially having a non-compliant chemistry of one of $ZnO_2$, NiMH, alkaline or the like. If, however, the condition at step S.404' is true, then the method 400 is advanced from step S.404' to step S.404", which is discussed in greater detail in the foregoing disclosure.

2. Branch S.402' and S.403"-S.407"

Referring back to step S.402', another branch of the method 400 is discussed. At step S.402', it may be determined that the condition is not true (i.e., the OCV may be greater than or equal to 1.2 V but less than or equal to 1.45 V), and, as such, the method 400 is advanced from step S.402' to S.403". At step S.403", for example, the method 400 determines if the OCV of the cell is greater than about approximately 1.45 V and less than about approximately 1.65 V.

If the above condition at step S.403" is true, the method 400 is advanced from step S.403" to step S.404" where the cell is charged at 8 mA until the voltage of the cell is equal to about approximately 1.98 V or until the charge current, I, drops. The method 400 is then advanced from step S.404" to S.405" where it is determined if the cell reaches $V_{max}$ within five (5) minutes in reference to period of time when the cell voltage was 1.8 V.

If the above condition at step S.405" is true, then the method 400 is advanced from step S.405" to step S.406" to determine if the charge current, I, is less than 1 mA during the polarization peak timer, $T_1$. If the above condition at step S.405" is true, then the method 400 is advanced from step S.406" to step S.407" where charging is ceased due to the cell potentially having a non-compliant chemistry (e.g., the cell is an alkaline cell) or the cell includes a compliant chemistry (e.g., $Ag_2O/AgZn$), but, however, includes an impermissibly high impedance. Similarly, if the condition at step S.405" is not true, then the method 400 is advanced from S.405" to step S.407" where charging is ceased. Further, if the condition at step S.406" is not true, then the method is advanced from step S.406" to step S.407''', which is discussed in greater detail in the foregoing disclosure.

When considering step S.406" described above, it will be appreciated that an $Ag_2O$ or "silver I oxide" cell behaves nearly identical to an AgZn or "silver $I_1$ oxide" cell during charging because the anode and cathode are the same chemistry; as a result, the $Ag_2O$ cell may be charged up to $V_{max}$; when $V_{max}$ is reached, the charge current in an $Ag_2O$ cell will drop similarly with respect to an AgZn cell. The differentiator, however, is that the charge current for an $Ag_2O$ cell typically drops below 1 mA and usually does not recover to a higher level. Further, the AgZn cell also has a charge current drop when $V_{max}$ is reached, but, however, the charge current drop is only momentary before the current rises back up again before the polarization peak timer is complete. Yet, even further, an empty $Ag_2O$ cell has a fairly slow voltage rise during charge, which may be detected by measuring the voltage rise after the charge voltage has exceeded 1.8 V. Further, an AgZn cell will quickly reach $V_{max}$ after reaching 1.8 V, but, however, the $Ag_2O$ cell will take much longer.

3. Branch S.402', S.403" and S.403'''-S.405'''

Referring back to step S.402', another branch of the method 400 is discussed. At step S.402', it may be determined that the condition is not true (i.e., the OCV may be less than 1.2 V or greater than 1.45 V), and, as such, the method 400 is advanced from step S.402' to S.403". At step S.403", for example, the method 400 determines if the OCV of the cell is greater than about approximately 1.45 V and less than about approximately 1.65 V. At step S.403", it may be determined that the condition is not true (i.e., the OCV may be less than 1.2 V), and, as such, the method 400 is advanced from step S.403" to S.403'''.

At step S.403''', the cell is charged 1 mA until the cell reaches 1.6 V. The method 400 is then advanced from step S.403''' to S.404''' where it is determined if the voltage of the cell reaches 1.6 V within one (1) hour. If the above condition at step S.404''' is not true, then the method 400 is advanced to step S.405''' where charging is ceased due to the cell potentially having a non-compliant chemistry of one of $ZnO_2$, NiMH, alkaline or the like. If, however, the condition at step S.404''' is true, the method is advanced to step S.404", which has been discussed above and is not repeated here for brevity purposes.

4. Branch S.402', S.403"-S.406" and S.407'''

Attention is now drawn to step S.407'''. Step S.407''' is arrived at if the condition described above at step S.406" is not true. At step S.407''', the method 400 determines if the charge current, I, exhibits an inflection (i.e., an inflection is defined as a rise of 0.5 mA or more) during the polarization peak timer, $T_1$. If the above condition at step S.407''' is true, the inflection may indicate that the cell is a silver-zinc cell and that the silver-state of the silver zinc cell is AgZn or "silver $I_1$ oxide"; as such, the method 400 is advanced from step S.407''' to step S.402 (i.e., at step S.402, the method 400 may be advanced to one of the "multi-stage charge mode" at step S.102' or the "single-stage charge mode" at step S.202). Conversely, if, however, the condition at step S.407''' is not true, the method 400 is advanced from S.407''' to step S.407" where charging is ceased.

In some methods of the present invention, the battery assessment occurs during charging and comprises charging the battery with a charge current for a set period of time and determining whether the initial voltage rise rate meets a threshold value, and if the voltage rise rate fails to meet the threshold value, charging is terminated. For example, when a battery is discharged to an SOC of about 50% or less of the rated capacity, the battery is initially charged with a diagnostic charge current, $I_{Diag}$, for a short period of time (e.g., less than 10 seconds), and the voltage of the battery is measured. If the voltage of the battery fails to meet a threshold value (e.g., about 1.65 V), then charging is terminated.

In some embodiments, any of the charging methods above further comprise charging a battery with a diagnostic charge current, $I_{Diag}$, of about 8 mA for a period of less than about 7 seconds (e.g., less than about 5 seconds, or about 3 seconds), and if $V_{Batt}$ is less than or equal to about 1.65 V (e.g., less than or equal to about 1.55 V), then terminating the charge method.

In other embodiments, any of the charging methods above further comprise charging a battery with a diagnostic charge current, $I_{Diag}$, of about 8 mA for a period of less than about 7 seconds (e.g., less than about 5 seconds, or about 3 seconds), and if the increase in SOC of the battery is not at least 0.02%, then terminating the charge method.

In one example, the assessment occurs upon discharge of the battery. For instance, at the end of discharging the battery, the change in the average battery voltage per unit time is measured when $V_{Batt}$ is between 1.4 V and 1.15 V (e.g., between 1.4 V and 1.2 V), and if the change is not greater than or equal to 60 mV during a period of 30 minutes or less (e.g., 15 minutes or less, 10 minutes or less, or 5 minutes or less), then an electrical signal is generated that alerts the user that the battery should not be charged according to the methods of the present invention.

One embodiment comprises determining the change in the average battery voltage per unit capacity at the end of discharging a battery, e.g., when DOD is about 70% or less, when DOD is about 90% or less, or when DOD is about 95% or less, and if the change in battery voltage per unit time is not greater than or equal to 60 mV over a 3% change in the DOD, then generating a signal, e.g., an audio signal, a visual signal, a vibration signal, or any combination thereof, that alerts the user that the battery should not be recharged according to the present invention. Or, if the change in battery voltage per unit time is greater than or equal to 60 mV over a 3% change in the DOD, then generating a signal, e.g., an audio signal, a visual signal, a vibration signal, or any combination thereof, that alerts the user that the battery should be recharged according to the present invention. Other embodiments comprise generating a signal that communicates with the charge management system and enables or disables the charging of the battery according to the methods of the present invention depending on the results of the assessment.

6. Assessing the SOC of a Recharging Battery

The capacity of a battery that is recharged according to a method of the present invention, and the associated SOC, may be calculated using equation (3), below:

$$\text{Capacity} = \int_0^{T_{cc}} I_{cc}\, dT + \int_{T_{cc}}^{T_{final}} I_{cv}(T)\, dT \qquad (3)$$

wherein $T_{CC}$ is constant current time, $I_{CC}$ is the substantially constant current, $I_{CV}$ is the controlled current, which maintains a constant voltage in the battery, and $T_{final}$ is the time at which the charging terminates. The capacity may be approximated using mathematical approximation methods to determine the capacities of each of the integrals in equation (3).

In some methods of the present invention, Coulomb counting may be used to determine capacity of electrical energy that is charged to a rechargeable battery.

Other methods approximate the electrical capacity based on the time necessary to charge the battery to a certain voltage.

One exemplary method of approximating a battery's capacity or determining when a battery is charged to a SOC of about 80% or more of its rated capacity for a battery that is charged to $V_1$ and $V_2$ according to several methods of the present invention is to measure the time required for the voltage of the battery to reach $V_2$ from the voltage $V_1$. This time is then used to determine $I_{ter}$ by use of the equation (4), below:

$$I_{ter} = I_{comp} + m(T_{V_2} - T_{V_1})^Y \qquad (4)$$

where $I_{comp}$ is the minimum charge current for a given temperature, the term $(T_{V_2} - T_{V_1})$ represents the amount of time required for the battery to charge from $V_1$ to $V_2$, and m and Y are constants. If equation (4) gives a value for $I_{ter}$ that is less than $I_2$ then, $I_{ter} = I_2$. One way of determining Y and m is to test a population of batteries of the same general design as the batteries intended to be charged using the present method using various values for m and Y (e.g., Y is 1, Y is between 0.25 and 4.0, or Y is between 0.3 and 3) and selecting the m and Y values from batteries that demonstrate the longest cycle life. One way to determine $I_{comp}$ is to test a population of batteries of the same general design as the batteries intended to be charged using the present method using various values for $I_{comp}$ at several temperatures and choose the value $I_{comp}$ at each temperature such that shorting of the cell does not occur. $I_{comp}$ is typically a current that would fully charge a cell from 0% SOC to 100% SOC in a time period of between 5 to 200 hours (e.g. $I_{comp}$ is 1 mA, $I_{comp}$ is 10 mA to 0.01 mA, $I_{comp}$ is 7 mA to 0.1 mA at a temperature of 23° C.). In some examples, such as for some button cells, $I_{comp}$ is 1 mA at a temperature of about 23° C., m is 1 mA/hour and Y is 1.

When the battery is charged to $V_2$ and the charge current $I_2$ is controlled, the controlled $I_2$ charge current is terminated when $I_2$ equals $I_{ter}$, which occurs when the battery is charged to a SOC of 80% or more (e.g., 90% or more, 95% or more, 99% or more, or about 100%) of its rated capacity.

Another exemplary method of approximating a battery's capacity or determining when a battery is charged to a SOC of about 80% or more of its rated capacity for a battery that is charged to $V_1$ and $V_2$ according to several methods of the present invention is to measure the time required for the voltage of the battery to reach $V_2$ from the voltage $V_1$ for the current charge cycle and the time to reach $V_2$ and $V_1$ from previous charge cycles. These times are then used to determine $I_{ter}$ by use of a piece-wise continuous equation similar in form to the equation (5), below:

$$I_{ter} = I_{comp} + m(T_{V_2} - T_{V_1})^Y + \sum_{i=1}^{n} m_i (T_{V_2,i} - T_{V_1,i})^{Y_i} \qquad (5)$$

where $I_{comp}$ is the minimum charge current for a given temperature, the term $(T_{V_2} - T_{V_1})$ represents the amount of time required for the battery to charge from $V_1$ to $V_2$, and m and Y are constants. If equation (5) gives a value for $I_{ter}$ that is less than $I_2$, then $I_{ter}=I_2$. One way of determining Y and m is to test a population of batteries of the same general design as the batteries intended to be charged using the present method using various values for m and Y (e.g., Y is 1, Y is between 0.25 and 4.0, or Y is between 0.3 and 3) and selecting the m and Y values from batteries that demonstrate the longest cycle life. One way to determine $I_{comp}$ is to test a population of batteries of the same general design as the batteries intended to be charged using the present method using various values for $I_{comp}$ at several temperatures and choose the value $I_{comp}$ at each temperature such that shorting of the cell does not occur. $I_{comp}$ is typically a current that would fully charge a cell from 0% SOC to 100% SOC in a time period of between 5 to 200 hours (e.g. $I_{comp}$ is 1 mA, $I_{comp}$ is 10 mA to 0.01 mA, $I_{comp}$ is 7 mA to 0.1 mA at a temperature of 23° C.). In some examples, such as for some button cells, $I_{comp}$ is 1 mA at a temperature of about 23° C., m is 1 mA/hour and Y is 1. The subscript, i, in the sum of equation (5) ranges from the previous cycle to the present one, i=1, and i=n, a number further previous to the current cycle. The number n is typically less that 10 or less than 5. One way of determining $Y_i$ and $m_i$ is to test a population of batteries of the same general design as the batteries intended to be charged using the present method using various values for $m_i$ and $Y_i$ (e.g., $Y_i$ is 1, $Y_i$ is between 0.0 and 4.0, or $Y_i$ is between 0.3 and 3) and selecting the $m_i$ and $Y_i$ values from batteries that demonstrate the longest cycle life. The sum in equation (5) could also be replaced by a term that is a function of the time derivative or difference of $(T_{V2}-T_{V1})$, i.e., equation (6), where $\Delta$ denotes the difference operation and x denotes the first, second, or third difference.

$$I_{ter} = I_{comp} + m(T_{V_2} - T_{V_1})^Y + \sum_{i=1}^{n} m_i \frac{\Delta^x(T_{V_2,i} - T_{V_1,i})^{Y_i}}{\Delta^x i} \quad (6)$$

when the battery is charged to $V_2$ and the charge current $I_2$ is controlled, the controlled $I_2$ charge current is terminated when $I_2$ equals $I_{ter}$, which occurs when the battery is charged to a SOC of 80% or more (e.g., 90% or more, 95% or more, 99% or more, or about 100%) of its rated capacity.

Another exemplary method of approximating a battery's capacity or determining when a battery is charged to a SOC of about 80% or more of its rated capacity for a battery that is charged to $V_1$ and $V_2$ according to several methods of the present invention is to measure the time required for the voltage of the battery to reach $V_2$ from the voltage $V_1$ for the current charge cycle and the time to reach $V_2$ and $V_1$ from previous charge cycles. These times are then used to determine $I_{ter}$ by use of any of the known delayed feedback control methods or extended time-delay autosynchronization methods.

7. Dynamic Modulation of $V_1$, $V_2$, $I_1$, $I_2$ and $I_{ter}$

The charge parameters $V_1$, $V_2$, $I_1$, $I_2$ and $I_{ter}$ are not necessarily constant from cycle to cycle but can be modulated to optimize various performance characteristics. Examples of these performance characteristics are: providing constant discharge capacity over a number of cycles, maintaining constant charge time over the life of the battery, increasing the number of cycles to a minimum capacity, healing soft shorts, and recovering performance after an over discharge event. The charge parameters, $V_1$, $V_2$, $I_1$, $I_2$ and $I_{ter}$, can be modulated by use of any of the known delayed feedback control methods or extended time-delay autosynchronization methods such as those described in I. Kiss, Z. Kazsu and V. Gaspar; Chaos 16 033109 (2006), which is hereby incorporated by reference in its entirety, where different performance characteristic from previous charge and/or discharge cycles are used with current charge parameter to modulate one or more of the charge parameters for the current charge cycle. Each of the charge parameters can be modulated by different methods at the same time. Examples of performance characteristics that can be used in the control methods are end of discharge voltage, open circuit voltage, time on standby, total charge time, average discharge voltage, $I_{ter}$ or $T_{V2}-T_{V1}$.

C. Charging Method 3:

Another aspect of the present invention provides additional methods for charging secondary cells (e.g., 2.0 V silver-zinc rechargeable batteries) at an ambient temperature of from about 7° C. to about 43° C. These methods, or portions thereof, may be combined with any of the methods or any portion thereof, described herein.

1. Deep Discharge

Some methods provide for charging a rechargeable battery having an SOC of less than about 50% (about 45% or less, or about 40% or less). In some instances, an SOC of less than about 50% is indicated when the voltage of the battery, $V_{Batt}$, is less than about 90% (e.g., about 87.5% or less or about 85% or less) of the battery's rated voltage.

Figure 21A:
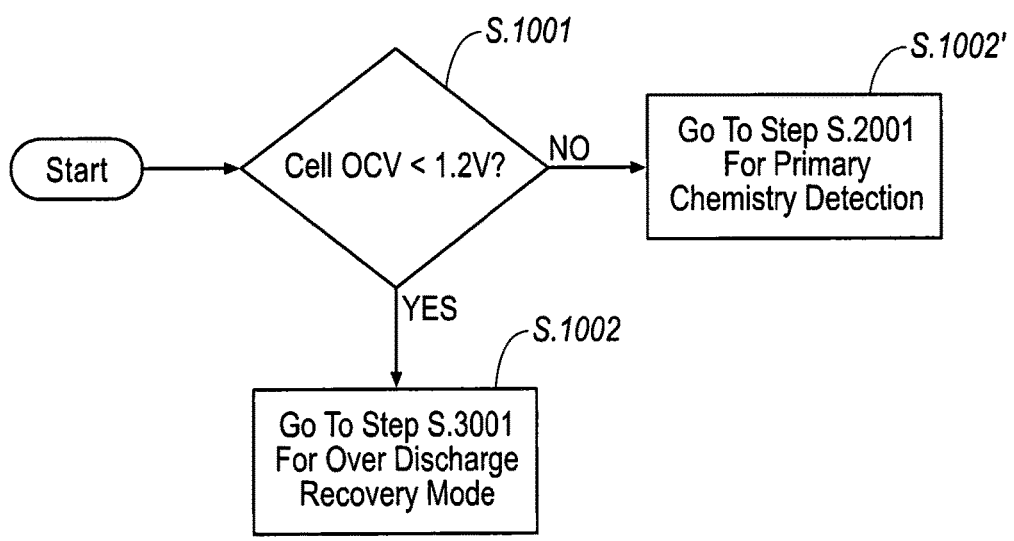
FIG. 21A is a step-diagram representing another exemplary method for recharging a rechargeable battery having at least one voltage plateau according to one embodiment of the invention.
Figure 21B:
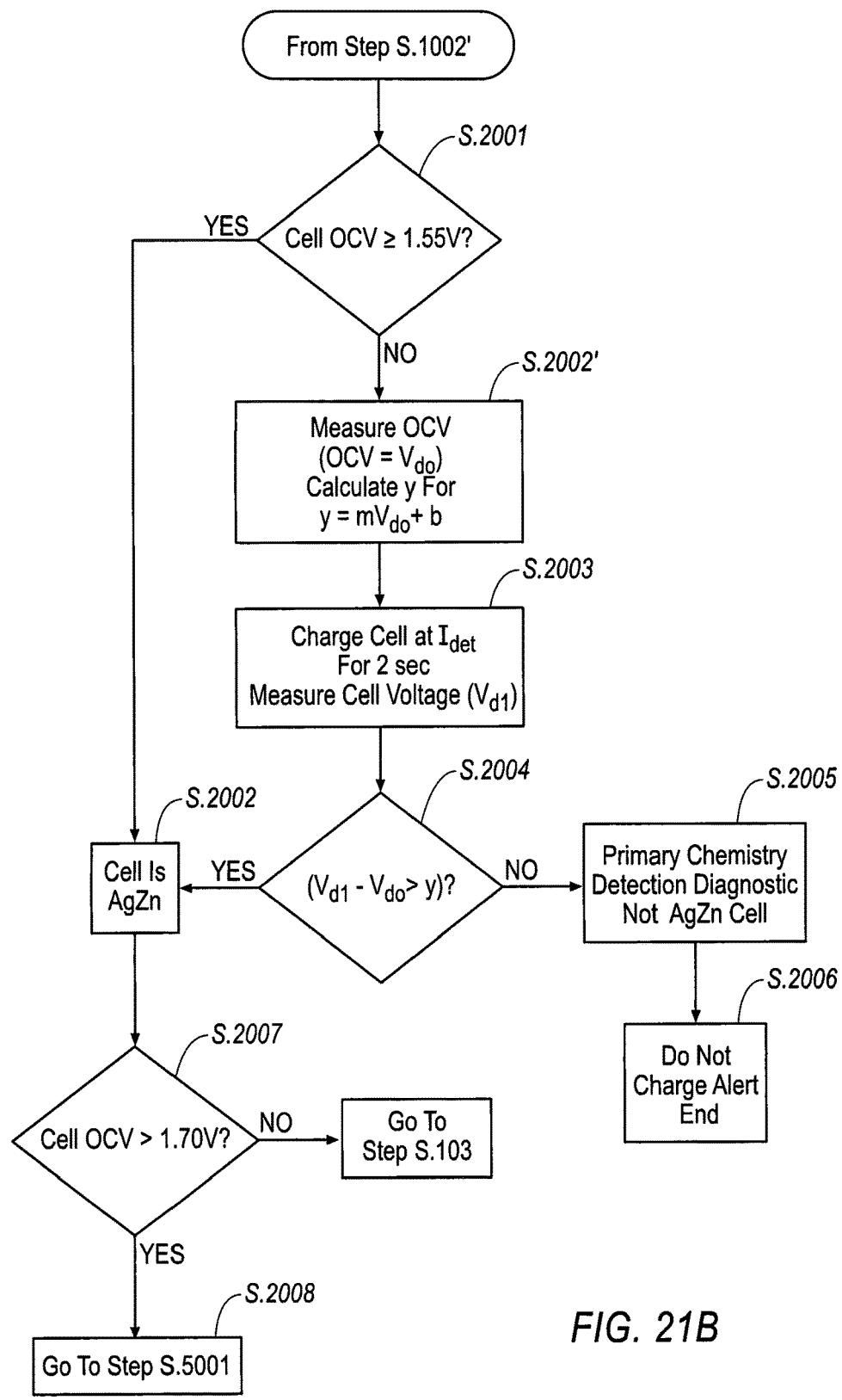
FIG. 21B is a step-diagram representing another exemplary method for recharging a rechargeable battery having at least one voltage plateau according to one embodiment of the invention.
Figure 21C:
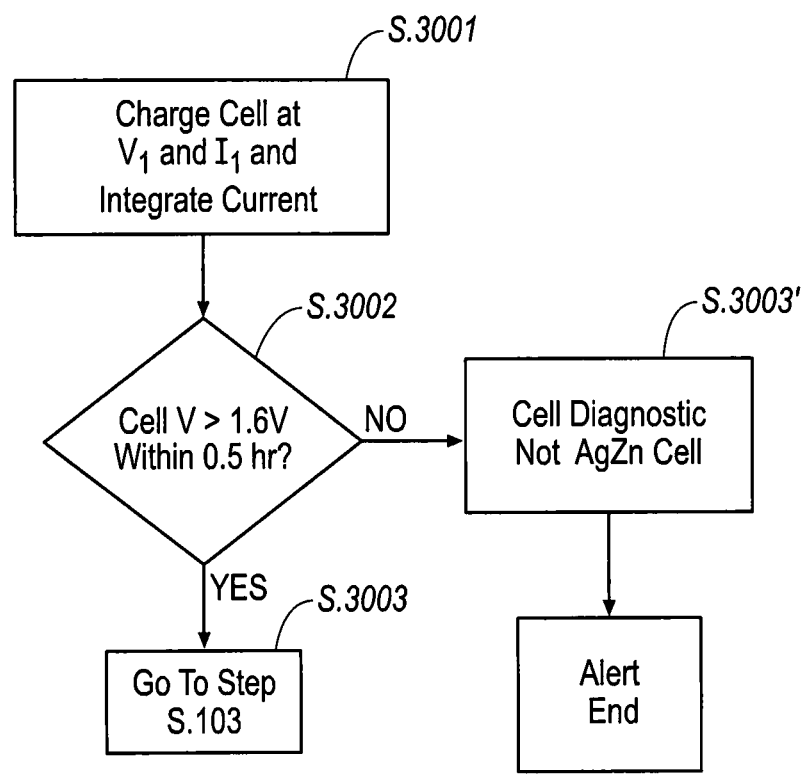
FIG. 21C is a step-diagram representing another exemplary method for recharging a rechargeable battery having at least one voltage plateau according to one embodiment of the invention.
Figure 21D:
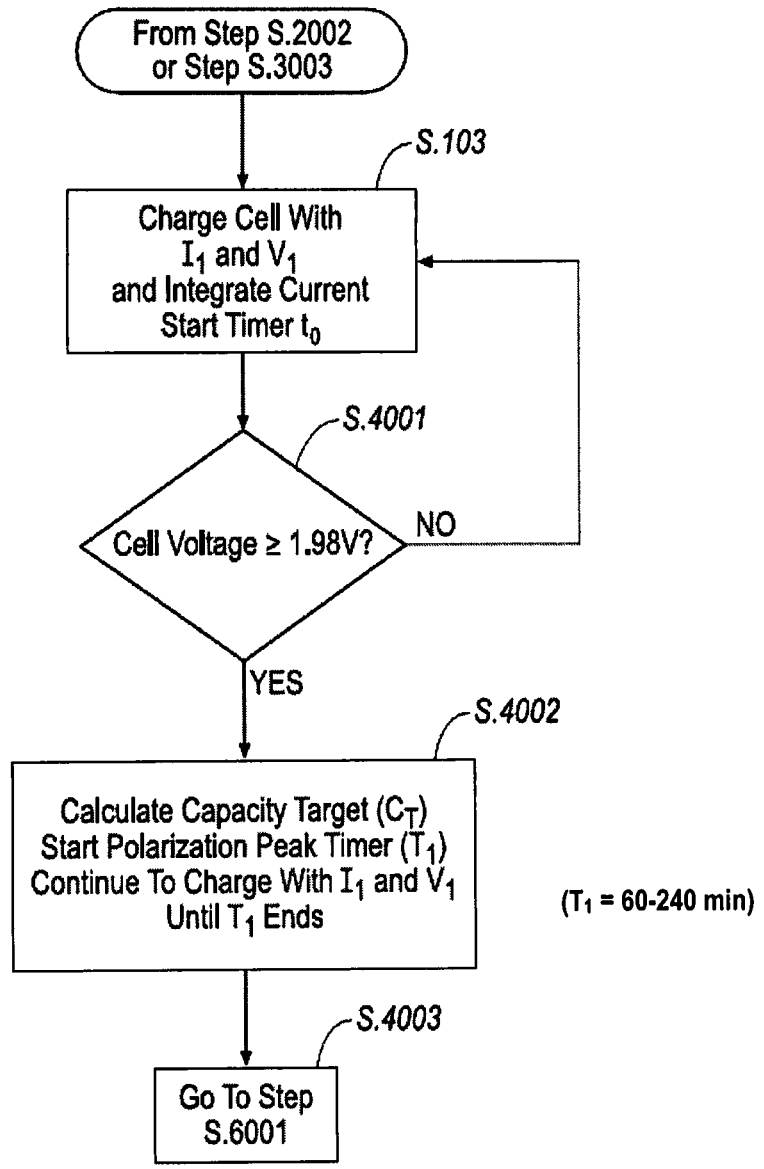
FIG. 21D is a step-diagram representing another exemplary method for recharging a rechargeable battery having at least one voltage plateau according to one embodiment of the invention.
Figure 21E:
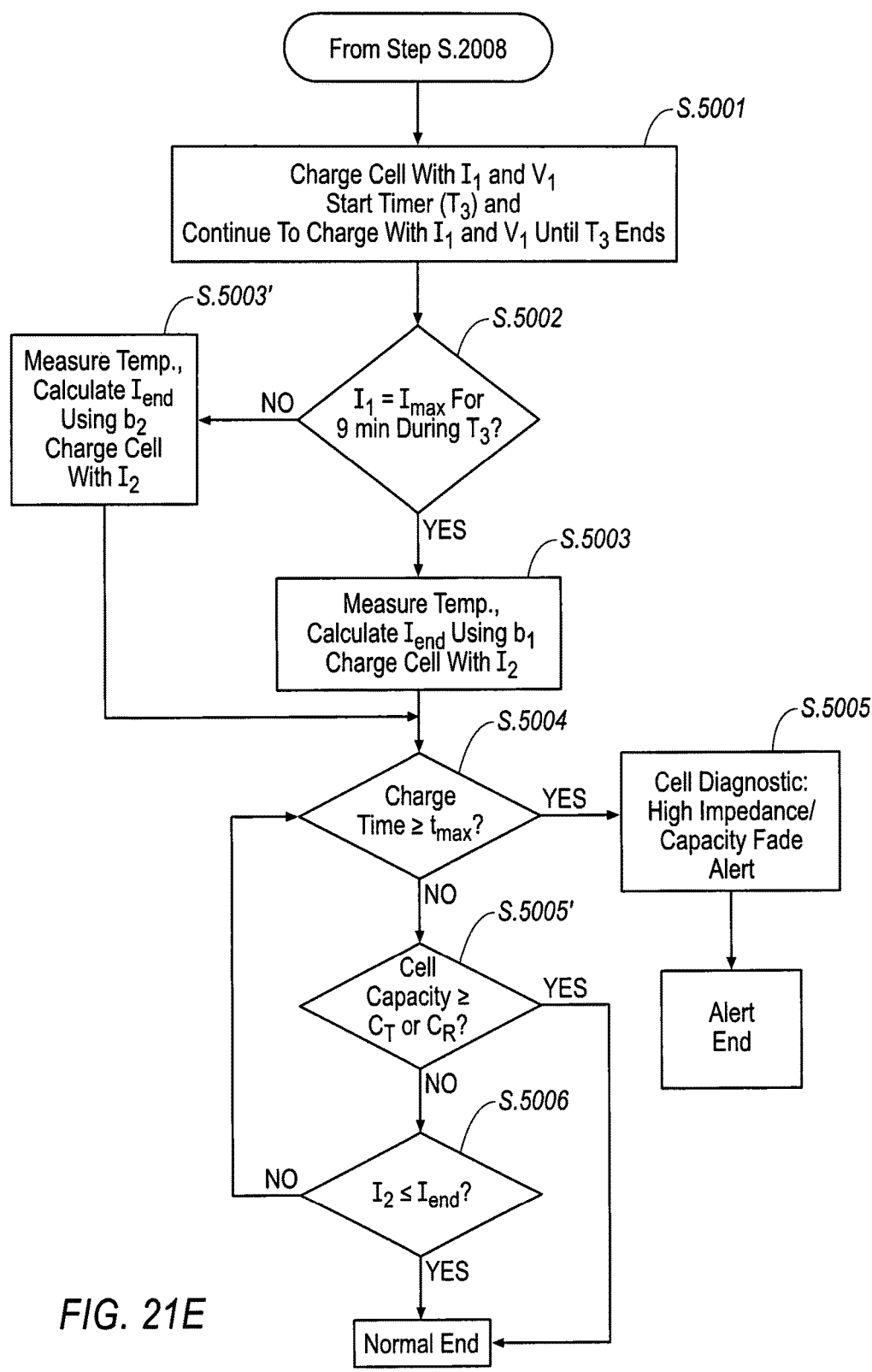
FIG. 21E is a step-diagram representing another exemplary method for recharging a rechargeable battery having at least one voltage plateau according to one embodiment of the invention.
Figure 21F:
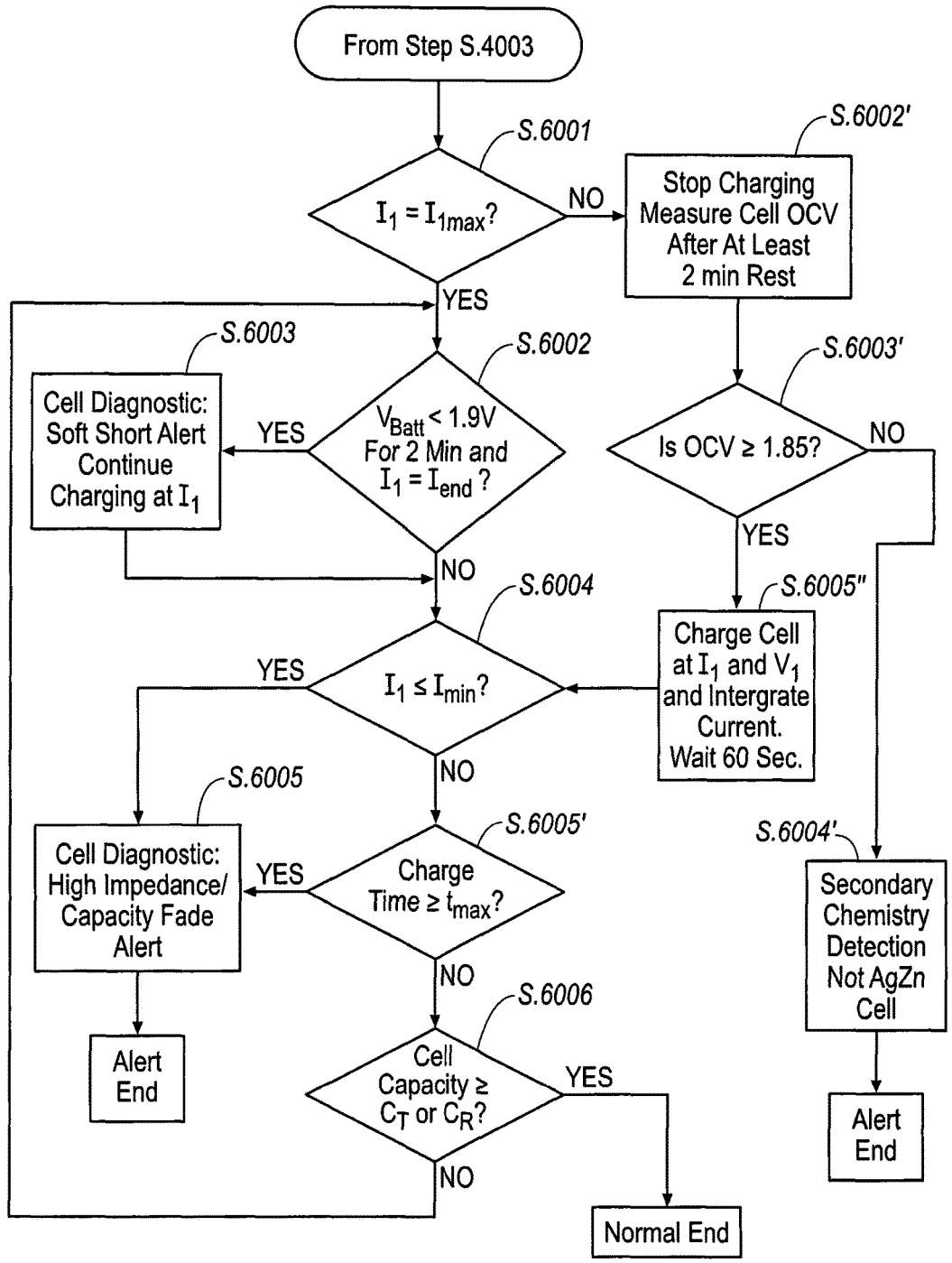
FIG. 21F is a step-diagram representing another exemplary method for recharging a rechargeable battery having at least one voltage plateau according to one embodiment of the invention.
Figure 22:
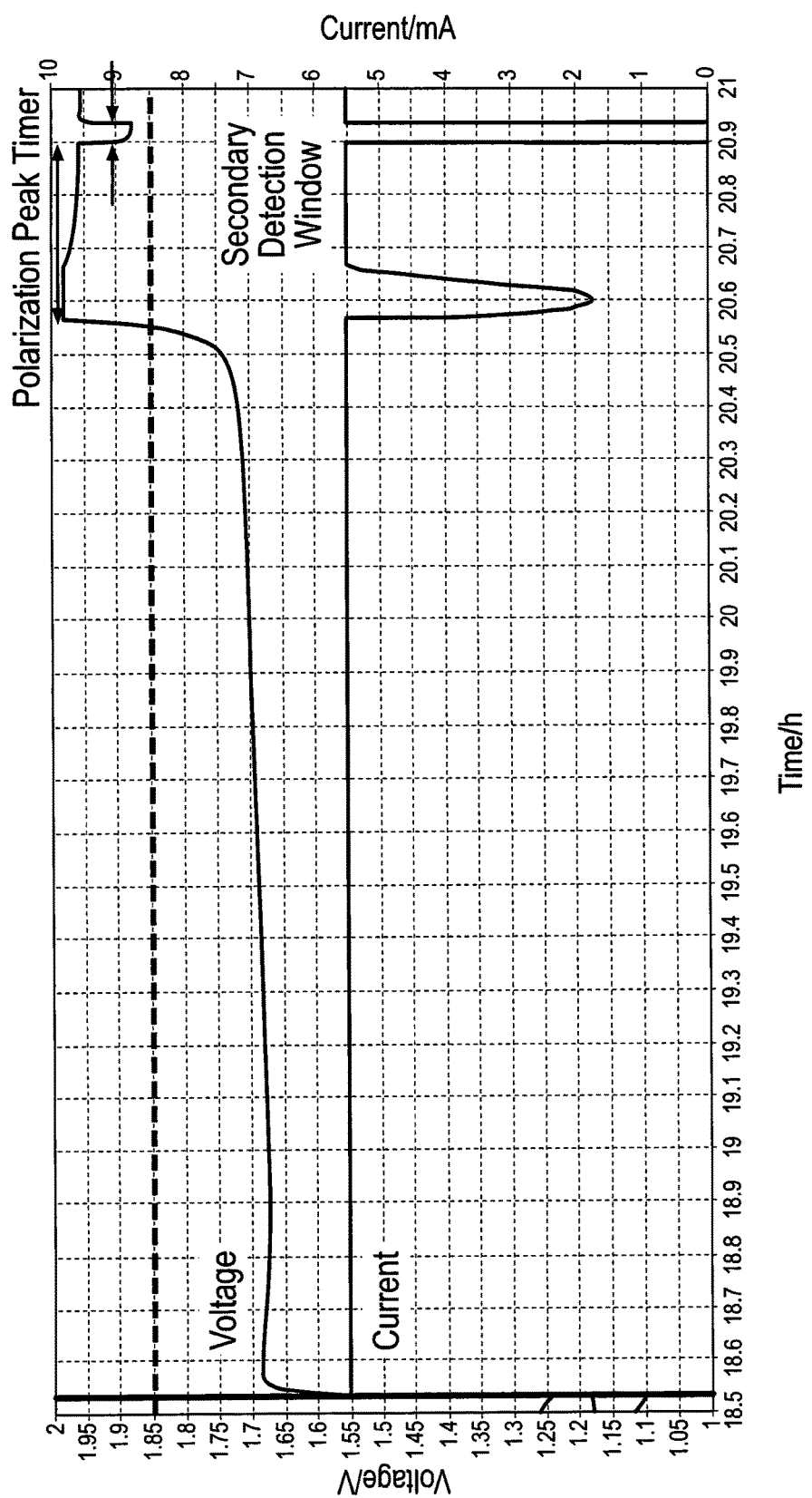
FIG. 22 is a plot of a charge curve for a rechargeable battery, wherein the battery is charged according to an exemplary embodiment of the present invention that includes a secondary chemistry detection step.

Referring to FIGS. 21D and 21F, some methods of charging a rechargeable battery having multiple voltage plateaus wherein the battery has a voltage, $V_{Batt}$, that is less than its highest voltage plateau comprise:

a1) Charging the battery with a charging current, $I_1$, wherein the charging current, $I_1$, is applied until the battery is charged to a first voltage, $V_1$;

b1) Controlling the charging current, $I_1$, when the voltage of the battery is $V_1$, so that the voltage of the battery is maintained at $V_1$ with a deviation of no more than about ±20% of $V_1$; and c1) Arresting the charging current, $I_1$, at the first of the following occurrences
1) the battery has been charged with charging current, $I_1$, for a period of 5 hrs±3 hrs ($t_{max}$);
2) the battery has been charged with a target capacity $C_T$ by the charging current, $I_1$; or
3) the charging current, $I_1$, is 0.5 mA±0.1 mA (e.g., $I_{min}$) after the battery is charged with $I_1$ for a period, $T_1$, of from about 60 min to about 240 min (e.g., from about 60 min to about 80 min), wherein $V_1$ is less than the voltage of a natural polarization peak, $V_{PP}$;

wherein $V_{PP}$ is associated with a voltage plateau, $V_P$, wherein $V_P$ is greater than $V_{Batt}$, and $V_1$ is greater than $V_P$;

wherein $C_T$ is calculated according to equation (7) and inequality (8)

$$C_T = mt_0 + C_{min} \text{ and} \quad (7)$$

$$C_T \leq C_R \quad (8)$$

wherein $t_0$ is the time required to charge the battery from a voltage of $V_{Batt}$ to $V_1$, m is from about 0.01 to about 10, and $C_{min}$ is from about 5 to about 200.

The mathematical expressions in equation (7) and inequality (8) can be rewritten as inequality (9):

$$mt_0 + C_{min} \leq C_R \quad (9)$$

Figure 19:
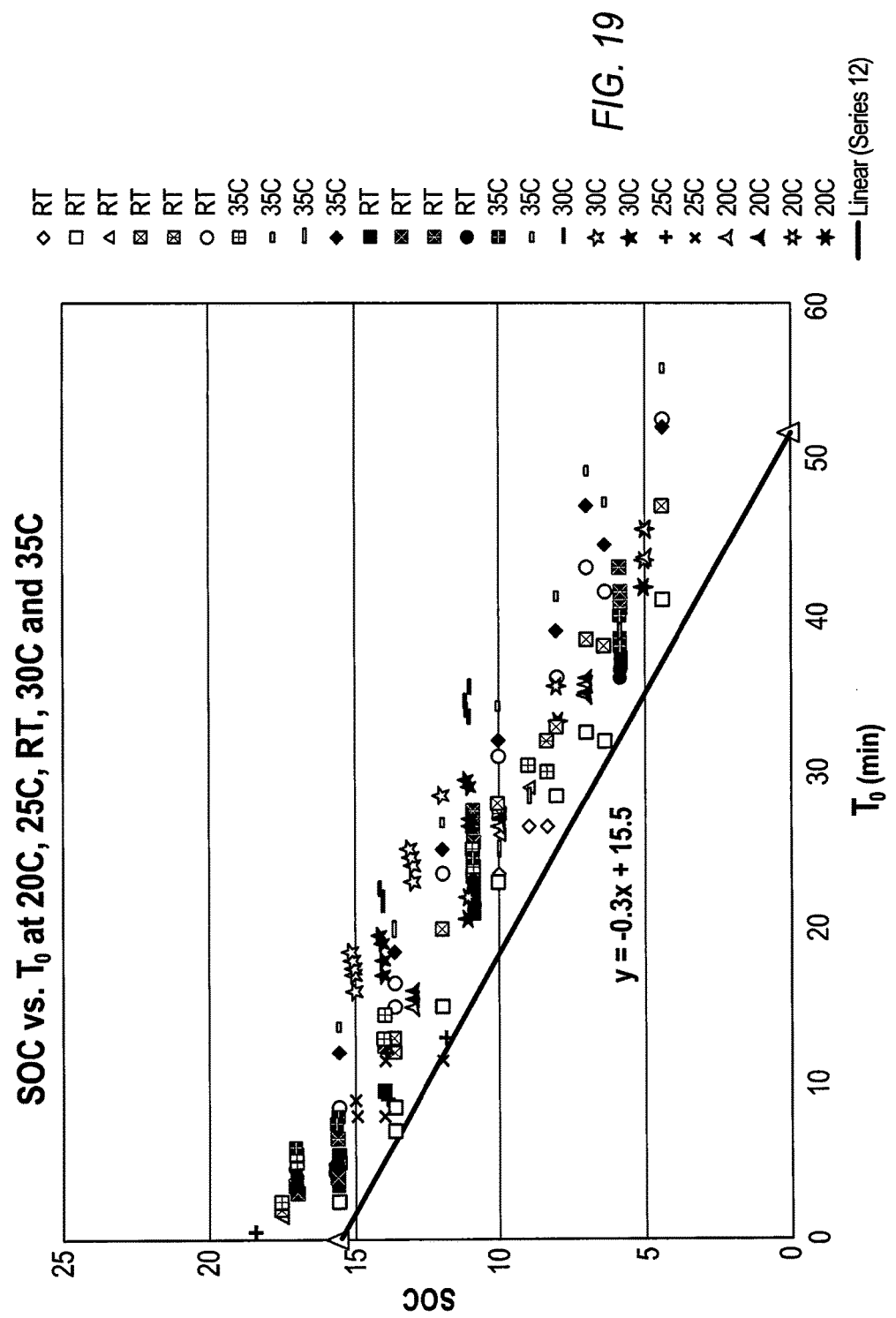
FIG. 19 is a plot of SOC as a function of $t_0$ for several XR41 secondary test cells that were charged with a given charge current, $I_1$, of 5 mA at temperatures of 20° C., 25° C., 30° C., and 35° C.

Referring to FIGS. 19 and 20, constants, m and $C_{min}$, in equation (7), are empirically determined by fitting an equation of a line or curve to a plot of battery SOC as a function of to for a given charge current, e.g., 5 mA, wherein all of the plotted data points fall either on or above the fitted line or fitted curve. The batteries from which SOC and $t_0$ data was plotted are similar in rated capacities and configurations to the battery being recharged. For example, if the battery being recharged is a XR41 silver-zinc button cell, the SOC and $t_0$ data was derived from one or more similar XR41 silver-zinc button cells. The constant, m, is the slope of the line, for straight lines, or the slope of the tangent for curves. The constant $C_{min}$ is the y-intercept of the line, for straight lines, or the y-intercept of the tangent for curves.

Examples of constants m and $C_{min}$ are provided in the FIGS. 19 and 20 and reproduced in Table 6:

TABLE 6

Empirically determined m and $C_{min}$ constants.

| FIG. No. | m (slope of line or tangent) | $C_{min}$ (y-intercept for line or tangent) |
|---|---|---|
| 19 | 0.3 | 15.5 |
| 20 | 0.5 | 17 |
|  | 0.28 | 15.25 |
|  | 0.067 | 6.67 |

For curves, the m and $C_{min}$ terms can be determined by calculating the slope of a tangent to the curve and substituting the x and y values into the equation y=−mx+b for the data point at which the tangent is taken to calculate the y-intercept, b, which is $C_{min}$.

The empirically determined constant $C_{min}$ can also be calculated according to equation (10b):

$$C_{min}=(C_{Batt}-b) \quad (10b)$$

wherein $C_{Batt}$ is the rated capacity of the battery, and b is the y-intercept of the plot of battery SOC as a function of $t_0$ for a given charge current, $I_1$.

In some methods, m is from about 0.01 to about 10 (e.g., from about 0.1 to about 1 (e.g., about 0.3)).

In some implementations, $C_{min}$ is from about 5 to about 200 (e.g., from about 10 to about 200, or from about 5 to about 20 (e.g., about 15)).

In some implementations, $C_R$ is at least about 20 mAh (e.g., $C_R$ is from about 25 mAh to about 150 mAh or $C_R$ is from about 30 mAh to about 125 mAh).

In some implementations, $C_T$ is at least about 20 mAh. For example, $C_T$ is from about 25 mAh to about 35 mAh.

In some implementations, $I_1$ is substantially constant until the battery is charged to voltage $V_1$.

In some implementations, the charging current, $I_1$, has a maximum amperage, $I_{max}$, of at least about 3 mA (e.g., from about 3 mA to about 10 mA or from about 3.5 mA to about 7 mA).

In some implementations, the charging current, $I_1$, has a minimum amperage, $I_{min}$, of less than about 1 mA (e.g., less than 0.75 mA or from about 0.3 mA to about 0.6 mA).

In other methods, charging current, $I_1$, is sufficient to charge the battery from a SOC of less than 30% (e.g., less than 20%) of its rated capacity to a SOC of from about 30% to about 40% of its rated capacity in about 240 min or less (e.g., about 180 min or less). For example, the charging current, $I_1$, is sufficient to charge the battery from a SOC of less than 30% (e.g., less than 20%) of its rated capacity to a SOC of about 40% its rated capacity in less than about 240 min (e.g., less than about 180 min).

In some methods, $I_1$ is about 500 Amps or less. For example, $I_1$ is from about 100 mA to about 500 Amps. In some of these examples, the battery has a rated capacity of from about 1 Ah to about 1000 Ah.

In some methods, $I_1$ is about 500 mA or less. For example, $I_1$ is from about 20 mA to about 500 mA. In some of these examples, the battery has a rated capacity of from about 200 mAh to about 1 Ah.

In some methods, $I_1$ is about 50 mA or less. For example, $I_1$ is from about 5 mA to about 50 mA. In some of these examples, the battery has a rated capacity of from about 50 mAh to about 200 mAh.

In some methods, $I_1$ is about 25 mA or less. For example, $I_1$ is from about 400 μA to about 25 mA. In some of these examples, the battery has a rated capacity of from about 4 mAh to about 50 mAh.

In some methods, $I_1$ is about 2 mA or less. For example, $I_1$ is from about 10 μA to about 2 mA. In some of these examples, the battery has a rated capacity of from about 1 mAh to about 4 mAh.

In some methods, $I_1$ is about 50 mA or less. For example, $I_1$ is from about 500 mA to greater than 8 mA. In other examples, $I_1$ is from about 5 mA to about 500 mA. In some of these examples, the battery has a rated capacity of from about 1 Ah to about 4 Ah.

In some methods, $I_1$ is about 1 Amp or less. For example, $I_1$ is from about 1 Amps to greater than 10 mA. In other examples, $I_1$ is from about 10 mA to about 1 A (e.g., from about 10 mA to about 0.99 A). In other examples, the battery has a rated capacity of from about 100 mAh to about 1000 mAh.

In some methods, $I_1$ is about 100 mA or less. For example, $I_1$ is from about 100 mA to about greater than 1.0 mA. In other examples, $I_1$ is from about 1.0 mA to about 99.99 mA. In some of these methods, the battery has a rated capacity of from about 15 mAh to about 150 mAh (e.g., from about 50 mAh to about 100 mAh).

In some methods, $I_1$ is about 150 mA or less. For example, $I_1$ is from about 0.3 mA to about 60 mA. In some of these methods, the battery has a rated capacity of from about 4 mAh to about 150 mAh.

In some methods, $I_1$ is about 25 mA or less. For example, $I_1$ is from about 25 mA to greater than 0.4 mA. In some of these methods, the battery has a rated capacity of from about 4 mAh to about 50 mAh.

In some methods, $I_1$ is about 15 mA or less. For example, $I_1$ is from about 15 mA to greater than 0.1 mA. In some of these methods, the battery has a rated capacity of from about 1.0 mAh to about 15 mAh.

In some methods, $I_1$ is from about 3.0 mA to about 3.5 mA. In some of these methods, the battery has a theoretical capacity of from about 40 mAh to about 50 mAh (e.g., about 44 mAh). In others, the battery has a rated capacity of from about 15 mAh to about 20 mAh (e.g., about 18 mAh). And, in some embodiments, the battery stores from about 25 mWh to about 30 mWh (e.g., about 29 mWh).

In some methods, $I_1$ is from about 4.7 mA to about 5.6 mA. In some of these methods, the battery has a theoretical capacity of from about 50 mAh to about 60 mAh (e.g., about 57 mAh). In others, the battery has a rated capacity of from about 20 mAh to about 30 mAh (e.g., about 28 mAh). And, in some embodiments, the battery stores from about 40 mWh to about 50 mWh (e.g., about 45 mWh).

In some methods, $I_1$ is from about 5.4 mA to about 6.4 mA. In some of these methods, the battery has a theoretical capacity of from about 60 mAh to about 80 mAh (e.g., about 70 mA to about 80 mA or about 78 mAh). In others, the battery has a rated capacity of from about 30 mAh to about 40 mAh (e.g., about 32 mAh). And, in some embodiments, the battery stores from about 50 mWh to about 60 mWh (e.g., about 51 mWh).

In some methods, $I_1$ is from about 15 mA to about 24 mA. In some of these methods, the battery has a theoretical capacity of from about 250 mAh to about 275 mAh (e.g., about 269 mAh). In others, the battery has a rated capacity of from about 100 mAh to about 140 mAh (e.g., about 120 mAh). And, in some embodiments, the battery stores from about 175 mWh to about 225 mWh (e.g., about 192 mWh).

In some implementations, the method further comprises measuring a time interval, $t_0$, wherein $t_0$ is the time required to charge the battery from a voltage of $V_{Batt}$ to $V_1$.

In some implementations, the first charging current, $I_1$, is sufficient to charge the battery to voltage $V_1$ in a period of from about 1 min to about 300 min when the battery's initial SOC is less than about 50% (e.g., less than about 40%) of its rated capacity.

In some implementations, the first charging current, $I_1$, is sufficient to charge the battery to voltage $V_1$ in a period of from about 5 min to about 240 min, when the battery's initial SOC is less than about 50% (e.g., less than about 40%) of its rated capacity.

In some implementations, the first charging current, $I_1$, is sufficient to charge the battery to voltage $V_1$ in a period of from about 10 min to about 90 min, when the battery's initial SOC is less than about 50% (e.g., less than about 40%) of its rated capacity.

In some implementations, the first charging current, $I_1$, is sufficient to charge the battery to voltage $V_1$ in a period of about 75 min or less, when the battery's initial SOC is less than about 50% (e.g., less than about 40%) of its rated capacity.

In some implementations, the first charging current, $I_1$, is sufficient to charge the battery from a SOC of less than 30% of its rated capacity to an SOC of from about 30% to about 40% of its rated capacity in about 240 min or less.

In some implementations, the first charging current, $I_1$, is sufficient to charge the battery from an SOC of less than about 30% of its rated capacity to a SOC of about 40% its rated capacity in less than about 240 min.

In some implementations, the first charging current, $I_1$, is controlled when the voltage of the battery is $V_1$, so that the voltage of the battery is maintained at $V_1$ with a deviation of no more than about ±20% of $V_1$, for a period of from about 6 s to about 1500 s.

In some embodiments, $I_1$ is from about 1 mA to about 100 mA (e.g., from about 2 mA to about 10 mA (e.g., about 5 mA)).

In some implementations, $V_1$ is from about 1 V to about 10 V, e.g. from about 1.5 V to about 2.5 V, e.g. about 2 V.

Some methods further comprise terminating the charging current, $I_1$, after the voltage of the battery is maintained at $V_1$ with a deviation of no more than about ±20% of $V_1$ for a period of from about 6 s to about 900 s. For example, the voltage of the battery is maintained at $V_1$ with a deviation of no more than about ±10% of $V_1$ for a period of from about 60 s to about 600 s.

Some implementations further comprise calculating a remaining charge capacity, $C_{rem}$, according to equation (10a):

$$C_{rem} = C_T - (I_1 \times t_0)/60 \quad (10a)$$

wherein $C_{rem}$ is the charge capacity target minus the charge capacity already charged into the cell during the polarization time interval, $t_0$.

One example of this charge method is provided in FIG. 21D.

2. Over-Discharge Recovery

Another aspect of the present invention provides a method of charging a rechargeable silver-zinc battery that has been over-discharged (e.g., the battery has a voltage that is less than about 65% (e.g. less than about 62%) of the battery's rated voltage). For example, an over-discharged 2.0 V silver-zinc battery may have an OCV of about 1.2 V or less.

These methods include:

a2) Charging the battery with a charging current, $I_1$, wherein the charging current, $I_1$, is applied until the battery is charged to a first voltage, $V_1$;

b2) Controlling the charging current, $I_1$, when the voltage of the battery is $V_1$, so that the voltage of the battery is maintained at $V_1$ with a deviation of no more than about ±20% of $V_1$; and c2) Arresting the charging current, $I_1$, at the first of the following occurrences:
1) the battery has been charged with at least 98% (e.g., at least about 99%) of its $C_R$; or
2) the charging current, $I_1$, is 0.5 mA±0.1 mA (e.g., $I_{min}$) after the battery is charged with $I_1$ for a period, $T_1$, of from about 60 min to about 240 min (e.g., from about 60 min to about 80 min), wherein $C_R$ is the rated capacity of the battery.

Additional examples of these methods are provided in FIG. 21G.

3. Shallow Discharge

Some methods provide for charging a rechargeable battery having an SOC of greater than about 50%. In some instances, an SOC of greater than about 50% is indicated when the voltage of the battery, $V_{Batt}$, is from about 85% to about 100% (e.g., from about 85% to about 99.9%) of the battery's rated voltage.

Some methods of charging a rechargeable battery having multiple voltage plateaus wherein the battery has a voltage, $V_{Batt}$, that is less than its highest voltage plateau comprise:

a3) Charging the battery with a first charging current, $I_1$, wherein the first charging current, $I_1$, is applied for at least a period, $t_3$, of from about 5 min to about 15 min;

b3) Controlling the charging current, $I_1$, so that the voltage of the battery is maintained at $V_1$ with a deviation of no more than about ±20% of $V_1$; and c3) Measuring the ambient temperature; and d3) Arresting the charging current, $I_1$, at the first of the following occurrences:
1) the battery has been charged with charging current, $I_1$, for a period of 9 hrs±3 hrs;
2) the battery has been charged with a target capacity $C_T$ by the charging current, $I_1$; or
3) the charging current, $I_1$, reduces to $I_{end}$ for a continuous period of from about 50 seconds to about 70 seconds after the battery has been charged with $I_1$ during period $t_3$, wherein $V_1$ is less than the voltage of a natural polarization peak, $V_{PP}$;

wherein $V_{PP}$ is associated with a voltage plateau, $V_P$, wherein $V_P$ is greater than $V_{Batt}$, and $V_1$ is greater than $V_P$;

wherein $C_T$ is from about 10 mAh to about 25 mAh; and $I_{end}$ is calculated according to equation (12b):

$$I_{end} = m_2 \times T + b_x \quad (12b)$$

wherein $m_2$ is from about 0.10 to about 0.14;

T is the ambient temperature in degrees Celsius; and $b_x$ is from about 0.75 to about 1.25 if charge current $I_1$ was at least 5 mA±1.5 mA for at least 80% of period $t_3$; or $b_x$ is from about 0.25 to about 0.75 if charge current $I_1$ was at least 5 mA±1.5 mA for less than 80% of period $t_3$.

One example of this method is provided in FIG. 21E. In FIG. 21E, $b_x$ is either $b_1$ in step S.5003 or $b_2$ in step S.5003'.

4. Diagnostics a. Incorrect Battery Chemistry Detection i. Primary Chemistry Detection Diagnostic In some implementations, steps a1)-c1), steps a2)-c2) or steps a3)-d3), above are preceded by one or more steps for detecting batteries that have active materials (e.g., cathode active material and/or anode active material) that are not compatible with this charging method.

Examples of these steps (e.g. steps S.1001, S.1002', and S.2001-S.2008) are provided in FIGS. 21A and 21B.

For example, some methods further comprise:

d4) Charging the battery with a diagnostic charge current, $I_{Diag}$, for a period of about 10 seconds or less (e.g., from about 0.5 s to about 10 s or from about 0.75 s to about 2 s); and e4) Discontinuing the recharging of the battery if $\Delta V \leq -m_d \times V_{d0} + b_d$, wherein $$\Delta V = V_{d1} - V_{d0} \quad (11);$$

$$0.1 \leq m_d \leq 0.99 \quad (12a);$$

$$0.75 \leq b_d \leq 0.95 \quad (13);$$

$V_{d0}$ is the OCV of the battery prior to being charged with $I_{Diag}$; and $V_{d1}$ is the voltage of the battery after it is charged with $I_{Diag}$.

In some implementations, $I_{Diag}$ is any diagnostic charge current described herein. For example, $I_{Diag}$ is from about 2 mA to about 20 mA (e.g., from about 5 mA to about 15 mA, or from about 7.5 mA to about 12.5 mA). Additional examples of $I_{Diag}$ are provided above in Table 4, above.

The terms $m_d$ and $b_d$ are as defined above and may have any of the values described above, e.g., the values provided in Table 5.

In some implementations, the cell is charged with diagnostic charge current, $I_{Diag}$, for about 5 seconds or less (e.g., about 3 seconds or less, from about 1 s to about 3 s, or about 2 seconds).

In some methods, if the inequality, $\Delta V \leq -m_d \times V_{d0} + b_d$, is satisfied (e.g., S.2005), then the battery being recharged is not compatible with these recharging methods and steps a1)-c1), steps a2)-c2) or steps a3)-d3) are not performed (e.g., S.2006). However, if this inequality is not satisfied, the battery is compatible with these recharging methods (e.g., S.2002), and steps a1)-c1), steps a2)-c2) or steps a3)-d3) may be performed.

Some implementations (e.g., when the inequality, $\Delta V \leq -m_d \times V_{d0} + b_d$, is satisfied) further comprise step f): activating an alert (e.g., a visual alert, an audio alert, a vibrational alert, or the like) that indicates that the battery has incompatible active materials for the recharging method (e.g., S.2006).

ii. Secondary Chemistry Detection Diagnostic

Additionally, some cells having active materials that are not compatible with this charging method may go undetected by the primary chemistry detection described above. Accordingly, some methods of the present invention comprise secondary steps for detecting batteries that are not compatible with the charging method.

For example, some methods further comprise step d5): arresting the charging current $I_1$, if the battery has not been charged to a voltage of at least about 75% of V1 after a period of from about 20 min to about 60 min (e.g., from about 20 min to about 40 min or from about 25 min to about 35 min).

And, some methods comprise step e5): activating an alert (e.g., a visual alert, an audio alert, a vibrational alert, or the like) that indicates that the battery has incompatible active materials for the charging method.

In other examples, some methods further comprise step d6): arresting the charging current $I_1$, if the charging current $I_1$, does not reach $I_{max} \pm 10\%$ after a period, $T_1$, of from about 60 min to about 240 min and the OCV of the battery is less than about 93% (e.g., less than about of 90% or less than about 88%) of $V_1$ after a resting period of at least about 1.75 min (e.g., at least about 2 min or from about 2 min to about 60 min). Note that during the resting period, the cell is not charged with a charging current (e.g., charging current $I_1$).

And, some methods comprise step e6): activating an alert (e.g., a visual alert, an audio alert, a vibrational alert, or the like) that indicates that the battery has incompatible active materials for the charging method.

b. Capacity Fade/High Impedance

As mentioned above, high impedance and/or capacity fade is indicated when the charge current, $I_1$, reduces to a minimum current threshold after the cell has been charged with $I_1$ for a period, $T_1$, of from about 60 min to about 80 min., e.g., $I_1$, reduces to 0.5 mA±0.1 mA or $I_{min}$. High impedance and/or capacity fade is also indicated when the rechargeable battery is not charged to its target capacity, $C_T$, before the expiration of about 9 hrs±3 hrs.

Accordingly, some implementations further comprise step g): activating an alert (e.g., a visual alert, audio alert, vibration alert, or the like) when the charging current, $I_1$, is 0.5 mA±0.1 mA after the battery is charged with $I_1$ for a period of at least about 70 min. In other implementations, multiple indications of high impedance/capacity fade may be confirmed before an alert is activated.

Example of this method are provided in FIG. 21E, steps S.5004 and S.5005, and FIG. 21F, steps S.6004 and S.6005.

c. Soft Shorting

As mentioned above, a soft short is indicated when the voltage of the battery, $V_{Batt}$, is less than about 98% (e.g., less than about 96%) of $V_1$ for more than about 1.5 min (e.g., from about 1 min to about 3 min, or from about 1.5 min to about 2.5 min) and the charging current, $I_1$, is greater than about 4 mA (e.g., greater than about 4.5 mA, greater than about 5 mA, from about 4.5 mA to about 6.5 mA, or from 4.75 mA to about 5.75 mA) when charging current, $I_1$, is arrested.

In 2.0 V silver-zinc rechargeable batteries, a soft short is indicated when the voltage of the battery, $V_{Batt}$, is less than about 1.95 V (e.g., less than about 1.9 V) for more than about 1.5 min (e.g., from about 1 min to about 3 min, from about 1.5 min to about 2.5 min, or about 2 min) and the charging current, $I_1$, is greater than about 4 mA (e.g., greater than about 4.5 mA, greater than about 5 mA, from about 4.5 mA to about 6.5 mA, or from 4.75 mA to about 5.75 mA) when charging current, $I_1$, is arrested.

Accordingly, some methods further comprise step h): activating an alert (e.g., a visual alert, audio alert, vibration alert, or the like) when the voltage of the battery, $V_{Batt}$, is less than about 98% (e.g., less than about 96%) of $V_1$ for more than about 1.5 min (e.g., from about 1 min to about 3 min, or from about 1.5 min to about 2.5 min) and the charging current, $I_1$, is greater than about 4 mA (e.g., greater than about 4.5 mA, greater than about 5 mA, from about 4.5 mA to about 6.5 mA, or from 4.75 mA to about 5.75 mA) when charging current, $I_1$, is arrested.

Some implementations comprise step h): activating an alert (e.g., a visual alert, audio alert, vibration alert, or the like) when the voltage of the battery, $V_{Batt}$, is less than about 1.95 V (e.g., less than about 1.9 V) for more than about 1.5 min (e.g., from about 1 min to about 3 min, from about 1.5 min to about 2.5 min, or about 2 min) and the charging current, $I_1$, is greater than about 4 mA (e.g., greater than about 4.5 mA, greater than about 5 mA, from about 4.5 mA to about 6.5 mA, or from 4.75 mA to about 5.75 mA) when charging current, $I_1$, is arrested.

An example of this method is provided in FIG. 21F, steps S.6001-S.6003.

d. Hard Shorting

As mentioned above, a hard short is indicated when the voltage of the battery, $V_{Batt}$, is less than about 1 V (e.g., less than about 900 mV, less than about 850 mV, or less than about 800 mV) for a continuous period of about 5 seconds or more (e.g., about 7.5 s or more, or about 10 s or more) when the battery is charged with charging current $I_1$.

Accordingly, some methods further comprise step i): activating an alert (e.g., a visual alert, audio alert, vibration alert, or the like) when the voltage of the battery, $V_{Batt}$, is less than about 1.0 V (e.g., less than about 900 mV, less than about 850 mV, or less than about 800 mV) for a continuous period of about 5 seconds or more (e.g., about 7.5 s or more, or about 10 s or more) when the battery is charged with charging current $I_1$.

III. Charging Apparatus

In some embodiments, a rechargeable battery is coupled to a host device (e.g., an electronic device such as a cell phone, PDA, laptop computer, flashlight, portable audio device, and/or portable video device) that comprises a charging management system (e.g., hardware, firmware, and/or software). In other embodiments, the rechargeable battery comprises a charging management system, wherein the rechargeable battery couples to a host device, such as a cellular phone, laptop computer, portable audio device (e.g., mp3 player), or the like, that includes the battery charging management system. One such system is described in U.S. Pat. No. 6,191,522. And, in some embodiments, the charging management system or circuitry is divided among the host device (e.g., electronic device powered by the battery), the battery itself, a charging base, or any combination thereof. Although some of the foregoing disclosure is directed to a battery and a host device, it will be appreciated that the terms "battery" and "host device" are directed to an embodiment of the claimed invention and that the application-specific description of a "battery" and a "host device" should not be used to limit the scope of the claims.

In an embodiment, the battery has a rated charge capacity of about 50% or less of the cell's actual capacity. When the battery is said to be "fully charged", the cell has a SOC of about 100% of the battery's rated capacity. When the battery powers a host device, such as an electronic device, the SOC of the battery decreases. A rechargeable battery is recharged when electrical energy is delivered to the rechargeable battery. One or more methods for recharging the rechargeable battery is described above and shown generally at 100, 200, 300 and 400 in FIGS. 8A-8D, respectively.

In an embodiment, the system may include, for example, a charging dock or charging base such as the charging dock or base described in U.S. Pat. No. 6,337,557. In other embodiments, the system may include recharging hardware comprising a circuit, as depicted in FIG. 1. The rechargeable battery may be directly docked with or otherwise placed upon a charging base such that the charging base is able to directly or indirectly recharge the battery. In another example, the battery may be coupled to the electronic device, and, in an embodiment, the electronic device may be directly docked with or otherwise placed upon the charging base such that charging base is able to directly or indirectly recharge the rechargeable battery. In one embodiment, the charging base may be connected to a mains power system, which is shown generally at AC, in order to permit the rechargeable battery to be recharged.

In an embodiment, a "direct" charging method may include, for example, a "direct wired contact" including, for example, one or more electrical contacts/leads extending from, for example, one or more of the rechargeable battery, electrical device, and charging base such that the electrical contacts/leads permit power to be delivered from, for example, the mains power system to the rechargeable battery. In an embodiment, an "indirect" charging method may include, for example, "inductive charging" such that an electromagnetic field may transfer energy from, for example, the charging base that is connected to the main power system, and one or more of the rechargeable battery and electronic device.

In an embodiment, the rechargeable battery is a button battery; however, other embodiments of the present invention comprise a rechargeable battery comprising a plurality of electrochemical cells that are arranged electrically in series, and methods of charging such batteries. Other rechargeable batteries useful in the present invention also include cylindrical cells and prismatic cells.

In some embodiments, the rechargeable battery comprises two electrodes (i.e., an anode and a cathode) and an electrolyte (i.e., a substance that behaves as an electrically-conductive medium for facilitating mobilization of electrons and cations). Electrolytes may include mixtures of materials such as, for example, aqueous solutions of alkaline agents (e.g., aqueous NaOH, aqueous KOH, or a combination thereof). Some electrolytes may also comprise additives, such as buffers including a borate, phosphate, or the like. Some exemplary cathodes in batteries of the present invention comprise a silver material. And, some exemplary anodes in batteries of the present invention comprise zinc.

In an embodiment, the cathode of the rechargeable battery comprises a silver material. In an embodiment, the anode of the rechargeable battery may comprise zinc (Zn). Accordingly, in view of the potential chemistry of electrodes of the rechargeable electrochemical battery described above, the rechargeable electrochemical battery may be referred to as a "silver-zinc battery."

In an embodiment, the silver-zinc battery includes an alkaline electrolyte comprising an aqueous hydroxide of an alkali metal. In an embodiment, the electrolyte may comprise lithium hydroxide (LiOH), sodium hydroxide (NaOH), potassium hydroxide (KOH), cesium hydroxide (CsOH), rubidium hydroxide (RbOH), or any combination thereof. Although several electrolytes are described above, it will be appreciated that the silver-zinc battery is not limited to a particular electrolyte and that the silver-zinc battery may include any desirable electrolyte.

In an embodiment, the silver-zinc battery may be recharged in a controlled manner. In an embodiment, the system for recharging the silver-zinc battery may include recharging management circuitry that is illustrated as a circuit diagram in FIG. 1.

In an embodiment, the recharging management circuitry permits recharging of the silver-zinc battery in a controlled manner. In an embodiment, the recharging management circuitry may be included within one or more of the silver-zinc battery, such as the battery described in U.S. Pat. No. 7,375,494, the electronic device and the charging base. In an embodiment, the recharging management circuitry may be provided as a processor, logic circuitry or a combination thereof. Some aspects of other recharging systems useful for performing the charging methods of the present invention include those described in U.S. Pat. Nos. 7,018,737; 6,181,107; 6,215,276; 6,040,684; and 6,931,266; and U.S. Patent Application Publication Nos. 20050029989 and 20030040255.

In an embodiment, the recharging management circuitry, as exemplified in FIG. 1, permits recharging of the silver-zinc battery in a controlled manner. In an embodiment, the recharging management circuitry may be included within one or more of the silver-zinc battery, the electronic device and the charging base. In an embodiment, the recharging management circuitry may be provided as a processor, logic circuitry or a combination thereof.

In an embodiment, the charge methods 100-400, which may be accomplished by the recharging management circuitry for the rechargeable battery may employ one or more modulated charge currents (e.g., $I_1$ and/or $I_2$) that, in some embodiments, is described as constant-current, constant-voltage (CC-CV) charge currents. As seen in the charge curve plots in FIGS. 2, 4, 5, 6, 7A, and 7B, the controlled charge currents employed in the charge methods 100-400 charge the battery with a maximum charge current up to a charge current ceiling (e.g., $I_{max}$ or $I_{2max}$) until the battery is charged to a maximum voltage (e.g., $V_1$ or $V_2$) at which point the charge current is continued at the maximum current or reduced, so that the voltage of the charging battery does not rise above the maximum voltage. And, when the voltage of the battery drops below the maximum voltage, the charge current is increased up to a maximum charge current until the voltage of the battery reaches the maximum voltage, the charge current is arrested, or the charging process/method enters another zone, such as in the multi-stage charge process.

Further, in an embodiment, one of, or, a communication of two or more of the charge methods 100-400, which may be provided by the recharging management circuitry, for battery may include at least two different modes of charging, which may be dependent upon, for example, the capacity of the silver-zinc battery. In an embodiment, the modes of charging comprise a multi-stage charge mode (see, e.g., method 100) and a single-stage charge mode (see, e.g., method 200). Other embodiments further comprise an optional "over-discharge recovery charge mode" (see, e.g., method 300) and/or a "battery diagnostic investigation charge mode" (see, e.g., method 400).

Accordingly, it will be appreciated that because a user may utilize an electronic device for about eighteen (18) hours, the remaining balance (in time) of a twenty-four (24) hour period only leaves about six (6) hours to recharge the silver-zinc battery. As such, in designing one or more of the charge methods 100-400, an embodiment of a maximum charge time of the silver-zinc battery may be about six (6) hours. Thus, it will be appreciated that, if, for example, the user operates the electronic device for about eighteen (18) hours, the user may be permitted to recharge the silver-zinc battery to about full capacity in about six (6) hours when, for example, the user is not using the electronic device and may, for example, be sleeping. In other words, a six (6) hour charging period may be referred to as an embodiment of the above-mentioned single stage charge mode.

However, in an embodiment, it will also be appreciated that, if, for example, the user operates the electronic device for a period of time (e.g., the user operates the electronic device for about eighteen (18) hours) and forgets to recharge the silver-zinc battery, the silver-zinc battery may have to be quickly recharged in order to input electrical capacity into the battery and render the electronic device operable for at least a shortened period. In such a circumstance, the recharging of the silver-zinc battery may have to be expedited in a manner such that the battery's SOC is at least partially restored over an abbreviated charging time; thereby, rendering the electronic device operable for a period of time. Accordingly, in an embodiment, one or more of the charging methods 100-400 may also be designed in a manner that charges a battery having an SOC of less than 40% to a SOC of about 40% within about 1 hour of charging. In other words, a one hour charging period may be referred to as an embodiment of the above-mentioned multi-stage charge mode.

Other Embodiments

The embodiments disclosed herein have been discussed for the purpose of familiarizing the reader with novel aspects of the invention. Although preferred embodiments of the invention have been shown and described, many changes, modifications and substitutions may be made by one having ordinary skill in the art without necessarily departing from the spirit and scope of the invention as described in the following claims.

What is claimed is:

1. A method of charging a rechargeable battery having multiple voltage plateaus wherein the battery has a voltage, $V_{Batt}$, that is less than its highest voltage plateau comprising:
   a1) Charging the battery with a charging current, $I_1$, wherein the charging current, $I_1$, is applied until the battery is charged to a first voltage, $V_1$;
   b1) Controlling the charging current, $I_1$, when the voltage of the battery is $V_1$, so that the voltage of the battery is maintained at $V_1$ with a deviation of no more than about ±20% of $V_1$; and
   c1) Monitoring for each of the following occurrences and arresting the charging current, $I_1$, at the first of the following occurrences
      1) the battery has been charged with charging current, $I_1$, for a period of 9 hrs±3 hrs;
      2) the battery has been charged with a target capacity $C_T$ by the charging current, $I_1$; or
      3) the charging current, $I_1$, has an amperage of about 15% or less of its highest amperage, $I_{max}$, after the battery is charged with $I_1$ for a period, $T_1$, of from about 60 min to about 240 min,
   wherein $V_1$ is less than the voltage of a natural polarization peak, $V_{PP}$;
   wherein $V_{PP}$ is associated with a voltage plateau, $V_P$, wherein $V_P$ is greater than $V_{Batt}$, and $V_1$ is greater than $V_P$;
   wherein $C_T$ is calculated according to equation (7) and inequality (8)

$$C_T = m \times t_0 + C_{min} \text{ and} \quad (7)$$

$$C_T \leq C_R \quad (8)$$

wherein $t_0$ is the time required to charge the battery from a voltage of $V_{Batt}$ to $V_1$, m is from about 0.01 mAh/min to about 10 mAh/min, $C_{min}$ is from about 5 mAh to about 200 mAh, and $C_R$ is the rated capacity of the battery.

2. The method of claim 1, wherein m is from about 0.1 mAh/min to about 1 mAh/min.

3. The method of claim 2, wherein m is from about 0.15 mAh/min to about 0.45 mAh/min.

4. The method of claim 1, wherein $C_{min}$ is from about 10 mAh to about 200 mAh.

5. The method of claim 4, wherein $C_{min}$ is from about 5 mAh to about 20 mAh.

6. The method of claim 5, wherein $C_{min}$ is from about 13 mAh to about 17 mAh.

7. The method of claim 1, wherein $C_R$ is at least about 20 mAh.

8. The method of claim 7, wherein $C_R$ is from about 25 mAh to about 150 mAh.

9. The method of claim 1, wherein $I_1$ is substantially constant until the battery is charged to voltage $V_1$.

10. The method of claim 1, wherein charging current, $I_1$, is sufficient to charge the battery to voltage $V_1$ in a period of from about 1 min to about 300 min when the battery's initial SOC is less than about 40% of its rated capacity.

11. The method of claim 10, wherein charging current, $I_1$, is sufficient to charge the battery to voltage $V_1$ in a period of from about 5 min to about 240 min when the battery's initial SOC is less than about 40% of its rated capacity.

12. The method of claim 1, wherein charging current, $I_1$, has a maximum amperage, $I_{max}$, of at least about 3 mA.

13. The method of claim 12, wherein charging current, $I_1$, has a minimum amperage, $I_{min}$, of from about 0.25 mA to about 0.60 mA.

14. The method of claim 1, further comprising calculating a remaining charge capacity, $C_{rem}$, according to equation (10a):

$$C_{rem}=C_T-(I_1 \times t_0)/60 \tag{10a}.$$

15. The method of claim 1, wherein $V_1$ is greater than about 1.80 V.

16. The method of claim 15, wherein $V_1$ is from about 1.85 V to about 2.05 V.

17. The method of claim 16, comprising controlling the charging current, $I_1$, when the voltage of the battery is $V_1$, so that the voltage of the battery is maintained at $V_1$ with a deviation of no more than about ±10% of $V_1$.

18. The method of claim 1, further comprising step d5): arresting the charging current, $I_1$, if the battery has not been charged to a voltage of at least about 75% of $V_1$ after a period of from about 20 min to about 60 min.

19. The method of claim 18, further comprising step e5): activating an alert if the battery has not been charged to a voltage of at least about 75% of $V_1$ after a period of from about 20 min to about 60 min.

20. The method of claim 1, further comprising step d6): arresting the charging current, $I_1$, if the charging current, $I_1$, is not at least $I_{max}$±10% after a period, $T_1$, of from about 60 min to about 240 min, and the OCV of the battery is less than about 93% of $V_1$ after a resting period of at least about 2.0 min.

21. The method of claim 20, further comprising step e6): activating an alert if the charging current, $I_1$, is not at least $I_{max}$±10% after a period, $T_1$, of from about 60 min to about 240 min, and the OCV of the battery is less than about 93% of $V_1$ after a resting period of at least about 2.0 min.

22. The method of claim 1, further comprising
g) Activating an alert when the charging current, $I_1$, has an amperage that is about 20% or less of its highest amperage, $I_{max}$, after the battery is charged with $I_1$ for a period, $T_1$, of from about 60 min to about 240 min.

23. The method of claim 22, further comprising
g) Activating an alert when the charging current, $I_1$, has an amperage that is about 15% or less of its highest amperage, $I_{max}$, after the battery is charged with $I_1$ for a period, $T_1$, of from about 60 min to about 240 min.

24. The method of claim 23, further comprising
g) Activating an alert when the charging current, $I_1$, has an amperage that is about 11% or less of its highest amperage, $I_{max}$, after the battery is charged with $I_1$ for a period, $T_1$, of from about 65 min to about 75 min.

25. The method of claim 1, further comprising
g) Activating an alert when the charging current, $I_1$, is 0.5 mA±0.1 mA after the battery is charged with $I_1$ for a period of at least about 70 min.

26. The method of claim 1, further comprising
h) Activating an alert when the voltage of the battery, $V_{Batt}$, is less than about 98% of $V_1$ for a continuous period of more than about 1.5 min and the charging current, $I_1$, has an amperage that is at least about 70% of its highest amperage, $I_{max}$, during this continuous period.

27. The method of claim 1, further comprising
h) Activating an alert when the voltage of the battery, $V_{Batt}$, is less than about 96% of $V_1$ for a continuous period of more than about 1.5 min, and the charging current, $I_1$, has an amperage that is at least about 80% of its highest amperage, $I_{max}$, during this continuous period.

28. The method of claim 1, further comprising
h) Activating an alert when the voltage of the battery, $V_{Batt}$, is less than about 1.95 V for a continuous period of from about 1.5 min to about 5 min and the charging current, $I_1$, is greater than about 80% of its highest value during this continuous period.

29. The method of claim 1, further comprising
i) activating an alert when the voltage of the battery, $V_{Batt}$, is less than about 1.0 V for a continuous period of about 5 seconds or more when the battery is charged with charging current $I_1$.

30. The method of claim 1, further comprising
d4) Charging the battery with a diagnostic charge current, $I_{Diag}$, for a period of about 10 seconds or less; and
e4) Discontinuing the recharging of the battery if $\Delta V \leq -m_d \times V_{d0}+b_d$, wherein $$\Delta V = V_{d1}-V_{d0} \tag{11};$$

$$0.1 \leq m_d \leq 0.99 \tag{12a};$$

$$0.75 \leq b_d \leq 0.95 \tag{13};$$

$I_{Diag}$ is from about 2 mA to about 20 mA, $V_{d0}$ is the voltage of the battery prior to being charged with $I_{Diag}$; and $V_{d1}$ is the voltage of the battery after it is charged with $I_{Diag}$.

* * * * *